United States Patent (10) Patent No.: US 12,512,524 B2
Takahashi (45) Date of Patent: Dec. 30, 2025

(54) MEASUREMENT APPARATUS, AND MEASUREMENT METHOD

(71) Applicant: HIOKI E.E. CORPORATION, Ueda (JP)

(72) Inventor: Tetsuya Takahashi, Ueda (JP)

(73) Assignee: HIOKI E. E. CORPORATION, Ueda (JP)

( * ) Notice: Subject to any disclaimer, the term of this patent is extended or adjusted under 35 U.S.C. 154(b) by 684 days.

(21) Appl. No.: 17/758,954

(22) PCT Filed: Jan. 15, 2021

(86) PCT No.: PCT/JP2021/001294
§ 371 (c)(1),
(2) Date: Feb. 3, 2023

(87) PCT Pub. No.: WO2021/145437
PCT Pub. Date: Jul. 22, 2021

(65) Prior Publication Data
US 2023/0198035 A1    Jun. 22, 2023

(30) Foreign Application Priority Data

Jan. 17, 2020    (JP) .................. 2020-006174
Jan. 17, 2020    (JP) .................. 2020-006176
Jan. 17, 2020    (JP) .................. 2020-006179

(51) Int. Cl.
*H01M 10/48*        (2006.01)
*G01R 31/382*       (2019.01)
*H02J 7/00*         (2006.01)

(52) U.S. Cl.
CPC .......... *H01M 10/48* (2013.01); *G01R 31/382* (2019.01); *H02J 7/007182* (2020.01)

(58) Field of Classification Search
CPC .... H01M 10/48; H01M 10/44; G01R 31/382; G01R 19/16542; G01R 31/3835; H02J 7/007184; H02J 7/0047; Y02E 60/10
See application file for complete search history.

(56) References Cited

U.S. PATENT DOCUMENTS

2002/0075003 A1    6/2002    Fridman et al.
2010/0188054 A1    7/2010    Asakura et al.
(Continued)

FOREIGN PATENT DOCUMENTS

CA       2448277 A1    12/2002
CN       104749529 A    7/2015
(Continued)

OTHER PUBLICATIONS

Japanese Search Report for JP Patent Application No. PCT/JP2021/001294, mailed Apr. 6, 2021, 13 pages.
(Continued)

*Primary Examiner* — Hung Q Nguyen
(74) *Attorney, Agent, or Firm* — Jordan IP Law, LLC

(57) ABSTRACT

A measurement apparatus detects a voltage change in a power storage device. The measurement apparatus supplies constant current to the power storage device; measures voltage related to the power storage device supplied with the constant current; and detects the voltage change in the power storage device subjected to the measurement. The measurement apparatus also acquires the voltage change in the power storage device based on an electrical property serving as a reference of the power storage device.

24 Claims, 27 Drawing Sheets

(56) References Cited

U.S. PATENT DOCUMENTS

2017/0131363 A1    5/2017   Scott et al.
2018/0164373 A1*   6/2018   Wang .................. G01R 31/396
2019/0252890 A1    8/2019   Chen

FOREIGN PATENT DOCUMENTS

| CN | 110501656 A   |   | 11/2019 |
|----|---------------|---|---------|
| CN | 114175355 A   |   | 3/2022  |
| JP | H0973923 A    | * | 3/1997  |
| JP | 2005045950 A  |   | 2/2005  |
| JP | 2008123961 A  |   | 5/2008  |
| JP | 2009244180 A  | * | 10/2009 |
| JP | 2012141166 A  |   | 7/2012  |
| JP | 2013-55849 A  |   | 3/2013  |
| JP | 2015072148 A  |   | 4/2015  |
| JP | 2016122531 A  |   | 7/2016  |
| JP | 2019113469 A  |   | 7/2019  |
| JP | 202121685 A   |   | 2/2021  |
| JP | 202121686 A   |   | 2/2021  |
| WO | 2009013898 A1 |   | 1/2009  |
| WO | 2015129032 A1 |   | 9/2015  |

OTHER PUBLICATIONS

International Search Report for JP Patent Application No. PCT/JP2021/001294, mailed Apr. 6, 2021, 13 pages.

* cited by examiner

MEASUREMENT APPARATUS, AND MEASUREMENT METHOD

CROSS REFERENCE TO RELATED APPLICATIONS

The present application is a U.S. National Phase Patent Application, which claims the benefit of priority to International Patent Application No. PCT/JP2021/001294 filed on Jan. 15, 2021, which itself claims the priority of Japanese Patent Application No. 2020-006174 (filed on Jan. 17, 2020), Japanese Patent Application No 2020-006176 (filed on Jan. 17, 2020), and Japanese Patent Application No 2020-006179 (filed on Jan. 17, 2020), which are each hereby incorporated by reference in their respective entireties.

TECHNICAL FIELD

The present invention relates to a measurement apparatus that detects a voltage change in a power storage device, as well as to a measurement method therefor.

BACKGROUND ART

JP2015-072148A discloses an inspection method in which a pass/fail determination of a secondary battery is performed on the basis of a lowered amount of voltage of the secondary battery during an aging time. In this inspection method, an internal state of the secondary battery is estimated by storing the state of the secondary battery for a period of several days to several weeks in a state in which a positive electrode and a negative electrode are opened and by measuring the voltage after the voltage has been lowered due to self discharge.

SUMMARY OF INVENTION

In the inspection method disclosed in JP2015-072148A, it is necessary to store the secondary battery for several days to several weeks as the aging time until the voltage is lowered due to the self discharge. Therefore, it was difficult to acquire a state of a power storage device within a short period of time.

The present invention has been conceived in light of the problems mentioned above, and an object thereof is to acquire a state of a power storage device within a short period of time.

According to an aspect of the present invention, a measurement apparatus configured to measure the state of a power storage device is provided with: a supply device configured to supply constant current to the power storage device; a measurement device configured to measure voltage related to the power storage device supplied with the constant current; and a controller configured to detect the voltage change in the power storage device subjected to the measurement. The controller is provided with a processor, the processor being configured to compute an internal state of the power storage device based on the detected voltage change. The measurement apparatus is configured to acquire the voltage change in the power storage device on the basis of an electrical property serving as reference for the power storage device.

With such an aspect, by supplying the constant current to the power storage device, the voltage change in the power storage device in correlation with an internal state of the power storage device is increased. In this case, by detecting the voltage change in the power storage device on the basis of the electrical property serving as the reference of the power storage device, it becomes possible to acquire the voltage change in the power storage device with a high accuracy. Thus, it is possible to acquire the state of the power storage device within a short period of time.

DESCRIPTION OF EMBODIMENTS

In the following, a measurement apparatus according to each of embodiments of the present invention will be described with reference to the drawings. The measurement apparatus according to each embodiment functions as an apparatus (a control apparatus) that detects a voltage change in a power storage device. This apparatus supplies constant current to the power storage device, measures voltage related to the power storage device to which the constant current has been supplied, and detects the voltage change in the power storage device subjected to the measurement. Furthermore, the above-described apparatus acquires the voltage change in the power storage device on the basis of the electrical property serving as the reference of the power storage device. The electrical property serving as the reference of the power storage device described above includes the reference voltage serving as the reference for the voltage of the power storage device, a relationship between the voltage of the power storage device and an electrostatic capacitance component of the power storage device, a variation of open circuit voltage of the power storage device, and so forth.

First Embodiment

In the following, a measurement apparatus 1 of a power storage device 10 according to a first embodiment (hereinafter, simply referred to as "the measurement apparatus") will be described with reference to FIGS. 1 to 5.

Figure 1:
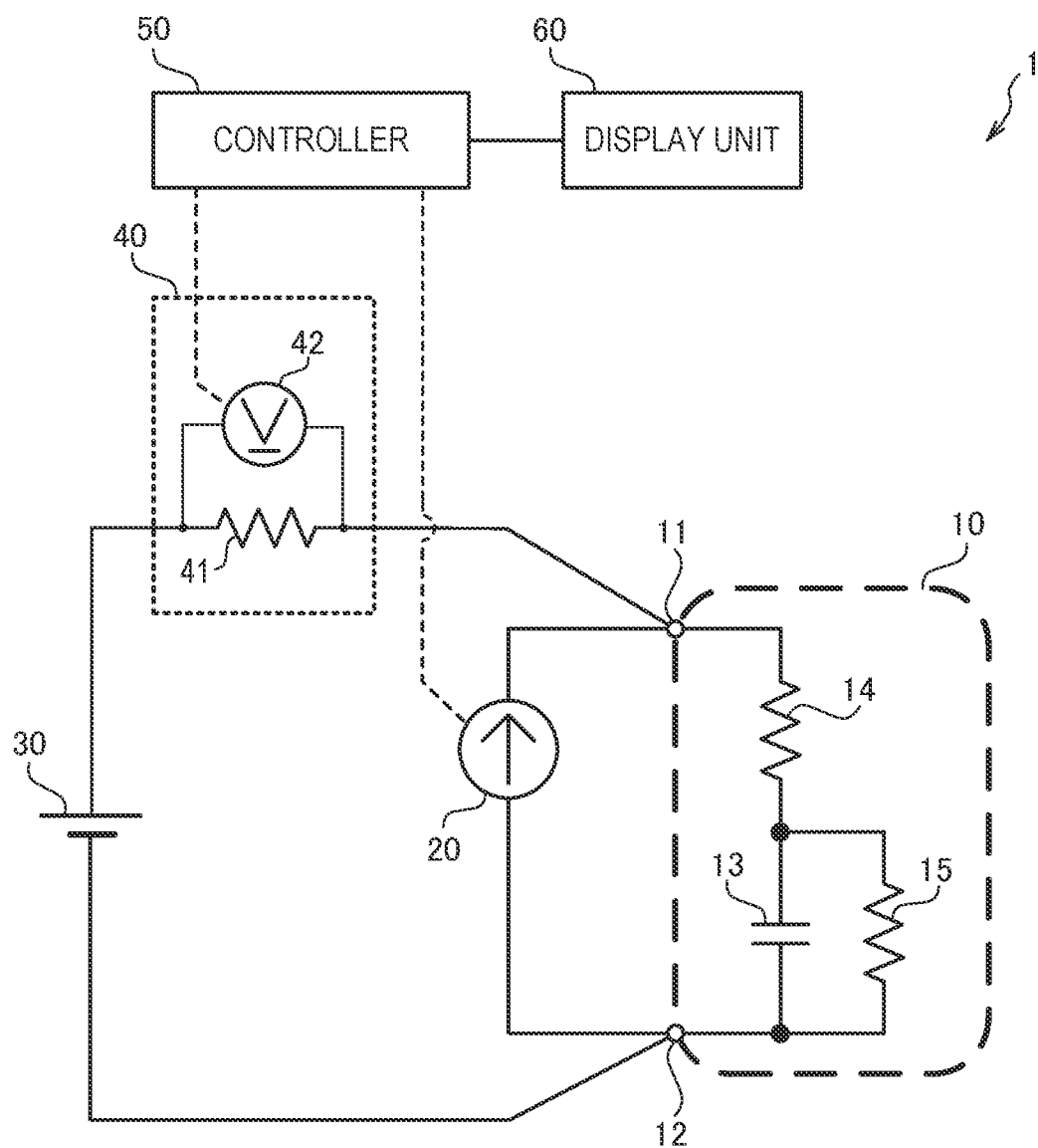
FIG. 1 is a diagram showing a configuration of a measurement apparatus of a power storage device according to a first embodiment.

The configuration of the power storage device 10 and the configuration of the measurement apparatus 1 will be described first with reference to FIG. 1. FIG. 1 is a diagram showing the configuration of the measurement apparatus 1.

The power storage device 10 is a single power storage cell of a lithium ion secondary battery, for example. The power storage device 10 is not limited to the secondary battery (chemical battery), and for example, it may be an electric double-layer capacitor. In addition, the power storage device 10 may also be a power storage module in which a plurality of power storage cells are connected in series.

As shown in FIG. 1, the power storage device 10 is shown by an equivalent circuit model. According to the equivalent circuit model, the power storage device 10 has a positive electrode 11, a negative electrode 12, a power storage unit 13, an internal resistance 14, and a parallel resistance 15. The power storage unit 13, the internal resistance 14, and the parallel resistance 15 are each an equivalent circuit expressing an internal state of the power storage device 10.

The power storage unit 13 is the electrostatic capacitance component of the power storage device 10. When a voltage higher than the cell voltage of the power storage device 10 is applied, charge is accumulated, and the power storage unit 13 is charged. In the power storage unit 13, when the flowing current is relatively low during the charging, an electrical double layer reaction is mainly caused, and when the flowing current is relatively high during the charging, the chemical reaction is mainly caused. In this description, an electrostatic capacitance of the power storage unit 13 is referred to as Cst [F], and the current flowing in the power storage unit 13 is referred to as Ist [A].

The internal resistance 14 is the series resistance that is connected to the power storage unit 13 in series between the positive electrode 11 and the negative electrode 12. In this description, a resistance value of the internal resistance 14 is referred to as Rir [mΩ], and the current flowing through the internal resistance 14 is referred to as Iir [A].

The parallel resistance 15 is a resistance that is connected to the power storage unit 13 in parallel, and is also referred to as a discharge resistance. Self discharge current, so-called leakage current flows through the parallel resistance 15. In this description, the resistance value of the parallel resistance 15 is referred to as Rpr [kΩ], and the self-discharge current flowing through the parallel resistance 15 is referred to as Ipr [A].

The measurement apparatus 1 is an apparatus for measuring the state of the power storage device 10. The measurement apparatus 1 is provided with a constant current source 20 serving as constant current supply means, a reference voltage source 30 serving as voltage generation means, a voltmeter 40 serving as measurement means, a controller 50 serving as computation means, and a display unit 60.

The constant current source 20 functions as supply means that supplies the constant current to the power storage device 10. The constant current source 20 is a DC power supply that charges the power storage device 10 by supplying the constant current, which is for detecting the internal state of the power storage device 10, to the power storage device 10. The constant current source 20 maintains the current to be supplied to the power storage device 10 at a predetermined level. The constant current source 20 charges the power storage device 10 by supplying the constant current at a level that is lower than overpotential and that mainly causes the electrical double layer reaction in the power storage device 10. At this time, the constant current supplied from the constant-current source 20 is 10 [μA], for example.

When the power storage device 10 is charged by applying the constant voltage to the power storage device 10, it is difficult to stably apply the constant voltage at a level that is lower than the overpotential and that mainly causes the electrical double layer reaction in the power storage device 10. In contrast, it is easier to supply a relatively low current by using the constant-current source 20. Thus, in the measurement apparatus 1, by using the constant current source 20, it is possible to stably supply the constant current at a level that is lower than the overpotential and that mainly causes the electrical double layer reaction in the power storage device 10.

The reference voltage source 30 generates the reference voltage serving as the reference for the voltage of the power storage device 10. The reference voltage source 30 in this embodiment is formed of a voltage generation circuit. The reference voltage of the reference voltage source 30 is set such that the electric potential difference between the voltage of the power storage device 10 and the reference voltage becomes lower than the voltage of the power storage device 10. For example, the reference voltage is set to the statistical value, such as the average value, the mode, the median, or the like for the voltage of a plurality of power storage devices 10.

The reference voltage in this embodiment is set to a value that falls within a predetermined range based on the voltage of the power storage device 10 as the reference. When the voltage of the power storage device 10 is about 3 V (volt), the predetermined range can be set to a range from "−1 V" to "+1 V" relative to the voltage of the power storage device 10.

In addition, from a view point of ensuring the resolution of the voltmeter 40, in a case in which the voltmeter 40 is a DC voltmeter with seven and a half digits (7½), it is preferable that the predetermined range described above be set to a range from "−100 mV" to "+100 mV" relative to the voltage of the power storage device 10. In a case in which the electric potential difference between the voltage of the power storage device 10 and the reference voltage is less than 100 mV, even if the resolution of the DC voltmeter with seven and a half digits (7½) is increased to 10 [nV], it is possible to detect the change in the thus-measured electric potential difference with a high accuracy.

Alternatively, in a case in which the DC voltmeter in which a measurement range can be narrowed to ±10 mV is used as the voltmeter 40, it is preferable that the predetermined range described above be set to a range from "−10 mV" to "+10 mV" relative to the voltage of the power storage device 10.

The voltmeter 40 functions as measurement means that measures the voltage related to the power storage device 10 supplied with the constant current. The voltmeter 40 is the DC voltmeter that measures the electric potential difference between the voltage of the power storage device 10 and the reference voltage of the reference voltage source 30. In other words, the voltmeter 40 mainly extracts the variation component from the voltage change in the power storage device 10 that is caused as the constant current is supplied from the constant current source 20 to the power storage device 10. The voltmeter 40 outputs the electric signal indicating the thus-measured electric potential difference in a time series to the controller 50. A part or all of a DC component of the voltage of the power storage device 10 is eliminated from the electric signal.

In this embodiment, the voltmeter 40 measures the electric potential difference between the voltage of the power storage device 10 and the reference voltage of the reference voltage source 30 at least twice including once in a state in which the constant current is supplied from the constant current source 20. The voltmeter 40 is provided with a resistance element 41 and a detector 42 that functions as element detection means.

The resistance element 41 is a detection resistance element that is connected between the positive electrode 11 of the power storage device 10 and a positive electrode of the reference voltage source 30. The resistance value of the resistance element 41 is from 1 [MΩ] to 10 [MΩ], inclusive, for example. The current flowing through the resistance element 41 is lower than the constant current supplied from the constant current source 20 to the power storage device 10.

From a view point of ensuring the measurement accuracy during the measurement of the internal state of the power storage device 10, it is preferable that the current flowing through the resistance element 41 be set so as to be lower than a few tenths of the constant current. In this embodiment, the resistance value of the resistance element 41 is set such that the current flowing through the resistance element 41 becomes about one-hundredth of the constant current. Therefore, the current flowing through the resistance element 41 is about 100 [nA].

As the electric potential difference between the voltage of the power storage device 10 and the reference voltage, the detector 42 detects the voltage generated at both ends of the resistance element 41. The detector 42 outputs the electric signal corresponding to the value of the thus-detected voltage to the controller 50.

The controller 50 functions as processing means that detects the voltage change in the power storage device 10 subjected to the measurement. The controller 50 is formed of a microcomputer provided with a central processing unit (a CPU), a read-only memory (a ROM), a random-access memory (a RAM), and an input-output interface (an I/O interface). The controller 50 may also be formed of a plurality of microcomputers. The controller 50 is the control apparatus that controls various kinds of operations of the measurement apparatus 1 by reading out a program stored in the ROM by the CPU.

The controller 50 controls a power supply from the constant current source 20 to the power storage device 10 and compute the internal state of the power storage device 10 by using the voltmeter 40. In other words, the controller 50 computes the internal state of the power storage device 10 on the basis of the electric potential difference measured by the voltmeter 40.

In this embodiment, the controller 50 acquires the electric signal from the voltmeter 40 in a state in which the constant current is supplied from the constant current source 20 to the power storage device 10 and detects the temporal change of the electric potential difference between the voltage of the power storage device 10 and the reference voltage indicated by the electric signal. The temporal change of the thus-detected electric potential difference is used as the variation component from which the voltage change in the power storage device 10, in other words, the DC component has been eliminated. The controller 50 estimates the internal state of the power storage device 10, such as a self discharge state, on the basis of the thus-detected voltage change in the power storage device 10.

For example, the controller 50 determines whether the internal state of the power storage device 10 is being passed or failed on the basis of the thus-detected voltage change in the power storage device 10. Alternatively, the controller 50 may calculate the self-discharge current flowing through the parallel resistance 15, the resistance value of the parallel resistance 15, or the electrostatic capacitance of the power storage unit 13 on the basis of the thus-detected voltage change in the power storage device 10.

In this embodiment, the controller 50 determines that the power storage device 10 is normal when the voltage change in the power storage device 10 falls within a normal range, and the controller 50 determines that the power storage device 10 is abnormal when the voltage change in the power storage device 10 does not fall within the normal range. As described above, the controller 50 determines whether the power storage device 10 is being passed or failed.

The controller 50 generates determination information indicating a determination result or internal information indicating a result of a calculation of the self-discharge current, etc. as the information related to the self discharge state of the power storage device 10. As described above, the controller 50 generates the information related to the self discharge state of the power storage device 10 on the basis of the electric potential difference between the voltage of the power storage device 10 and the reference voltage.

The display unit 60 notifies a user of the information, such as the determination result, the calculation result, or the like obtained from the controller 50, by displaying such information. The display unit 60 is a touch screen, for example, and is formed such that the information is visible to the user and it is operable by the user.

Figure 2:
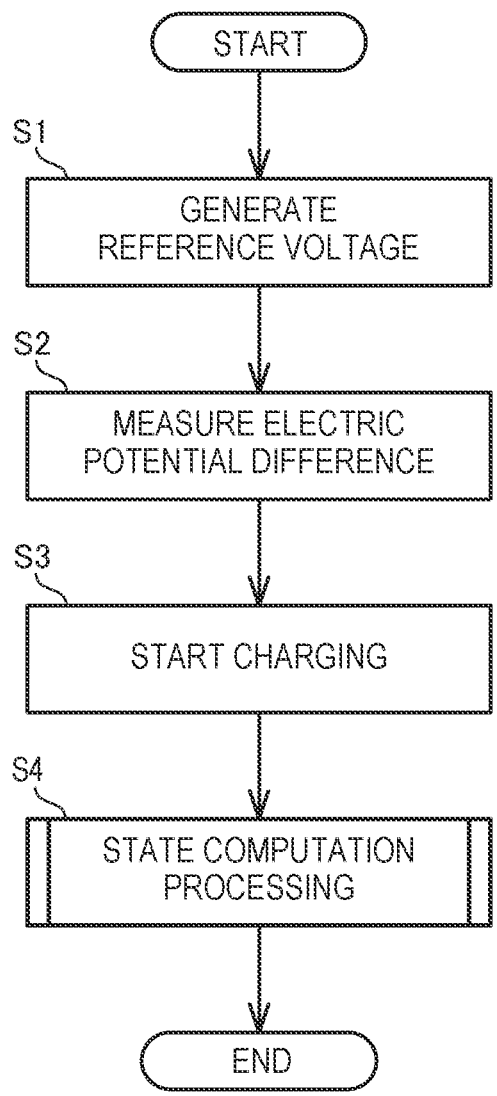
FIG. 2 is a flowchart showing a measurement method of the power storage device using the measurement apparatus according to the first embodiment.
Figure 3:
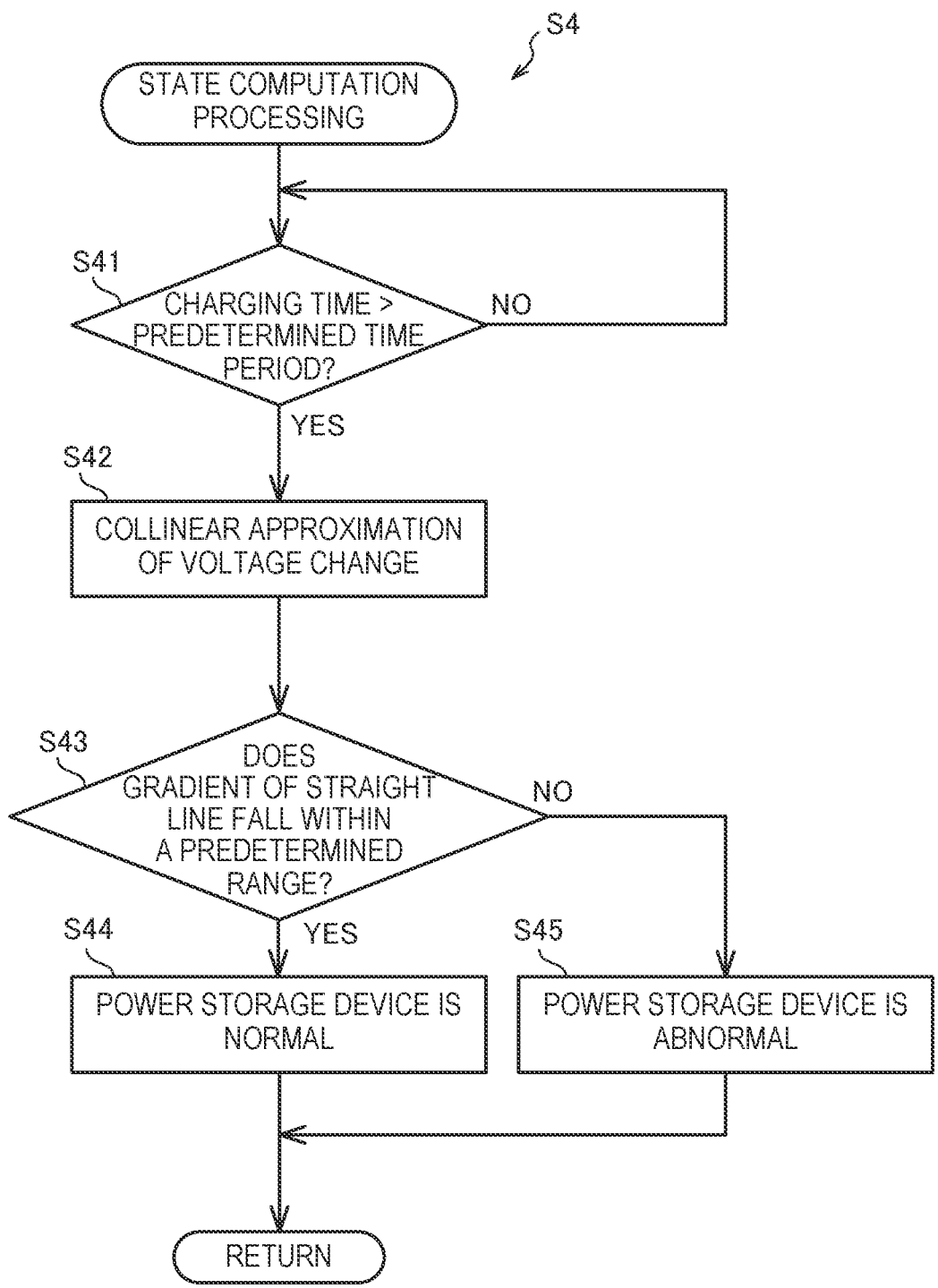
FIG. 3 is a flowchart showing an example of state computation processing included in the measurement method.
Figure 4:
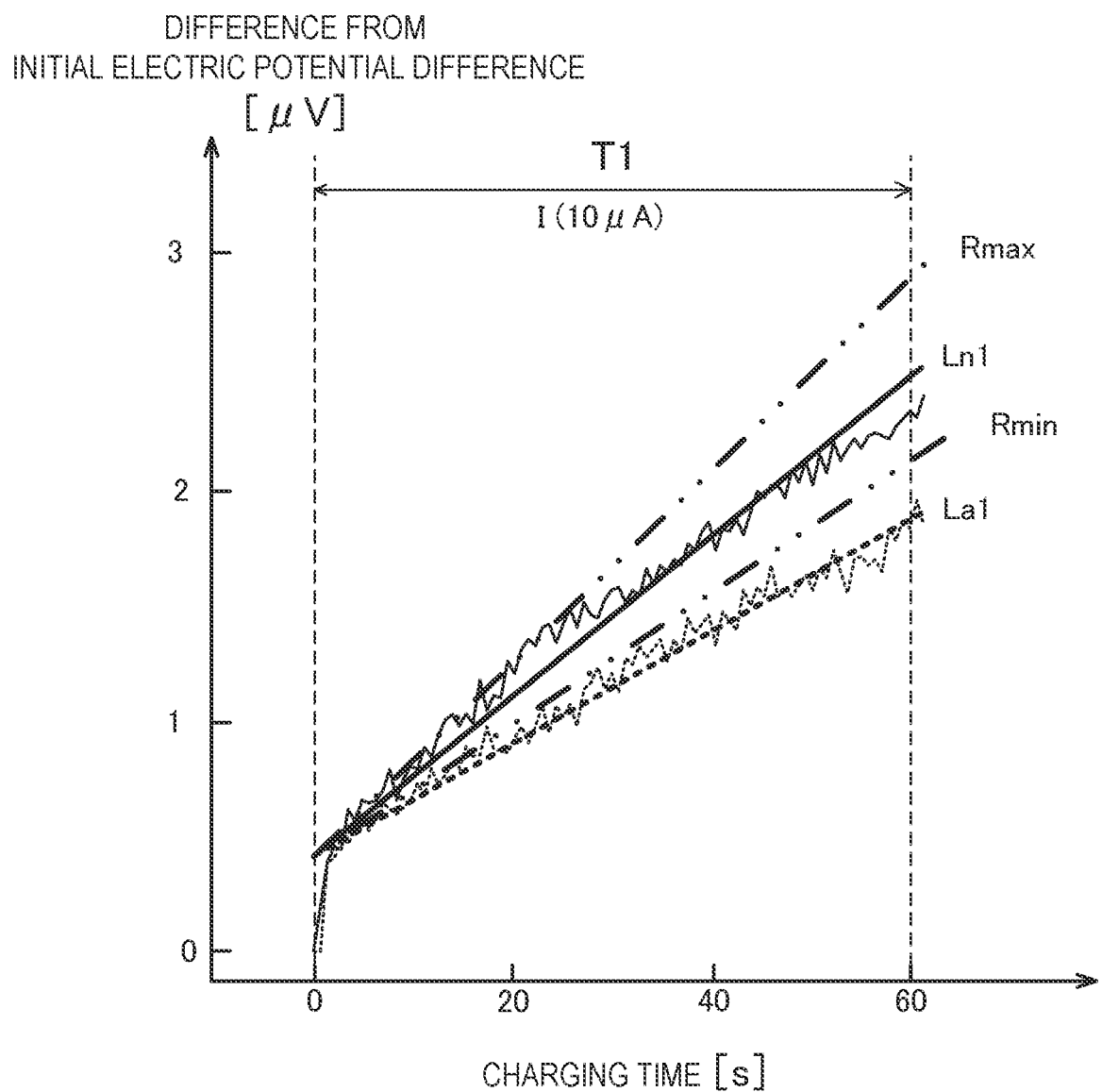
FIG. 4 is a diagram showing an example of a change in an electric potential difference between the voltage of the power storage device and a reference voltage against a charging time for the power storage device.
Figure 5:
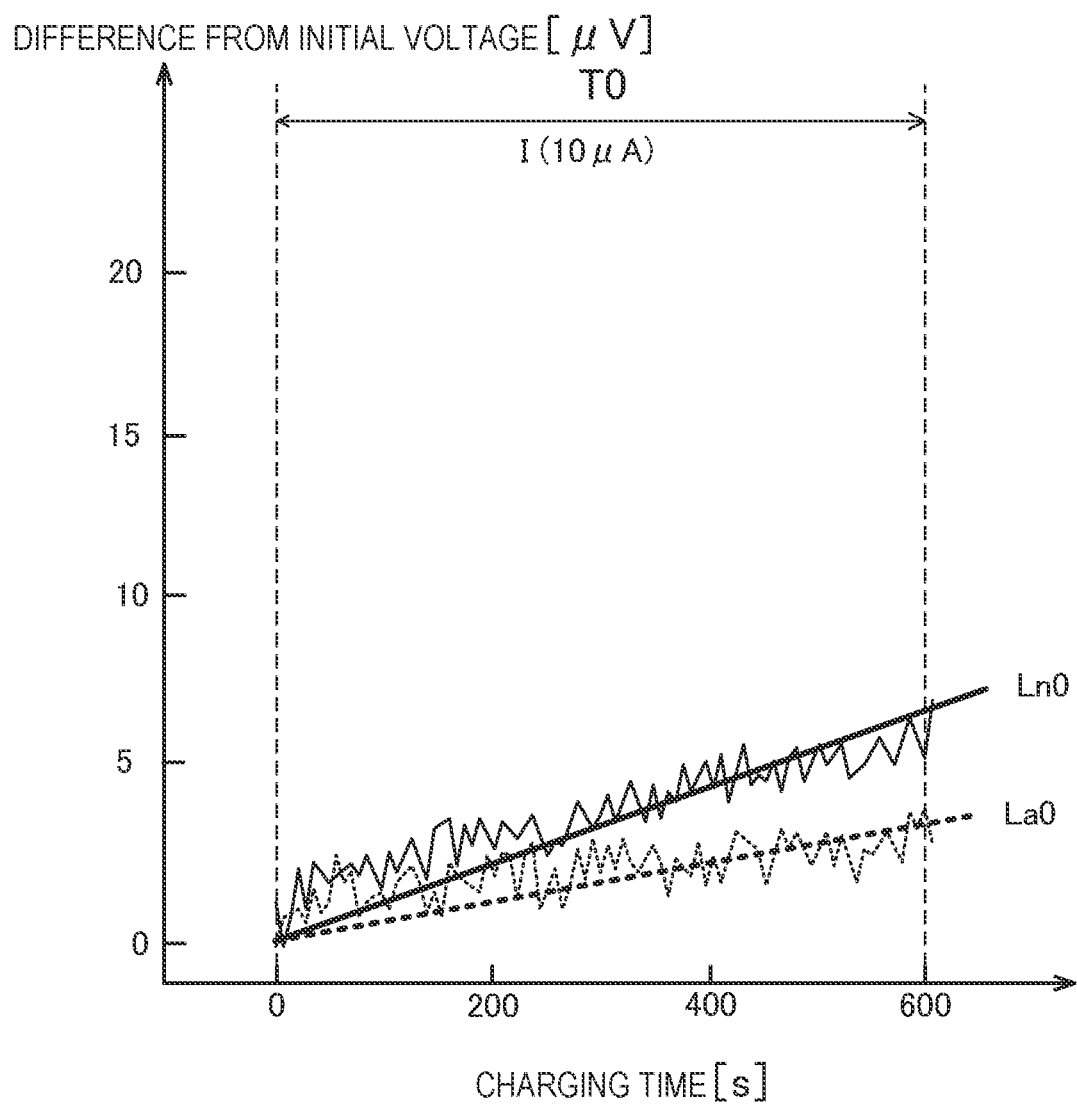
FIG. 5 is a diagram showing a comparative example of a voltage change in the power storage device against the charging time for the power storage device.

Next, a method of measuring the internal state of the power storage device 10 by using the measurement apparatus 1 will be described with reference to FIGS. 2 to 5. FIGS. 2 and 3 are flowcharts showing the measurement method that is performed by using the measurement apparatus 1 in this embodiment. FIG. 4 is a diagram showing an example of change in the electric potential difference between the voltage of the power storage device 10 and the reference voltage against the charging time for the power storage device 10. FIG. 5 is a diagram showing, as a comparative example, the change in the voltage itself of the power storage device 10 against the charging time for the power storage device 10.

In an example shown in FIG. 2, the measurement apparatus 1 executes a processing of measuring the state of the power storage device 10 in an environment in which a temperature change in the power storage device 10 is suppressed by, for example, storing the power storage device 10 in a constant temperature oven capable of maintaining a constant ambient temperature.

When the above-described processing is to be executed, the measurement apparatus 1 is connected to the power storage device 10. In this embodiment, the power storage device 10, the constant current source 20, the reference voltage source 30, and the voltmeter 40 are prepared, the constant current source 20 is connected to the power storage device 10 in parallel, and the voltmeter 40 is connected between the positive electrode 11 of the power storage device 10 and a positive electrode of the constant current source 20.

In Step S1, the reference voltage source 30 generates the reference voltage serving as the reference for the voltage of the power storage device 10. For example, the electrical power is supplied to the reference voltage source 30 by the controller 50.

In Step S2, the controller 50 causes the voltmeter 40 to measure the electric potential difference between the voltage of the power storage device 10 and the reference voltage of the reference voltage source 30. By doing so, the electric signal corresponding to the electric potential difference between the voltage of the power storage device 10 and the reference voltage is input to the controller 50 by the voltmeter 40.

In Step S3, the controller 50 starts the charging by supplying the constant current from the constant current source 20 to the power storage device 10.

In Step S4, the controller 50 executes a state computation processing that computes the internal state of the power storage device 10 on the basis of the electric potential difference between the voltage of the power storage device 10 and the reference voltage indicated by the electric signal. The state computation processing will be described later with reference to FIG. 3.

Once the processing in Step S4 is completed, a series of processing procedures for the measurement method in this embodiment is finished.

FIG. 3 shows an example of the state computation processing that is executed in Step S4. In this example, as the state computation processing (S4), the controller 50 determines whether the power storage device 10 is being passed or failed on the basis of the electric potential difference between the voltage of the power storage device 10 and the reference voltage.

In Step S41, the controller 50 determines whether or not the charging time, which is the elapsed time since the start of the charging, has exceeded a predetermined time. The predetermined time period is set in advance to such a duration that the difference in the temporal change in the electric potential difference between the case in which the power storage device 10 is normal and the case in which the power storage device 10 is abnormal becomes apparent in a state in which, for example, the resolution of the voltmeter 40 is increased to the limit of the resolution at which the electric potential difference can be measured.

In Step S41, when it is determined that the charging time has not exceeded the predetermined time, the controller 50 waits until it is determined that the charging time has exceeded the predetermined time. On the other hand, when it is determined that the charging time has exceeded the predetermined time, the process proceeds to Step S42 in the controller 50.

As described above, the voltmeter 40 measures the initial electric potential difference and the charged electric potential difference. The initial electric potential difference is the electric potential difference at the start of the supply of the constant current (at the start of the charging), and the charged electric potential difference is the electric potential difference at a state in which the constant current is supplied from the constant current source 20. In other words, the voltmeter 40 measures the electric potential difference between the voltage of the power storage device 10 and the reference voltage at least twice including once in a state in which the constant current is supplied from the constant current source 20.

In Step S42, the controller 50 detects the voltage change in the power storage device 10 on the basis of the electric potential difference between the voltage of the power storage device 10 and the reference voltage that has been measured by using the voltmeter 40. Specifically, the controller 50 obtains the approximate straight line for the voltage change in the power storage device 10 on the basis of the initial electric potential difference at the start of the charging and of the charged electric potential difference at a state in which the constant current is supplied from the constant current source 20. More specifically, the controller 50 obtains the approximate straight line for the voltage change in the power storage device 10 using, for example, the least squares analysis on the basis of the electric potential differences measured at every control period.

Alternatively, the controller 50 may detect the voltage change in the power storage device 10 from the difference between the initial electric potential difference at the start of the charging and the charged electric potential difference at a state in which the constant current is supplied from the constant current source 20. In this case, because it suffices to measure the voltage of the power storage device 10 twice by the voltmeter 40, the electric potential difference measurement may also be performed after being switched by using a multiplexer, for example. Thus, it is possible to simplify the measurement apparatus 1.

In Step S43, the controller 50 determines whether or not the gradient of the approximate straight line falls within the predetermined range. When it is determined that the gradient of the approximate straight line falls within the predetermined range between an upper limit value and a lower limit value, because the power storage device 10 is in a normal state, the process proceeds to Step S44 in the controller 50. On the other hand, in Step S43, when it is determined that the gradient of the approximate straight line does not fall within the predetermined range, in other words, when it is determined that the gradient is larger than the upper limit value of the predetermined range, or the gradient is smaller than the lower limit value of the predetermined range, because the power storage device 10 is in an abnormal state, the process proceeds to Step S45 in the controller 50.

The processings in Steps S42 and S43 will be described with reference to the specific examples shown in FIGS. 4 and 5. The horizontal axes in FIGS. 4 and 5 both indicate the charging time [s] that is the elapsed time since the start of the charging of the power storage device 10.

In an example shown in FIG. 4, the electric potential difference between the voltage of the power storage device 10 and the reference voltage is measured by the voltmeter 40, and because the DC component of the thus-measured electric potential difference is relatively small, the resolution of the voltmeter 40 is set to 10 [nV]. The vertical axis in FIG. 4 indicates the difference [μV] between the charged electric potential difference and the initial electric potential difference measured by the voltmeter 40.

The data shown by a solid line in FIG. 4 indicates the change in the electric potential difference when the power storage device 10 is in the normal state, and the straight solid line is the approximate straight line Ln1 for the change in the electric potential difference that is obtained in the processing in Step S42. On the other hand, the data shown by the dotted line in FIG. 4 indicates the change in the electric potential difference when the power storage device 10 is in the abnormal state, and a straight broken line indicates the approximate straight line La1 for the change in the electric potential difference obtained in the processing in Step S42. In the following, the gradient of the approximate straight line Ln1 is referred to as Rn, and the gradient of the approximate straight line La1 is referred to as Ra.

In addition, two two-dot chain straight lines shown in FIG. 4 respectively indicate an upper limit value Rmax and a lower limit value Rmin of the gradient of the approximate straight line, and the gradient for the power storage device 10 in the normal state lies between the two two-dot chain straight lines. The upper limit value Rmax and the lower limit value Rmin of the gradient of the approximate straight line are set at ±10%, for example, of the approximate straight line that is measured and obtained in advance by using the power storage device 10 in the normal state.

Referring to FIG. 4, the approximate straight line Ln1 (the gradient Rn) shown by the solid line lies between the upper limit value Rmax and the lower limit value Rmin of the gradient of the approximate straight line. Thus, the controller 50 determines that the power storage device 10 is in the normal state. On the other hand, the approximate straight line La1 (the gradient Ra) shown by the broken line does not lie between the upper limit value Rmax and the lower limit value Rmin of the gradient of the approximate straight line. Thus, the controller 50 determines that the power storage device 10 is in the abnormal state.

As described above, the controller 50 determines whether the power storage device 10 is in the normal state or in the abnormal state on the basis of whether or not the gradient of the approximate straight line lies between the upper limit value Rmax and the lower limit value Rmin. In other words, the controller 50 detects the voltage change in the power storage device 10 from which most of the DC component has been eliminated on the basis of the electric potential difference between the voltage of the power storage device 10 subjected to the measurement and the reference voltage, and the controller 50 determines that the power storage device 10 is normal when the voltage change falls within the normal range.

In an example shown in FIG. 4, although it takes a measurement time T1 of 60 [s] to perform a pass/fail determination of the power storage device 10, a gradient difference between the approximate straight line Ln1 shown by the solid line and the approximate straight line La1 shown by the broken line can clearly be checked after about 20 [s] has elapsed. As described above, in the measurement apparatus 1, the pass/fail determination of the power storage device 10 can be executed within a short period of time of about several tens of seconds.

On the other hand, in FIG. 5, as the comparative example, the voltage itself of the power storage device 10 was measured, and the DC component is not eliminated, and so, the resolution of the voltmeter is set to 10 [μV]. The vertical axis in FIG. 5 indicates the difference [μV] between the charging voltage that is the voltage of the power storage device 10 and the open circuit voltage (OCV) of the power storage device 10 in a state in which the constant current is supplied from the constant current source 20.

The data shown by the solid line indicates the voltage change when the power storage device 10 is in the normal state, and the straight solid line is the approximate straight line Ln0 for the voltage change that is obtained in the processing in Step S42. On the other hand, the data shown by the dotted line in FIG. 5 indicates the voltage change when the power storage device 10 is in the abnormal state, and the straight broken line is the approximate straight line La0 for the voltage change that is obtained in the processing in Step S42.

In the measurement of the voltage itself of the power storage device 10, because the DC component in the voltage change in the power storage device 10 is large compared with a case in which the electric potential difference between the voltage of the power storage device 10 and the reference voltage is measured, an influence of an internal noise of the voltmeter is increased as the resolution of the voltmeter is increased. Thus, in an example shown in FIG. 5, the resolution of the voltmeter is set so as to be lower compared with the example shown in FIG. 4.

As a result, as shown in FIG. 5, it takes a measurement time T0 of 600 [s] to perform the pass/fail determination of the power storage device 10. Because the gradient difference between the approximate straight line Ln0 shown by the solid line and the approximate straight line La0 shown by the broken line can clearly be checked after about 200 [s] has elapsed, the pass/fail determination can also be executed within a short period of time of about a few minutes. However, in the procedure in which the voltage itself of the power storage device 10 is measured, it can be seen that the time required to perform the pass/fail determination of the power storage device 10 is about ten times longer when compared with the measurement time T1 in this embodiment shown in FIG. 4.

As described above, in this embodiment, the power storage device 10 is charged by the constant current from the constant current source 20, and the voltage change in the power storage device 10 is detected by measuring the voltage at least twice including once in a state in which the constant current is supplied. It is determined whether or not the thus-detected voltage change in the power storage device 10 falls within the normal range, and when the voltage change falls within the normal range, the power storage device 10 is determined as being normal. Therefore, because there is no need to wait until the voltage of the power storage device 10 is lowered by the self discharge, a time required to perform the pass/fail determination of the power storage device 10 is short.

In addition, in this embodiment, by measuring the electric potential difference between the voltage of the power storage device 10 and the reference voltage by using the voltmeter 40, compared with a case in which the voltage itself of the power storage device 10 is measured, it is possible to increase the resolution of the voltmeter 40 while suppressing the influence of the internal noise of the voltmeter 40. Thus, it is possible to reduce the time required to perform the pass/fail determination of the power storage device 10.

Therefore, it is possible to perform the pass/fail determination of the power storage device 10 within a short period of time.

At this time, the constant current source 20 charges the power storage device 10 by supplying the constant current at a level that is lower than the overpotential and that mainly causes the electrical double layer reaction in the power storage device 10. Thus, because the level of the constant current is low, the percentage of the current Ist [A] flowing through the power storage unit 13 with respect to the current Ipr[A] flowing through the parallel resistance 15 is increased. Therefore, the difference in the gradient of the charge curve between the presence/absence of the parallel resistance 15 is increased, and so, it is easy to determine whether or not the power storage device 10 is normal.

Referring back to FIG. 3, once the processing in Step S43 is finished, the process proceeds to Step S44 in the controller 50.

In Step S44, the controller 50 notifies the user that the power storage device 10 is in the normal state by displaying it on the display unit 60. On the other hand, in Step S45, the controller 50 notifies the user that the power storage device 10 is in the abnormal state by displaying it on the display unit 60.

By executing the state computation processing (S4) described above, the pass/fail determination of the power storage device 10 is completed.

In the above-mentioned embodiment, the voltmeter 40 measures, as the initial electric potential difference, the electric potential difference between the voltage of the power storage device 10 and the reference voltage after the charging of the power storage device 10 has been started. Alternatively, the voltmeter 40 may measure, as the initial electric potential difference, the electric potential difference between the voltage of the power storage device 10 and the reference voltage before the charging of the power storage device 10 is started. Also in this case, because it is possible to measure the electric potential difference between the voltage of the power storage device 10 and the reference voltage at least twice including once in a state in which the constant current is supplied, it is possible to obtain the approximate straight line for the voltage change in the power storage device 10.

Next, operational advantages according to the first embodiment will be described.

The measurement apparatus 1, 1A in this embodiment forms the apparatus that detects the voltage change in the power storage device 10. The measurement apparatus 1 is provided with: the constant current source 20 (the supply means) configured to supply the constant current to the power storage device 10; the voltmeter 40 (the measurement means) configured to measure the voltage related to the power storage device 10 supplied with the constant current; and the controller 50 (the processing means) configured to detect the voltage change in the power storage device 10 subjected to the measurement. The measurement apparatus 1 acquires the voltage change in the power storage device 10 on the basis of the electrical property serving as the reference of the power storage device 10. The electrical property serving as the reference of the power storage device 10 includes the reference voltage serving as the reference for the voltage of the power storage device 10, the relationship between output voltage and the electrostatic capacitance of the power storage device 10, the variation in the open circuit voltage of the power storage device 10, and so forth.

In addition, the method for detecting the voltage change in the power storage device 10 in this embodiment includes a step of supplying the constant current to the power storage device 10, a step of measuring the voltage related to the power storage device 10 supplied with the constant current, and the step of detecting the voltage change in the power storage device that has been measured. In this method, the voltage change in the power storage device 10 that is changed in response to the level of the self-discharge current or the discharge resistance of the power storage device 10 is acquired on the basis of the electrical property serving as the reference of the power storage device 10.

According to these configurations, by supply the constant current to the power storage device 10, the voltage change in the power storage device 10 in correlation with the internal state of the power storage device 10, in this embodiment, the gradient of the approximate straight line is increased. In this case, by detecting the voltage change in the power storage device 10 on the basis of the electrical property serving as the reference of the power storage device 10, it is possible to acquire the voltage change in the power storage device 10 with a high accuracy. Therefore, it is possible to acquire the state of the power storage device 10 within a short period of time and with a high accuracy.

In addition, the measurement apparatus 1, 1A in this embodiment detects the voltage change in the power storage device 10 supplied with the constant current by measuring the electric potential difference between the voltage of the power storage device 10 and the reference voltage on the basis of the reference voltage serving as the reference for the voltage of the power storage device 10. Specific description thereof is as follows.

The measurement apparatus 1 that measures the state of the power storage device 10 in this embodiment is provided with the constant current source 20 that supplies the constant current to the power storage device 10 and the reference voltage source 30 that generates the reference voltage serving as the reference for the voltage of the power storage device 10. Furthermore, the measurement apparatus 1 is provided with the voltmeter 40 that measures the electric potential difference between the voltage of the power storage device 10 and the reference voltage and the controller 50 that computes the internal state of the power storage device 10 on the basis of the change in the thus-measured electric potential difference.

In addition, the measurement method that measures the state of the power storage device 10 includes a step of generating the reference voltage serving as the reference for the voltage of the power storage device 10. Furthermore, the measurement method includes the step of supplying the constant current to the power storage device 10, a step of measuring the electric potential difference between the voltage of the power storage device 10 and the reference voltage, and a step of computing the internal state of the power storage device 10 on the basis of the change in the thus-measured electric potential difference.

The voltage change in the power storage device 10 is changed in accordance with differences in the internal state of the power storage device 10. Therefore, according to the configuration described above, because the voltage change in the power storage device 10 is increased as the constant current is supplied to the power storage device 10, it is possible to reduce the time required to measure the internal state of the power storage device 10.

In addition, according to the configuration described above, instead of directly measuring the voltage of the power storage device 10, the electric potential difference between the voltage of the power storage device 10 and the reference voltage is measured, and so, it is possible to mainly extract the variation component with respect to the voltage of the power storage device 10. Thus, it becomes possible to increase the resolution of the voltmeter 40, and so, it is possible to rapidly estimate the voltage change in the power storage device 10.

As described above, because it becomes possible to increase the resolution of the voltmeter 40 while increasing the voltage change in the power storage device 10 due to the differences in the internal state, it is possible to measure the state of the power storage device 10 within a short period of time.

Furthermore, according to the configuration described above, compared with a case in which the constant voltage is supplied to the power storage device 10, it is easier to supply a relatively low current to the power storage device 10 by using the constant current source 20. Thus, in the measurement apparatus 1, by using the constant current source 20, it is possible to stably supply the constant current at a level that is lower than the overpotential and that mainly causes the electrical double layer reaction in the power storage device 10.

In addition, the voltmeter 40 in this embodiment is provided with the resistance element 41 that is connected between the respective positive electrodes of the power storage device 10 and the reference voltage source 30 and the detector 42 that detects the voltage generated at the resistance element 41 as the electric potential difference between the voltage of the power storage device 10 and the reference voltage.

With such a configuration, by providing the resistance element 41 having a relatively large resistance value, it is possible to suppress the leakage current flowing from the constant current source 20 to the voltmeter 40 and excessive current flowing from the reference voltage source 30 to the power storage device 10. Thus, it is possible to suppress deterioration of an estimation accuracy for the internal state of the power storage device 10.

In addition, the current flowing through the resistance element 41 in this embodiment is lower than the constant current supplied from the constant current source 20.

With such a configuration, because the current lower than the constant current flows through the resistance element 41, an excess or deficiency of the constant current to be supplied to the power storage device 10 is suppressed, and therefore, it is possible to suppress the deterioration of the measurement accuracy of the power storage device 10.

In addition, the reference voltage generated by the reference voltage source 30 in this embodiment is set such that the voltage generated at both ends of the resistance element 41 is lower than the voltage of the power storage device 10.

With such a configuration, compared with a case in which the voltage of the power storage device 10 is directly measured, the DC component in the voltage change in the power storage device 10 is decreased, and so, it becomes possible to increase the resolution of the voltmeter 40 in a corresponding manner. Therefore, it is possible to detect the voltage change in the power storage device 10 within a short period of time while suppressing the internal noise of the voltmeter 40.

In addition, the constant current source 20 in this embodiment supplies the constant current at a level that is lower than the overpotential and that mainly causes the electrical double layer reaction in the power storage device 10.

With such a configuration, because the level of the constant current is relatively low, the percentage of the current Ist [A] flowing through the power storage unit 13 with respect to the current Ipr [A] flowing through the parallel resistance 15 is increased. Therefore, the difference in the gradient of the charge curve between the presence/absence of the parallel resistance 15 is increased, and so, it is easy to determine whether or not the power storage device 10 is normal.

In addition, the controller 50 in this embodiment generates the information related to the self discharge state of the power storage device 10 on the basis of the change in the electric potential difference measured by the voltmeter 40. For example, the controller 50 outputs a result of the pass/fail determination of the power storage device 10 as the information related to the self discharge state of the power storage device 10.

With such a configuration, because it becomes possible to increase the resolution of the voltmeter 40 by measuring the electric potential difference between the voltage of the power storage device 10 and the reference voltage, it is possible to reduce the time required for detecting the voltage change in the power storage device 10. Thus, it becomes possible to generate the internal information related to self discharge information of the power storage device 10 within a short period of time.

In addition, the voltmeter 40 measures the initial electric potential difference at the start of the supply of the constant current and the charged electric potential difference at a state in which the constant current is supplied from the constant current source 20, and the controller 50 detects the voltage change in the power storage device 10 on the basis of the initial electric potential difference and the charged electric potential difference.

With such a configuration, the controller 50 can detect the voltage change from the difference between the initial electric potential difference at the start of the supply of the constant current and the charged electric potential difference at a state in which the constant current is supplied from the constant current source 20. In this case, because it suffices to measure the electric potential difference between the voltage of the power storage device 10 and the reference voltage at least twice by using the voltmeter 40, the measurement may also be performed after being switched by using the multiplexer, for example. Thus, it is possible to simplify the measurement apparatus 1.

Second Embodiment

Figure 6:
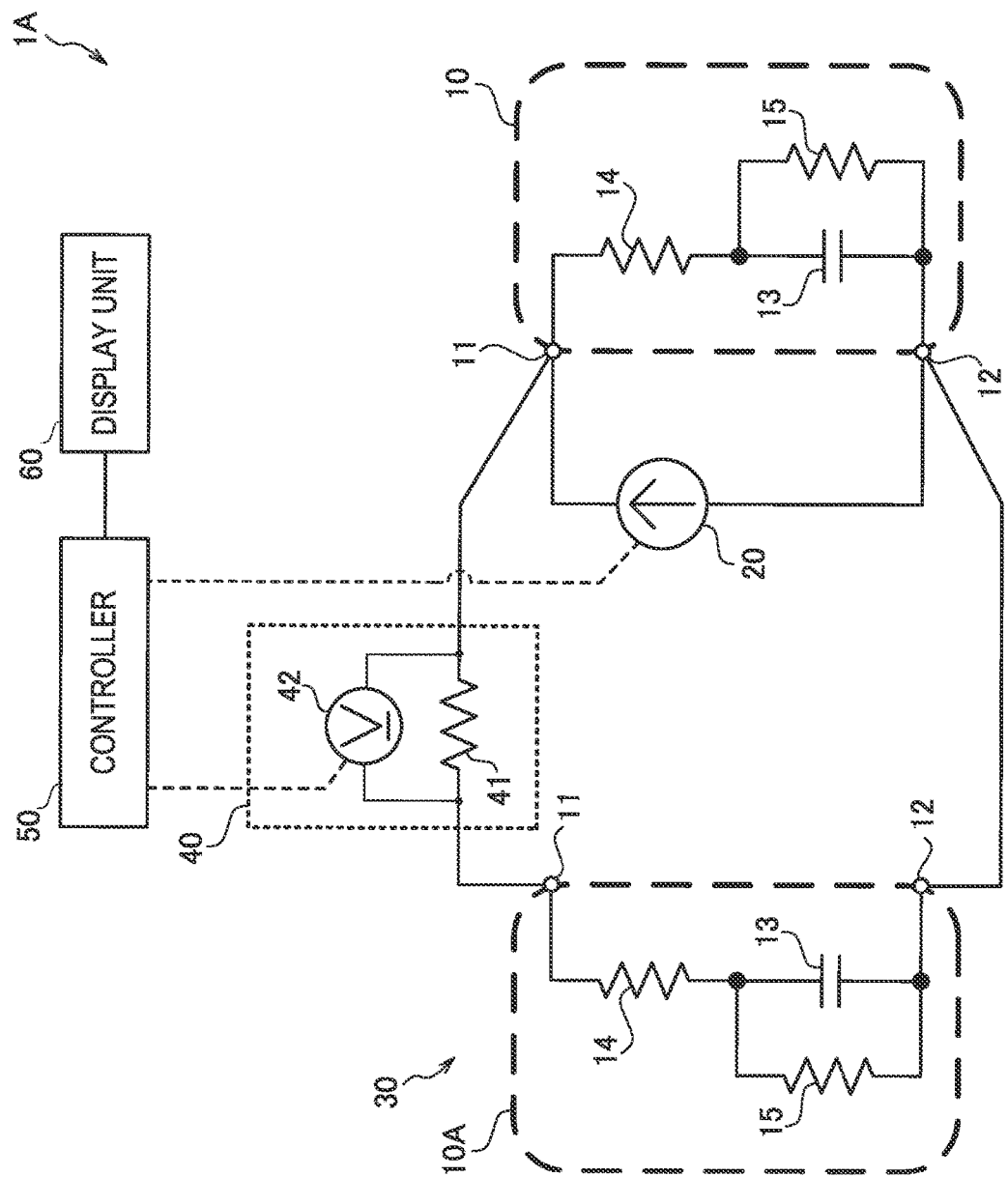
FIG. 6 is a diagram showing a configuration of the measurement apparatus of the power storage device according to a second embodiment.

Next, the reference voltage source 30 of a measurement apparatus 1A according to a second embodiment will be described with reference to FIG. 6. FIG. 6 is a diagram showing a configuration of the measurement apparatus 1A. This embodiment differs from the first embodiment in that another power storage device 10A is used as the reference voltage source 30.

The reference voltage source 30 in this embodiment is the other power storage device 10A that is of the same type as the power storage device 10. The power storage device 10A generates the reference voltage serving as the reference for the voltage of the power storage device 10 that is a measurement target.

For the pass/fail determination of the power storage device 10, it is expected that the numerous power storage devices 10, 10A are located under the same environment. For the power storage devices 10, 10A, the respective internal states of the power storage devices 10, 10A undergo changes in a similar manner with each other as the ambient temperature, the ambient humidity, and so forth are changed.

For example, as the amount of change in the internal temperature of the power storage device 10 is increased along with the change in the ambient temperature, the gradient for the voltage change in the power storage device 10 is also caused to be changed. As a countermeasure against this problem, in this embodiment, the voltage of the other power storage device 10A that is located under the same environment as the power storage device 10 is used as the reference voltage of the power storage device 10.

The environmental variable components in the voltage change in the power storage device 10 associated with the difference in the ambient temperature and the ambient humidity are superimposed also in the voltage of the power storage device 10A in a similar manner. Thus, when the voltage change in the power storage device 10 is to be detected, by measuring the electric potential difference between the voltage of the power storage device 10 and the voltage of the power storage device 10A, the environmental variable components in the voltage of the power storage device 10 are mainly eliminated, and so, it is possible to increase the detection accuracy of the voltage change.

As described above, according to the second embodiment, when the electric potential difference between the voltage of the power storage device 10 and the reference voltage is to be measured, because the voltage of the power storage device 10A is used as the reference voltage, it is possible to reduce the variation of the voltage change in the power storage device 10 due to differences in measurement environment.

In addition, by using the other power storage device 10A as the reference voltage source 30, compared with a case in which the voltage generation circuit is used, it is possible to configure the measurement apparatus 1A more simply. Therefore, it is possible to measure the internal state of the power storage device 10 with a high accuracy while configuring the measurement apparatus 1A in a simple manner.

Third Embodiment

Next, the controller 50 of the measurement apparatus 1 according to a third embodiment will be described. In the following, the resistance value of the parallel resistance 15 is referred to as a discharge resistance Rpr, and the current flowing through the parallel resistance 15 is referred to as a self-discharge current Ipr.

The controller 50 according to this embodiment differs from those in the first and the second embodiments in that the discharge resistance Rpr or the self-discharge current Ipr of the power storage device 10 is computed.

The constant current supplied from the constant current source 20 to the power storage device 10 is switched between the constant current indicating a first current value and the constant current indicating the second current value by the controller 50. In the following, the constant current indicating the first current value is also simply referred to as "a first constant current", and the constant current indicating the second current value is also simply referred to as "a second constant current".

In this embodiment, similarly to the constant current in the first embodiment, the first current value is set to one or several times the reference value of the self-discharge current Ipr of the power storage device 10. For example, the first current value is set to 10 [μA] that is one times the reference value of the self-discharge current Ipr. In addition, the second current value is set to at least ten times the reference value of the self-discharge current Ipr of the power storage device 10. For example, the second current value is set to fifty times the reference value of the self-discharge current Ipr.

The reference value of the self-discharge current Ipr as described above is known information, and is, for example, set in advance by using the statistical data obtained by aggregating the self-discharge current Ipr of the numerous power storage devices 10, test results for the self-discharge current Ipr of the specific power storage device 10 whose electrical property is normal, or the like.

Next, the controller 50 detects the voltage change in the power storage device 10 on the basis of the electric potential difference between the voltage of the power storage device 10 and the reference voltage for every constant current supplied from the constant current source 20 to the power storage device 10.

In this embodiment, as shown in FIG. 4, the controller 50 obtains, for every constant current, the gradient for the voltage change in the power storage device 10 on the basis of the initial electric potential difference at the start of the supply of the constant current and the charged electric potential difference at a state in which the constant current is supplied from the constant current source 20. Alternatively, the controller 50 may obtain, for every constant current supplied to the power storage device 10, the approximate straight line Ln1 for the voltage change in the power storage device 10 and may use the gradient of the approximate straight line Ln1 thereof as the gradient for the voltage change.

The controller 50 computes the self-discharge current Ipr of the power storage device 10 by using the gradient for the voltage change in the power storage device 10 that is obtained for every constant current and a numerical equation for obtaining an electrostatic capacitance Cst of the power storage unit 13 of the power storage device 10. A computing procedure of the self-discharge current Ipr of the power storage device 10 will be described below.

The numerical equation for obtaining the electrostatic capacitance Cst of the power storage unit 13 can be expressed by using the gradient A1 for the voltage change at the time when the power storage device 10 is charged with the constant current indicating a first current value I1 and the current Ist [A] charged to the power storage unit 13. The current Ist [A] charged to the power storage unit 13 is charged amount accumulated in the electrostatic capacitance Cst per unit time, and the current Ist [A] corresponds to the value (I1−Ipr) obtained by subtracting, the self-discharge current Ipr flowing through the parallel resistance 15 from the first current value I1 that is the current flowing through the internal resistance 14 shown in FIG. 1.

Therefore, the numerical equation for obtaining the electrostatic capacitance Cst of the power storage unit 13 can be expressed as in the following equation (1) by using the self-discharge current Ipr of the power storage device 10, the first current value I1, and the gradient A1 for the voltage change at the time when the power storage device 10 is charged with the first constant current.

[Numerical Equation 1]

$$C_{st} = \frac{I_1 - I_{pr}}{A1} \quad (1)$$

Furthermore, the numerical equation for obtaining the electrostatic capacitance Cst of the power storage unit 13 can be expressed as in the following equation (2) by using a second current value I2 and the gradient A2 for the voltage change at the time when the power storage device 10 is charged with the constant current indicating the second current value I2.

[Numerical Equation 2]

$$C_{st} = \frac{I_2}{A2} \quad (2)$$

For the above-described equation (2), the current Ist [A] charged to the power storage unit 13 corresponds to the value (I2−Ipr) obtained by subtracting the self-discharge current Ipr from the current value I2 of the second constant current supplied to the power storage device 10. However, as described above, because the current value I2 of the second constant current flowing through the internal resistance 14 shown in FIG. 1 is sufficiently larger than the self-discharge current Ipr flowing through the parallel resistance 15, it can be approximated as in the following equation (3).

[Numerical Equation 3]

$$I_2 \approx (I_2 - I_{pr}) \quad (3)$$

Therefore, in the above-described equation (2), the current value I2 of the second constant current is used instead of the current value (I2−Ipr) obtained by subtracting the self-discharge current Ipr from the current value I2 of the second constant current.

Next, by solving the equation (1) and equation (2) for the self-discharge current Ipr, the following equation (4) is derived.

[Numerical Equation 4]

$$I_{pr} = I_1 - \frac{A1}{A2} I_2 \quad (4)$$

As described above, by substituting the gradients A1 and A2 of the voltage change obtained for every constant current and the current values I1 and I2 of the constant currents into the numerical equation for obtaining the electrostatic capacitance Cst of the power storage unit 13, it is possible to calculate the self-discharge current Ipr of the power storage device 10.

Next, the controller 50 calculates the discharge resistance Rpr of the power storage device 10 on the basis of the thus-calculated self-discharge current Ipr.

In this embodiment, the controller 50 calculates the discharge resistance Rpr of the power storage device 10 by dividing the open circuit voltage (OCV) of the power storage device 10 by the self-discharge current Ipr of the power storage device 10. For the open circuit voltage (OCV) of the power storage device 10, the voltage value of the power storage device 10 measured by the voltmeter 40 before the supply of the constant current is started may also used, or alternatively, for the open circuit voltage (OCV), a voltage value that is set in advance by using the test results for the power storage device 10, etc. may also be used.

Alternatively, an association table or a function expressing the relationship between the self-discharge current Ipr and the discharge resistance Rpr of the power storage device 10 may be stored in the controller 50 in advance, and the controller 50 may calculate the discharge resistance Rpr by using the association table or the function.

Subsequently, the controller 50 determines whether or not the power storage device 10 is normal on the basis of the thus-calculated discharge resistance Rpr of the power storage device 10.

In this embodiment, the controller 50 determines whether or not the calculated value of the discharge resistance Rpr of the power storage device 10 falls within a predetermined resistance range. The upper limit value and the lower limit value of the predetermined resistance range are set in advance by using the statistical data obtained by aggregating the discharge resistance Rpr of the plurality of power storage devices 10, the test results for the specific power storage device 10 whose electrical property is normal, or the like.

When the controller 50 determines that the calculated value of the discharge resistance Rpr falls within the predetermined resistance range, the controller 50 determines that the power storage device 10 is in the normal state, and when the controller 50 determines that the calculated value of the discharge resistance Rpr does not fall within the predetermined range, the controller 50 determines that the power storage device 10 is abnormal.

Alternatively, a diagnose table indicating the normal state or the abnormal state of the power storage device 10 for every discharge resistance Rpr may be stored in the controller 50 in advance. In this case, the controller 50 refers to the diagnose table after calculating the discharge resistance Rpr of the power storage device 10 and specifies the internal state of the power storage device 10 associated with the thus-calculated discharge resistance Rpr.

Finally, the controller 50 outputs the determination result indicating the normal state or the abnormal state of the power storage device 10 to the display unit 60. By doing so, the determination result of the power storage device 10 is displayed on a screen of the display unit 60.

In this embodiment, although the controller 50 performs the pass/fail determination of the power storage device 10 on the basis of the calculated value of the discharge resistance Rpr, alternatively, it may be possible to determine whether or not the power storage device 10 is in the normal state by using the calculated value of the self-discharge current Ipr. In this case, the controller 50 determines whether or not the calculated value of the self-discharge current Ipr falls within the predetermined current range, for example, and when it is determined that the calculated value falls within the predetermined current range, the controller 50 determines that the power storage device 10 is in the normal state.

In addition, in this embodiment, although the controller 50 controls the operation of the constant current source 20 such that the constant currents with different current values are successively supplied to the power storage device 10, if the electrostatic capacitance Cst of the power storage unit 13 is known, only the constant current indicating the first current value I1 may be supplied. In this case, the electrostatic capacitance Cst of the power storage unit 13 is stored in the controller 50 in advance, and the controller 50 calculates the self-discharge current Ipr by substituting the electrostatic capacitance Cst, the first current value I1, and the gradient A1 for the voltage change associated with the first current value I1 into the above-described equation (1).

The electrostatic capacitance Cst of the power storage unit 13 stored in the controller 50 is set in advance by using the statistical data obtained by aggregating the electrostatic capacitance Cst of the power storage unit 13 in the plurality of power storage devices 10, the test results for the specific power storage device 10, or the like. Alternatively, the controller 50 may obtain the electrostatic capacitance Cst of the power storage unit 13 by charging the constant current indicating the second current value I2 to the power storage device 10 and by substituting the gradient A2 for the voltage change at this time and the second current value I2 into the above-described equation (2).

Figure 7:
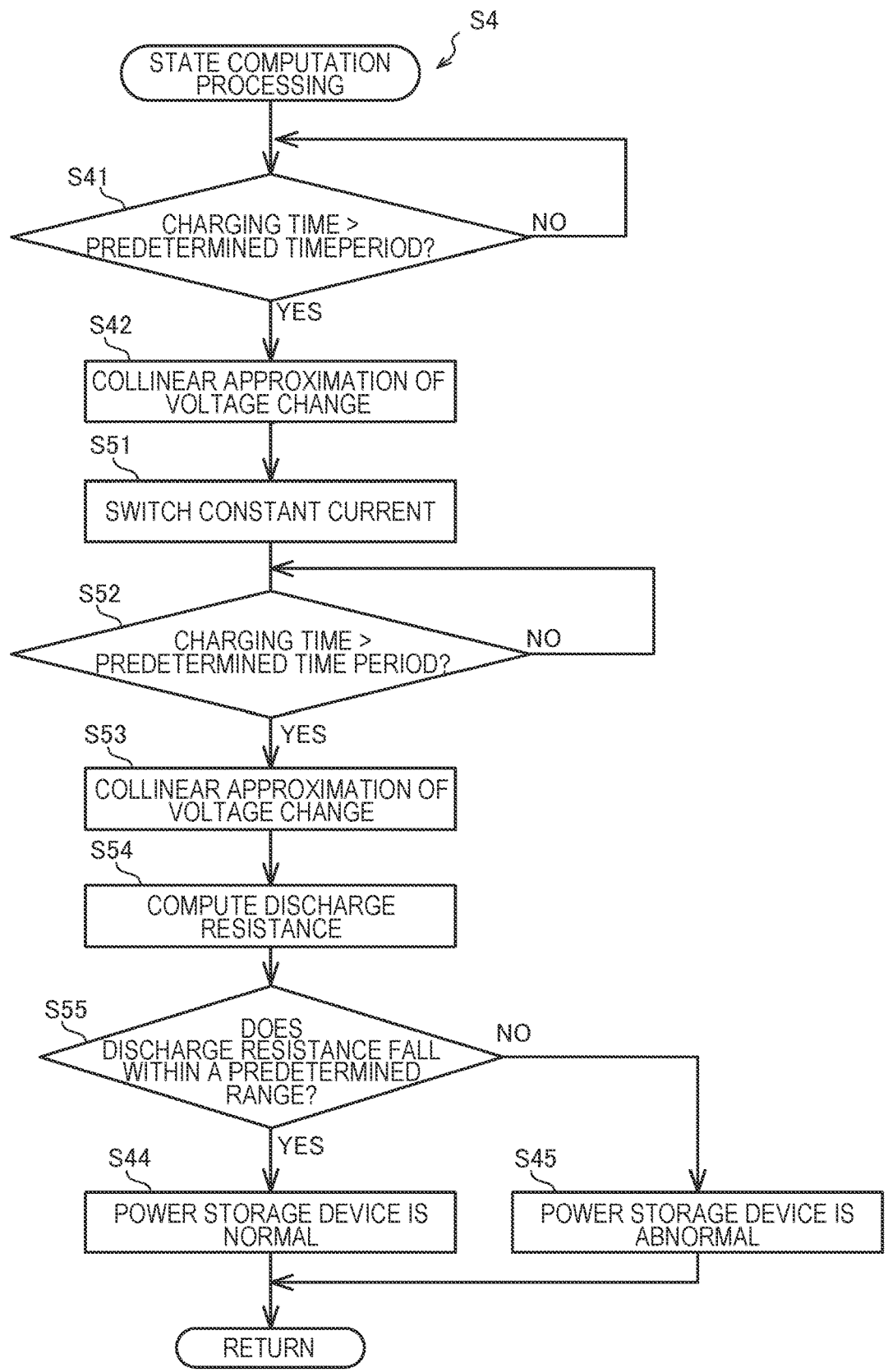
FIG. 7 is a flowchart showing the state computation processing according to a third embodiment.

Next, the state computation processing (S4) using the measurement apparatus 1 according to the third embodiment will be described with reference to FIG. 7. FIG. 7 is a flowchart showing the measurement method that is performed by using the measurement apparatus 1.

The state computation processing (S4) according to this embodiment includes processings in Steps S51 to S55 instead of the processing in Step S43 shown in FIG. 3. Therefore, only the respective processings in Steps S51 to S55 will be described below.

In Step S42, the controller 50 acquires the gradient A1 of the approximate straight line Ln1 by obtaining the approximate straight line Ln1 for the voltage change in the power storage device 10 at the time when the constant current indicating the first current value I1 is charged, which has been set in the processing in Step S3 shown in FIG. 2, and the process proceeds to Step S51.

In Step S51, the controller 50 switches the constant current supplied from the constant current source 20 to the power storage device 10 from the first constant current to the constant current indicating the second current value I2 that is higher than the first current value I1.

The processings in Steps S52 and S53 are similar to the respective processings in Steps S41 and S42. Therefore, in Steps S52 and S53, the controller 50 measures the electric potential difference between the voltage of the power storage device 10 and the reference voltage only for the predetermined time period and acquires the gradient A2 of the approximate straight line Ln2 by obtaining the approximate straight line Ln2 for the voltage change at the time when the second constant current is charged.

In Step S54, the controller 50 computes the discharge resistance Rpr of the power storage device 10 on the basis of the gradients A1 and A2 of the approximate straight lines acquired for every constant current indicating the first current value I1 and the second current value I2.

In this embodiment, the controller 50 calculates the self-discharge current Ipr of the power storage device 10 by substituting the first current value I1, the gradient A1 of the approximate straight line, the second current value I2, and the gradient A2 of the approximate straight line into the above-described equation (4). The controller 50 then calculates the discharge resistance Rpr of the power storage device 10 by dividing the open circuit voltage (OCV) of the power storage device 10 by the self-discharge current Ipr of the power storage device 10.

In Step S55, the controller 50 determines whether or not the power storage device 10 is normal on the basis of the thus-calculated discharge resistance Rpr of the power storage device 10.

In this embodiment, the controller 50 determines whether or not the calculated value of the discharge resistance Rpr falls within the predetermined resistance range. When it is determined that the calculated value of the discharge resistance Rpr falls within the predetermined resistance range, because the power storage device 10 is in the normal state, the process proceeds to Step S44 in the controller 50. On the other hand, when it is determined that the calculated value of the discharge resistance Rpr does not fall within the predetermined resistance range, in other words, when it is determined that the calculated value of the discharge resistance Rpr is larger than the upper limit value of the resistance range or smaller than the lower limit value of the resistance range, because the power storage device 10 is in the abnormal state, the process proceeds to Step S45 in the controller 50.

By executing the state computation processing (S4) described above, the pass/fail determination of the power storage device 10 is completed.

In an example shown in FIG. 7, the controller 50 calculates the self-discharge current Ipr of the power storage device 10 by obtaining the gradient for the voltage change in the power storage device 10 twice by switching the level of the constant current supplied to the power storage device 10 only once. Alternatively, a plurality of self-discharge currents Ipr may be calculated by successively obtaining the gradient of the approximate straight line for the voltage change by switching the level of the constant current a plurality of times, and the statistical value, such as the average value, the median, or the like, of the calculated values may be used as the final result.

In addition, in this embodiment, although the controller 50 calculates the discharge resistance Rpr of the power storage device 10 by switching the level of the constant current supplied from the constant current source 20 to the positive electrode 11 of the power storage device 10, the present invention is not limited thereto. For example, the connection relationship between the constant current source 20 and the power storage device 10 may be inverted, the constant current may be supplied from the constant current source 20 to the negative electrode 12 of the power storage device 10 to discharge the power storage device 10, and in this state, the level of the constant current may be switched. Also in this case, as in the above-mentioned embodiment, it is possible to calculate the discharge resistance Rpr of the power storage device 10.

Furthermore, in this embodiment, although the level of the constant current supplied from the constant current source 20 to the power storage device 10 is switched, it is possible to calculate the self-discharge current Ipr and the discharge resistance Rpr even if the direction of the constant current is switched. In the following, the procedure of computing the self-discharge current Ipr of the power storage device 10 will be described briefly for a case in which the direction of the constant current to be supplied to the power storage device 10 is switched.

The electrostatic capacitance Cst of the power storage unit 13 can be expressed as in the following equation (5) by using the self-discharge current Ipr of the power storage device 10 and the gradient Ac of the voltage change at the time when the constant current indicating the first current value I1 is charged to the power storage device 10. Furthermore, the electrostatic capacitance Cst of the power storage unit 13 can be expressed as in the following equation (6) by using the self-discharge current Ipr of the power storage device 10 and the gradient Ad of the voltage change at the time when the power storage device 10 is discharged with the constant current indicating the second current value I2.

[Numerical Equation 5]

$$C_{st} = \frac{I_1 - I_{pr}}{Ac} \quad (5)$$

[Numerical Equation 6]

$$C_{st} = \frac{I_2 + I_{pr}}{Ad} \quad (6)$$

By solving the equation (5) and equation (6) described above for the self-discharge current Ipr, the following equation (7) is derived.

[Numerical Equation 7]

$$I_{pr} = \frac{I_1 \cdot Ad - I_2 \cdot Ac}{Ad + Ac} \quad (7)$$

Therefore, it is possible to calculate the self-discharge current Ipr of the power storage device 10 by substituting the gradient Ac of the voltage change at the time when charged with the constant current indicating the first current value I1 and the gradient Ad of the voltage change at the time when discharged with the constant current indicating the second current value I2 into the above-described equation (7). By dividing the open circuit voltage (OCV) of the power storage device 10 by the thus-calculated self-discharge current Ipr, the discharge resistance Rpr can be calculated.

In this case, for the first current value I1 and the second current value I2, it suffices that the absolute value of at least one of the first current value I1 and the second current value I2 is set to one or several times the reference value of the self-discharge current Ipr, and the absolute values of the first current value I1 and the second current value I2 may have the same value with each other or different values from each other. For example, the first current value I1 is set to 10 [μA] that is one times the reference value of the self-discharge current Ipr, and the second current value I2 is set to the value obtained by multiplying the first current value I1 by "−1", i.e., −10 [μ. In addition, the gradient Ac, Ad of the voltage change are acquired by a procedure similar to that described in FIG. 4.

In addition, in this embodiment, although the controller 50 switches the level of the constant current, the direction of the constant current may be switched after the level of the constant current is switched, and the level of the constant current may be switched after the direction the constant current is switched. In such a case, because the plurality of self-discharge currents Ipr are obtained, the average value thereof, etc. may be used as the final result.

In addition, in this embodiment, although the controller 50 calculates the self-discharge current Ipr of the power storage device 10 by switching the level of the constant current, the self-discharge current Ipr may be calculated without switching the level of the constant current. For example, if the electrostatic capacitance Cst of the power storage unit 13 in the equation (1) is known, the self-discharge current Ipr may be calculated by obtaining the gradient A1 of the approximate straight line for the voltage change in the power storage device 10 and by substituting the gradient A1, the first current value I1, and the known electrostatic capacitance Cst into the above-described equation (1).

Alternatively, a computation table indicating the relationship between the gradient A1 of the approximate straight line and the self-discharge current Ipr is generated by respectively substituting premeasured measurement values or estimated values into the electrostatic capacitance Cst of the power storage unit 13 and the first current value I1 in the above-described equation (1). Then, the thus-generated computation table may be recorded in the controller 50 in advance. In this case, when the gradient A1 of the approximate straight line is obtained, the controller 50 refers to the computation table and calculates the self-discharge current Ipr that is associated with the thus-obtained gradient A1 of the approximate straight line.

In addition, as described above, the discharge resistance Rpr of the power storage device 10 is calculated by dividing the open circuit voltage (OCV) of the power storage device 10 by the self-discharge current Ipr. Therefore, if the open circuit voltage (OCV) of the power storage device 10 is known, the computation table indicating the relationship between the gradient A1 of the approximate straight line and the discharge resistance Rpr may be generated and may be stored in the controller 50 in advance. In this case, when the gradient A1 of the approximate straight line for the voltage change in the power storage device 10 is obtained, the controller 50 refers to the computation table and calculates the discharge resistance Rpr associated with the thus-obtained gradient A1 of the approximate straight line.

As described above, in this embodiment, because the self-discharge current Ipr or the discharge resistance Rpr is calculated on the basis of one or more voltage change(s) of the power storage device 10 detected within a short period of time, the controller 50 can estimate the internal state of the power storage device 10 within a short period of time.

Next, operational advantages according to the third embodiment will be described.

The controller 50 in this embodiment generates the internal information that indicates the self-discharge current Ipr or the discharge resistance Rpr of the power storage device 10 as the information related to the self discharge state of the power storage device 10 on the basis of the change in the electric potential difference measured by the voltmeter 40.

For example, the controller 50 supplies the first constant current to the power storage device 10 by using the constant current source 20, and after a predetermined time period has elapsed, supplies the second constant current by switching the constant current to be supplied to the power storage device 10. At the same time, the controller 50 acquires, for each of the first constant current and the second constant current, the electric potential difference between the voltage of the power storage device 10 and the reference voltage from the voltmeter 40 and calculates the gradients A1 and A2 of the voltage changes in the power storage device 10 for every constant current on the basis of the thus-acquired electric potential difference.

Subsequently, the controller 50 calculates the self-discharge current Ipr of the power storage device 10 by using the equation (4) or the equation (7) on the basis of the gradients A1 and A2 of the voltage changes in the power storage device 10 and calculates the discharge resistance Rpr on the basis of the thus-calculated self-discharge current Ipr. The controller 50 outputs the calculated values of the self-discharge current Ipr and the discharge resistance Rpr to the display unit 60 as the internal information of the power storage device 10.

According to such a configuration, because it becomes possible to increase the resolution of the voltmeter 40 by measuring the electric potential difference between the voltage of the power storage device 10 and the reference voltage, similarly to the first embodiment and the second embodiment, it is possible to generate the internal information of the power storage device 10 within a short period of time.

In addition, the controller 50 in this embodiment generates, on the basis of the change in the electric potential difference measured by the voltmeter 40, the determination information that indicates whether the power storage device 10 is being passed or failed as the information related to the self discharge state of the power storage device 10.

For example, the controller 50 determines whether or not the thus-calculated self-discharge current Ipr or the discharge resistance Rpr falls within the predetermined normal range on the basis of the change in the electric potential difference measured by the voltmeter 40 and outputs the determination result to the display unit 60 as the determination information.

According to such a configuration, similarly to the internal information of the power storage device 10 described above, it is possible to generate the determination information of the power storage device 10 within a short period of time.

As described above, the controller 50 in this embodiment generates the information related to the self discharge state of the power storage device 10 on the basis of the change in the electric potential difference between the voltage of the power storage device 10 and the reference voltage. By doing so, it is possible to display and notify the state of the power storage device 10 within a short period of time.

Although the embodiments have been described in the above, the above-mentioned embodiments merely illustrate a part of application examples of the present invention, and the technical scope of the present invention is not intended to be limited to the specific configurations of the above-described embodiments.

For example, an extent of the voltage change in the power storage device 10 changes in accordance with the internal temperature of the power storage device 10. By utilizing this nature, a temperature table indicating the relationship between the voltage change in the power storage device 10 and the internal temperature may be stored in the controller 50 in advance, and the controller 50 may estimate the internal temperature of the power storage device 10 on the basis of the thus-detected voltage change in the power storage device 10.

In addition, in the above-mentioned embodiment, although the self-discharge current Ipr and the discharge resistance Rpr are calculated by using the change in the electric potential difference between the voltage of the power storage device 10 and the reference voltage, the electrostatic capacitance Cst of the power storage unit 13 may be calculated. For example, the electrostatic capacitance Cst of the power storage unit 13 is calculated by substituting the gradient A2 for the voltage change at the time when the power storage device 10 is charged with the constant current indicating the second current value I2 and the second current value I2 into the above-described equation (2).

In addition, the controller 50 may determine the internal state of the power storage device 10 on the basis of the thus-calculated electrostatic capacitance Cst of the power storage unit 13. For example, the controller 50 determines whether the power storage device 10 is being passed or failed by determining whether or not the calculated value of the electrostatic capacitance Cst falls within a predetermined normal range.

In addition, in the above-mentioned embodiment, although the measurement is performed on a single power storage device 10, it is possible to measure the power storage apparatus in which the plurality of power storage devices 10 are connected in series. In addition, although the measurement apparatus 1 includes the display unit 60, the display unit 60 may be omitted.

Fourth Embodiment

The measurement apparatuses according to following respective embodiments each executes the processing for detecting the voltage change in the power storage device 10 on the basis of the information that indicates the electrical property of the power storage device 10 in an open state. The measurement apparatus (hereinafter, simply referred to as "the measurement apparatus") 1B of the power storage device 10 according to a fourth embodiment will be described with reference to FIGS. 8 to 15.

Figure 8:
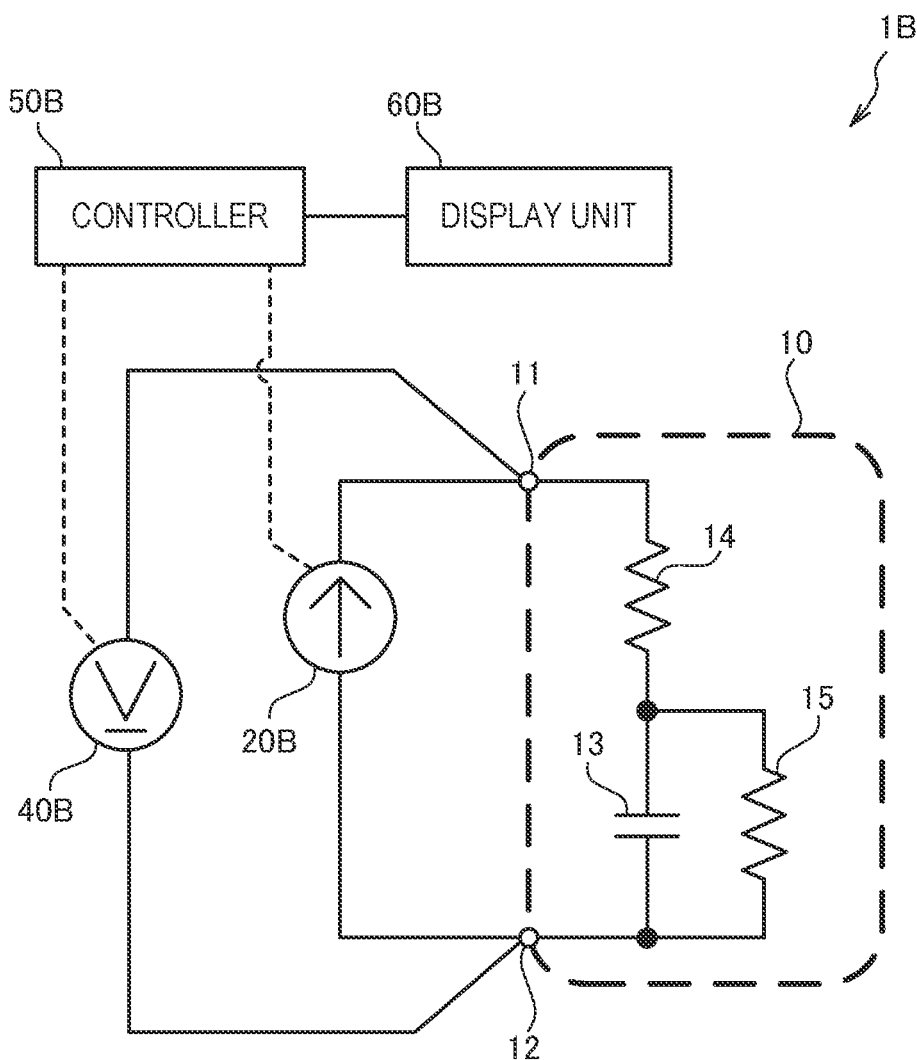
FIG. 8 is a diagram showing a configuration of the measurement apparatus of the power storage device according to a fourth embodiment.

The configuration of the power storage device 10 and a configuration of a measurement apparatus 1B will be described first with reference to FIG. 8. FIG. 8 is a diagram showing the configuration of the measurement apparatus 1B.

The power storage device 10 is the single power storage cell of the lithium ion secondary battery, for example. The power storage device 10 is not limited to the secondary battery (the chemical battery), and for example, it may be the electric double-layer capacitor. In addition, the power storage device 10 may also be the power storage module in which the plurality of power storage cells are connected in series.

As shown in FIG. 8, the power storage device 10 is shown by an equivalent circuit model. According to the equivalent circuit model, the power storage device 10 has the positive electrode 11, the negative electrode 12, the power storage unit 13, the internal resistance 14, the parallel resistance 15. The power storage unit 13, the internal resistance 14, and the parallel resistance 15 are each the element of the equivalent circuit showing the internal state of the power storage device 10.

The power storage unit 13 is the electrostatic capacitance component of the power storage device 10, and this electrostatic capacitance component is, for example, about several hundreds [F] or several thousands [F]. When a voltage higher than the cell voltage of the power storage device 10 is applied, charge is accumulated, and the power storage unit 13 is charged. In the power storage unit 13, when the flowing current is relatively low during the charging, the electrical double layer reaction is mainly caused, and when the flowing current is relatively high during the charging, the chemical reaction is mainly caused. In this description, the electrostatic capacitance of the power storage unit 13 is referred to as Cst [F], and the current flowing in the power storage unit 13 is referred to as Ist [A].

The internal resistance 14 is the series resistance that is connected to the power storage unit 13 in series between the positive electrode 11 and the negative electrode 12. In this description, the resistance value of the internal resistance 14 is referred to as Rir [mΩ], and the current flowing through the internal resistance 14 is referred to as Iir [A].

The parallel resistance 15 is the discharge resistance that is connected to the power storage unit 13 in parallel. The current flowing through the parallel resistance 15 is the self-discharge current, the so-called leakage current. In this description, the resistance value of the parallel resistance 15 is referred to as Rpr [kΩ], and the self-discharge current flowing through the parallel resistance 15 is referred to as Ipr [A].

The measurement apparatus 1B is an apparatus or a system for measuring the state of the power storage device 10 and includes a detection apparatus that detects the temporal change of the voltage of the power storage device 10, in other words, the voltage change. The measurement apparatus 1B is provided with a constant current source 20B serving as the supply means, a voltage sensor 40B serving as detection means and the measurement means, a controller 50B serving as the computation means, and a display unit 60B.

The constant current source 20B is the DC power supply that charges the power storage device 10 by supplying the constant current, which is for detecting the internal state of the power storage device 10, to the power storage device 10. The constant current source 20B maintains the current to be supplied to the power storage device 10 at a predetermined. The constant current source 20B charges the power storage device 10 by supplying the constant current at a level that is lower than the overpotential and that mainly causes the electrical double layer reaction in the power storage device 10.

The constant current supplied from the constant current source 20B to the power storage device 10 can be set on the basis of the value of the self-discharge current of the power storage device 10 and is 10 [μA], for example. In the following, Such a constant current is also referred to as "micro-constant current" and the supply and charging of the constant current is also referred to as "micro-charging".

When the power storage device 10 is charged by applying the constant voltage to the power storage device 10, it is difficult to stably apply the constant voltage at a level that is lower than the overpotential and that mainly causes the electrical double layer reaction in the power storage device 10. In contrast, it is easier to supply the relatively low current on the order of a microampere (μA) by using the constant current source 20B. Thus, in the measurement apparatus 1B, by using the constant current source 20B, it is possible to stably supply the constant current at a level that is lower than the overpotential and that mainly causes the electrical double layer reaction in the power storage device 10.

The voltage sensor 40B is the DC voltmeter that measures the voltage of the power storage device 10. The voltage sensor 40B outputs the electric signal indicating the thus-measured voltage in a time series to the controller 50B. In this embodiment, the voltage sensor 40B measures the voltage of the power storage device 10 at least twice including once in a state in which the constant current is supplied from the constant current source 20B.

The controller 50B is formed of the microcomputer provided with the central processing unit (the CPU), the read-only memory (the ROM), the random-access memory (the RAM), and the input-output interface (the I/O interface). The controller 50B may also be formed of the plurality of microcomputers. The controller 50B is the control apparatus that controls various kinds of operations of the measurement apparatus 1B by reading out the program stored in the ROM by the CPU.

The controller 50B controls a current supply from the constant current source 20B to the power storage device 10 and computes the internal state of the power storage device 10 by using the voltage sensor 40B. In other words, the controller 50B computes the internal state of the power storage device 10 on the basis of the electric signal indicating the voltage measured by the voltage sensor 40B.

In this embodiment, the controller 50B acquires the electric signal from the voltage sensor 40B in a state in which the constant current is supplied from the constant current source 20B to the power storage device 10 and detects the temporal change for the voltage of the power storage device 10 indicated by the electric signal. The controller 50B estimates the internal state of the power storage device 10, such as the self discharge state, on the basis of the thus-detected voltage change in the power storage device 10.

For example, the controller 50B determines whether the internal state of the power storage device 10 is being passed or failed on the basis of the thus-detected voltage change in the power storage device 10. Alternatively, the controller 50B may calculate, the self-discharge current flowing through the parallel resistance 15, the resistance value of the parallel resistance 15, or the electrostatic capacitance of the power storage unit 13 on the basis of the thus-detected voltage change in the power storage device 10.

In this embodiment, the controller 50B determines that the power storage device 10 is normal when the voltage change in the power storage device 10 falls within the normal range. On the other hand, when the voltage change in the power storage device 10 does not fall within the normal range, the controller 50B determines that the power storage device 10 is abnormal. As described above, the controller 50B determines whether the power storage device 10 is being passed or failed.

The display unit 60B notifies the user of the information, such as the determination result, the calculation result, or the like obtained from the controller 50B, by displaying such information. The display unit 60B is the touch screen, for example, and is formed such that the information is visible to the user and it is operable by the user.

Next, operations of the measurement apparatus 1B according to this embodiment will be described with reference to the drawings.

Figure 9:
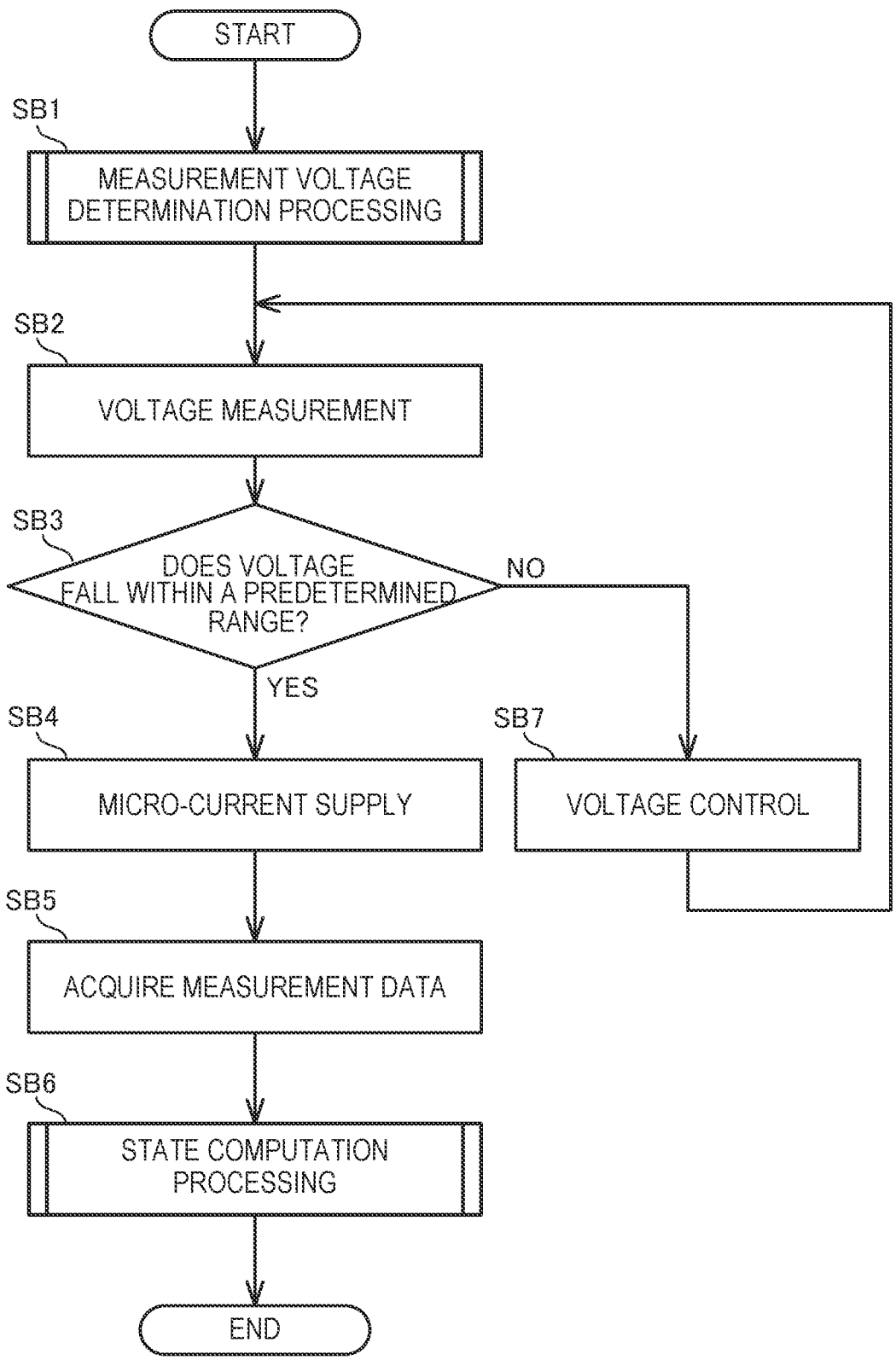
FIG. 9 is a flowchart showing the measurement method of the power storage device using the measurement apparatus according to the fourth embodiment.

FIG. 9 is a flowchart showing an example of the measurement method for measuring the state of the power storage device 10 by using the measurement apparatus 1B. In an example shown in FIG. 9, the measurement apparatus 1B executes the measurement in the environment in which the temperature change in the power storage device 10 is suppressed by, for example, storing the power storage device 10 in the constant temperature oven capable of maintaining the constant ambient temperature.

When the above-described measurement is to be executed, the measurement apparatus 1B is first connected to the power storage device 10, and a state in which the voltage of the power storage device 10 can be measured and a state in which the constant current can be supplied from the constant current source 20B to the power storage device 10 are established by the voltage sensor 40B.

In Step SB1, the controller 50B executes measurement voltage determination processing of the power storage device 10. In the measurement voltage determination processing, the controller 50B determines the measurement voltage (an assigned voltage) of the power storage device 10 on the basis of a relationship between the voltage of the power storage device 10 and the electrostatic capacitance Cst of the power storage device 10.

The measurement voltage of the power storage device 10 refers to the voltage of the power storage device 10 at the time when the state of the power storage device 10 is measured by supplying the constant current to the power storage device 10. The measurement voltage, which is the voltage assigned for measurement, has the predetermined value for which the electrostatic capacitance Cst of the power storage device 10 is considered and indicates a voltage value or a voltage range.

The relationship between the voltage of the power storage device 10 and the electrostatic capacitance Cst of the power storage device 10 described above is obtained on the basis of, for example, the measured data of the power storage device 10, analysis data such a simulation result, theoretical data, or the statistical data. In this embodiment, the controller 50B determines the measurement voltage of the power storage device 10 by using the measured data for specifying a property of the electrostatic capacitance Cst for the voltage of the power storage device 10. The measurement voltage determination processing will be described below with reference to FIG. 10.

In Step SB2, the controller 50B causes the voltage sensor 40B to measure the voltage of the power storage device 10. By doing so, the electric signal associated with the voltage of the power storage device 10 is input from the voltage sensor 40B to the controller 50B.

In Step SB3, the controller 50B determines whether or not the voltage of the power storage device 10 indicated by the electric signal falls within the predetermined range. In other words, the controller 50B forms determination means that determines whether or not the voltage of the power storage device 10 is the measurement voltage indicating the predetermined value. In Step SB3, when it is determined that the voltage of the power storage device 10 falls within the predetermined range, the process proceeds to Step SB4 in the controller 50B. When it is determined that the voltage of the power storage device 10 does not fall within the predetermined range, the process proceeds to Step SB7 in the controller 50B.

In Step SB7, the controller 50B executes a voltage control for adjusting the voltage of the power storage device 10 to the measurement voltage. In this voltage control, the controller 50B charges or discharges the power storage device 10 by supplying a relatively high current such that the chemical reaction is caused in the power storage device 10. In the following, such charge or discharge is also referred to as "a normal charge" or "a normal discharge".

In this embodiment, the controller 50B charges or discharges the power storage device 10 by supplying charging current or discharging current that is higher than the micro-constant current from the constant current source 20B to the power storage device 10. At this time, the charging current supplied from the constant current source 20B to the positive electrode 11 of the power storage device 10 is +190 [mA], for example, and the discharging current supplied from the constant current source 20B to the negative electrode 12 of the power storage device 10 is −190 [mA], for example.

Alternatively, in a charging/discharging cycle step in a performance test of the power storage device 10, the controller 50B interrupts this step when the voltage of the power storage device 10 reaches the measurement. By doing so, the voltage of the power storage device 10 may be adjusted to the measurement voltage.

Once the voltage control is completed in Step SB7, the process returns to Step SB2 in the controller 50B, and when it is determined that the voltage of the power storage device 10 falls within the predetermined range in Step SB3, the process proceeds to Step SB4.

In Step SB4, the controller 50B starts the micro-charging by supplying the micro-constant current from the constant current source 20B to the power storage device 10.

In Step SB5, the voltage sensor 40B measures the voltage of the power storage device 10 in the micro-charging state. By doing so, the controller 50B can acquire, as the measurement data from the voltage sensor 40B, the electric signal that indicates the voltage of the power storage device 10 to which the constant current is supplied.

In Step SB6, the controller 50B executes the state computation processing of the power storage device 10. In the state computation processing, the controller 50B computes the internal state of the power storage device 10 on the basis of the voltage of the power storage device 10 that is indicated by the electric signal. A detail of the state computation processing will be described with reference to FIG. 13.

Once the processing in Step SB6 is completed, a series of processing procedures for the measurement method performed with the measurement apparatus 1B is finished.

Figure 10:
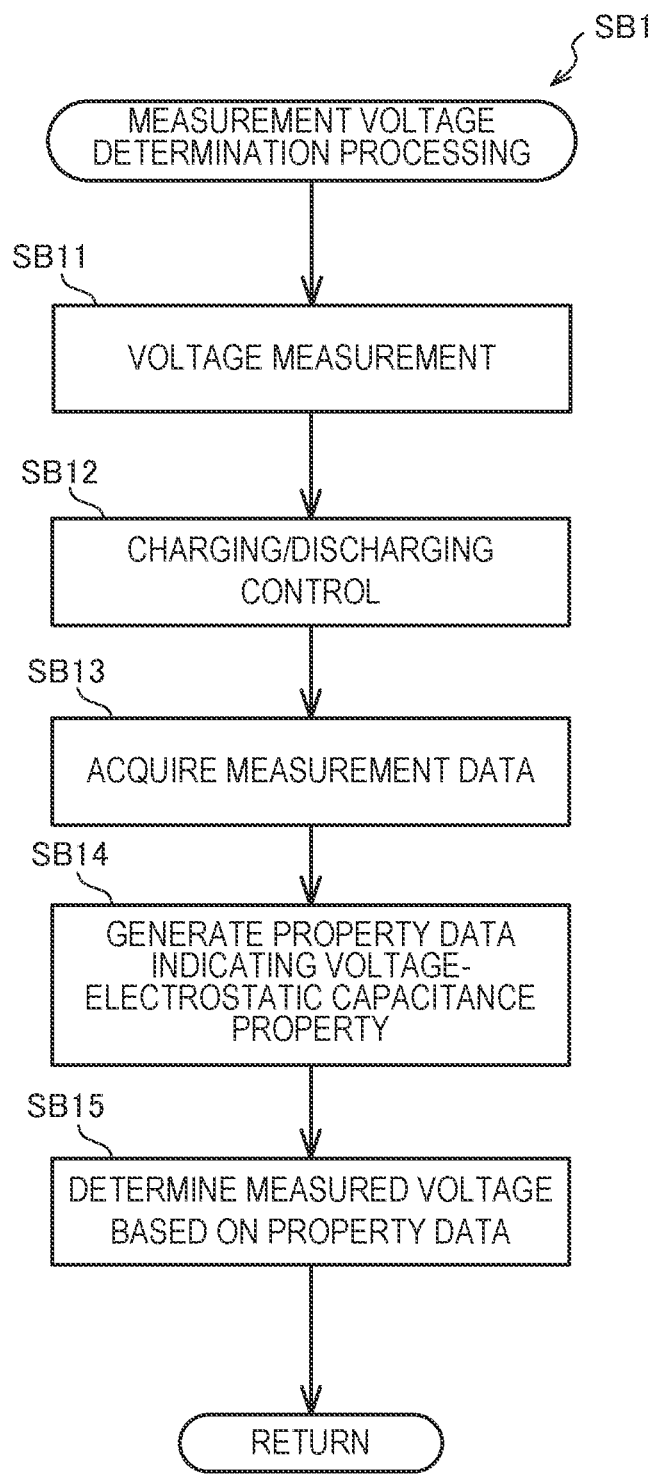
FIG. 10 is a flowchart showing an example of measurement voltage determination processing included in the measurement method.

Next, the measurement voltage determination processing executed in Step SB1 will be described with reference to FIG. 10. FIG. 10 is a flowchart showing an example of the measurement voltage determination processing (SB1) performed by the measurement apparatus 1B.

In Step SB11, the controller 50B causes the voltage sensor 40B to measure the voltage of the power storage device 10. By doing so, the electric signal associated with the voltage of the power storage device 10 is input from the voltage sensor 40B to the controller 50B.

In Step SB12, the controller 50B executes a charging/discharging control for charging or discharging the power storage device 10 such that the chemical reaction is caused in the power storage device 10. In this embodiment, the controller 50B performs, at least once, both of the charging control in which the charging current is supplied to the power storage device 10 to perform the normal charge and the discharging control in which the discharging current is supplied to the power storage device 10 to perform the normal discharge. The absolute values of the discharging current and the charging current are set to a level tens of thousands of times higher than the constant current.

In Step SB13, the voltage sensor 40B measures the voltage of the power storage device 10 when the charging/discharging control is performed for the power storage device 10. By doing so, the controller 50B can acquire the electric signal that indicates the voltage of the power storage device 10 at the time when the charging/discharging control is being performed as the measurement data from the voltage sensor 40B. This electric signal is used as the measurement data for specifying the relationship between the electrostatic capacitance Cst of the power storage device 10 and the voltage of the power storage device 10.

In Step SB14, the controller 50B generates the property data that indicates the relationship between the electrostatic capacitance Cst of the power storage device 10 and the voltage of the power storage device 10 on the basis of the electric signal acquired from the voltage sensor 40B.

In this embodiment, as in the following equation (8), the controller 50B calculates, for every voltage value of the power storage device 10, the electrostatic capacitance Cst of the power storage device 10 by multiplying the charging current Ic or the discharging current Id serving as the current I by the temporal changed amount dt per unit voltage dV. As described above, the controller 50B generates the above-described property data. This property data is recorded in a memory of the controller 50B.

[Numerical Equation 8]

$$C_{st} = I \cdot \frac{dt}{dV} \qquad (8)$$

Alternatively, the controller 50B calculates, for the voltage value of the power storage device 10, the voltage changed amount per unit time, in other words, the gradient for the voltage change in the power storage device 10. By doing so, the property data that indicates the relationship between the voltage of the power storage device 10 and the gradient for the voltage change may be generated. In this case, as the electrostatic capacitance Cst of the power storage device 10 is decreased, the gradient for the voltage change in the power storage device 10 is increased.

In Step SB15, the controller 50B determines the measurement voltage of the power storage device 10 on the basis of the thus-generated property data.

In this embodiment, the controller 50B determines, as the measurement voltage of the power storage device 10, a voltage value at which the electrostatic capacitance Cst of the power storage device 10 is smaller than a threshold value that is smaller than the maximum value thereof. In other words, the controller 50B determines the measurement voltage so as to avoid neighboring values of the voltage value at which the electrostatic capacitance Cst of the power storage device 10 is maximized.

By doing so, the electrostatic capacitance Cst of the power storage device 10 becomes smaller than its maximum value, and so, it is possible to increase the voltage change in the power storage device 10 at the time when the micro-constant current is being supplied to the power storage device 10. The threshold value described above is set, for example, on the basis of the maximum value or the average value of the electrostatic capacitance Cst of the power storage device 10.

Once the processing in Step SB15 is completed, a series of processing procedures for the measurement voltage determination processing in this embodiment is finished, the process returns to the processing procedure in the measurement method shown in FIG. 9 in the controller 50B, and the process proceeds to Step SB2.

Figure 11:
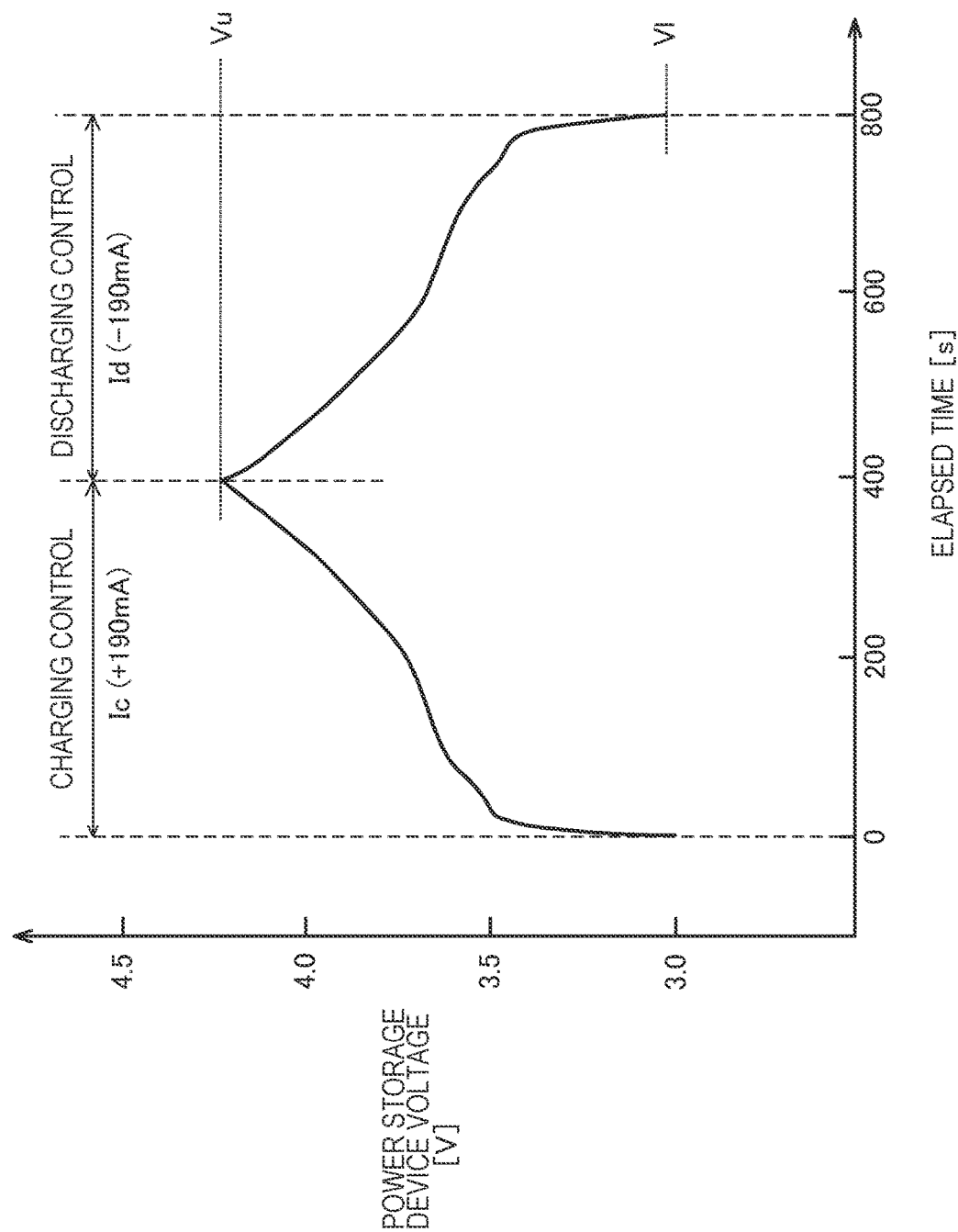
FIG. 11 is a diagram showing an example of the voltage change in the power storage device due to charging/discharging of the power storage device.
Figure 12:
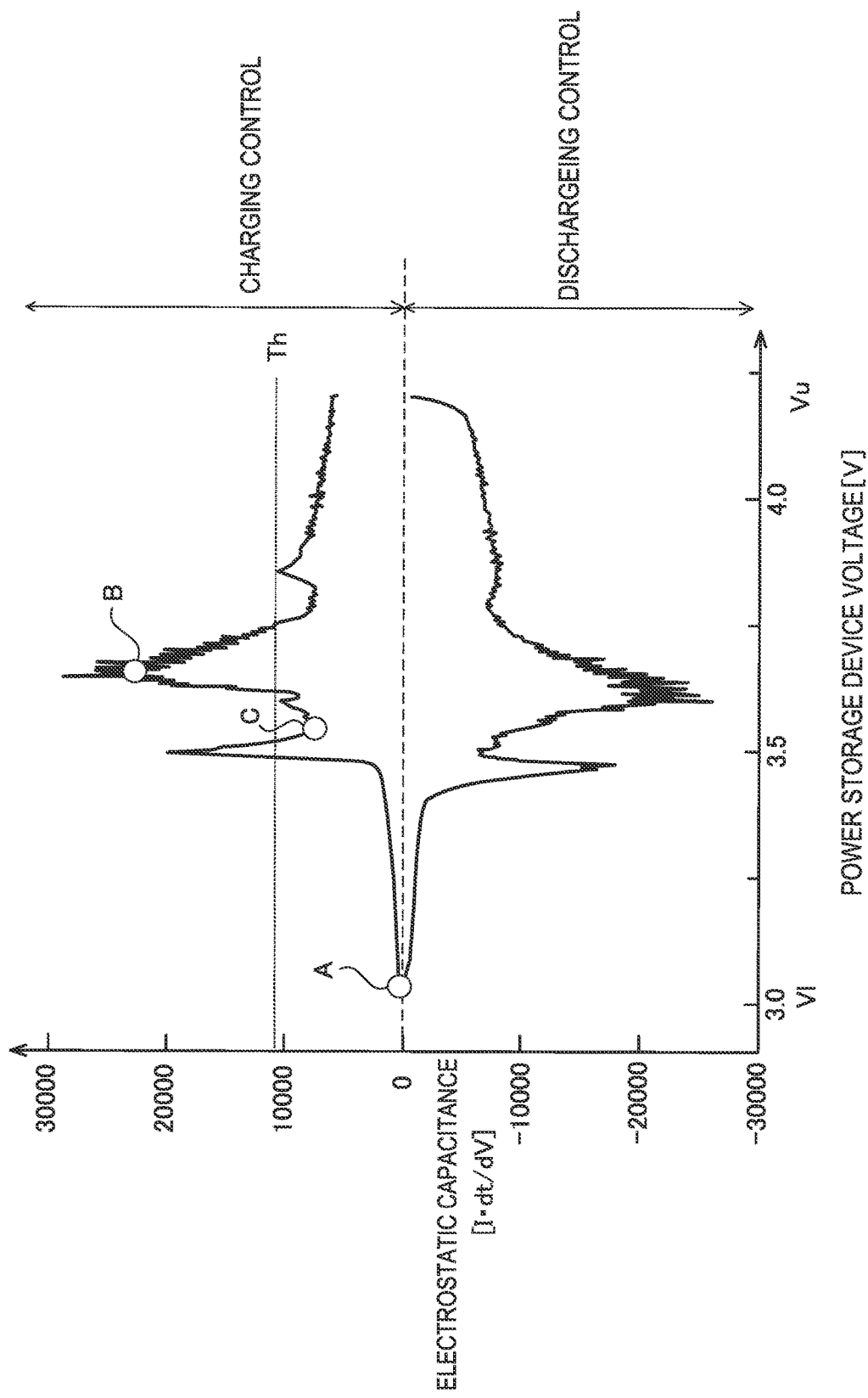
FIG. 12 is a diagram for illustrating a relationship between the voltage of the power storage device and an electrostatic capacitance component of the power storage device.

Specific examples of the processings in Steps SB13 to SB15 will be described with reference to FIGS. 11 and 12. FIG. 11 is a diagram for illustrating the change in the voltage of the power storage device 10 against the elapsed time at the time when the charging/discharging control is executed to the power storage device 10. FIG. 12 is a diagram for illustrating the relationship between the voltage of the power storage device 10 and the electrostatic capacitance Cst.

In an example shown in FIG. 11, after the charging control in which the charging current Ic of +190 [mA] is supplied to the power storage device 10 is performed, the discharging control in which the discharging current Id of −190 [mA] is supplied to the power storage device 10 is performed, and the voltage change in the power storage device 10 at this time is shown. In the following, the horizontal axis indicates the elapsed time since the start of the charging/discharging control for the power storage device 10, and the vertical axis indicates the voltage of the power storage device 10.

The solid line shown in FIG. 11 is drawn on the basis of the measurement data acquired by the processing in Step SB13. The fully discharged voltage Vl of the power storage device 10 is about 3.0 [V] when the charging capacity of the power storage device 10 is 0%, and the fully charged voltage Vu of the power storage device 10 is about 4.2 [V] when the charging capacity of the power storage device 10 is 100%. As described above, when the charging/discharging control is performed, the voltage of the power storage device 10 is changed within a range from the fully discharged voltage Vl to the fully charged voltage Vu.

As shown in FIG. 11, in a range of the voltage of the power storage device 10 from 3.0 [V] to 3.5 [V], because the gradient of the solid line is large, the electrostatic capacitance Cst of the power storage device 10 can be said to be small. In a range of the voltage from 3.5 [V] to 3.7 [V], because the gradient of the solid line is small, the electrostatic capacitance Cst of the power storage device 10 can be said to be large.

As described above, by acquiring the measurement data that indicates the voltage change in the power storage device 10 at the time when the charging/discharging control is performed, it is possible to specify the voltage value of the power storage device 10 at which the electrostatic capacitance Cst becomes relatively large. Therefore, the measurement data can be used as the property data for specifying the property of the electrostatic capacitance Cst against the voltage of the power storage device 10.

Next, the relationship between the voltage of the power storage device 10 and the electrostatic capacitance Cst of the power storage device 10 will be described in more detail.

The horizontal axis in FIG. 12 indicates the voltage of the power storage device 10, and the vertical axis indicates the electrostatic capacitance Cst of the power storage device 10. The electrostatic capacitance Cst of the power storage device 10 is calculated as in the above-described equation (8).

The solid line shown in FIG. 12 is a line indicating the voltage-electrostatic capacitance property of the power storage device 10 and is drawn on the basis of the property data that is generated by the processing in Step SB14. The electrostatic capacitance Cst during the charging control is shown with a positive value, and the electrostatic capacitance Cst during the discharging control is shown with a negative value for the sake of convenience, and both have the similar voltage-electrostatic capacitance properties. In the following, the description will focus on the voltage-electrostatic capacitance property during the charging control.

As shown in FIG. 12, the electrostatic capacitance Cst of the power storage device 10 is locally maximized when the voltage of the power storage device 10 is about 3.4 [V] and about 3.7 [V], and the electrostatic capacitance Cst is maximized when the voltage is about 3.7 [V].

In this embodiment, when the internal state of the power storage device 10 is to be measured, it is required to obtain the voltage change in the power storage device 10 at the time when the micro-constant current is being supplied to the power storage device 10. For the voltage change in the power storage device 10, as the electrostatic capacitance Cst of the power storage device 10 is increased, because the extent of the voltage change is decreased, it takes time to measure the voltage change.

As a countermeasure against this problem, the processing in Step SB15 shown in FIG. 10 is performed as follows. In other words, the controller 50B determines the measurement voltage of the power storage device 10 so as to avoid the voltage value of the power storage device 10 associated with a global maximum point B at which the electrostatic capacitance Cst of the power storage device 10 is maximized and the neighboring values thereof.

Specifically, the measurement voltage of the power storage device 10 is set to a voltage value at which the electrostatic capacitance Cst of the power storage device 10 is smaller than a predetermined threshold value Th. For example, the threshold value Th is set on the basis of the maximum value of the electrostatic capacitance Cst, and in this embodiment, the threshold value Th is set to one-half of the maximum value of the electrostatic capacitance Cst. Alternatively, the threshold value Th may also be set on the basis of the average value of the electrostatic capacitance Cst.

In addition, in a case in which the power storage device 10 is the lithium ion secondary battery, as the voltage of the power storage device 10 approaches the fully charged voltage Vu, a decomposition reaction is more likely to be caused in the power storage device 10. Therefore, from a view point of suppressing deterioration of the power storage device 10, it is preferred that the measurement voltage of the power storage device 10 be set to the voltage value that is lower than the specific voltage value at which the electrostatic capacitance Cst of the power storage device 10 is maximized. Thus, the controller 50B may set the measurement voltage of the power storage device 10 so as to be lower than the specific voltage value at which the electrostatic capacitance Cst of the power storage device 10 is maximized.

In this embodiment, the controller 50B determines, as the measurement voltage of the power storage device 10, the voltage value of the power storage device 10 associated with a global minimum point A at which the electrostatic capacitance Cst of the power storage device 10 is minimized, in other words, a neighboring voltage value of the fully discharged voltage Vl. By doing so, it is possible to maximize the voltage change during the micro-charging of the power storage device 10.

Alternatively, the controller 50B determines the measurement voltage for the voltage value of the power storage device 10 associated with a local minimum point C at which the electrostatic capacitance Cst of the power storage device 10 is locally minimized. By doing so, it is possible to rapidly detect the voltage change in the power storage device 10 at a state in which the power storage device 10 is stable.

Subsequently, in Step SB3, the controller 50B determines whether or not the voltage of the power storage device 10 is the measurement voltage indicating the predetermined range. In other words, the controller 50B determines whether or not the electrostatic capacitance Cst of the power storage device 10 is exceeding the threshold value on the basis of the voltage of the power storage device 10.

Next, the state computation processing that is executed in Step SB6 shown in FIG. 9 will be described with reference to FIGS. 13 to 15.

Figure 13:
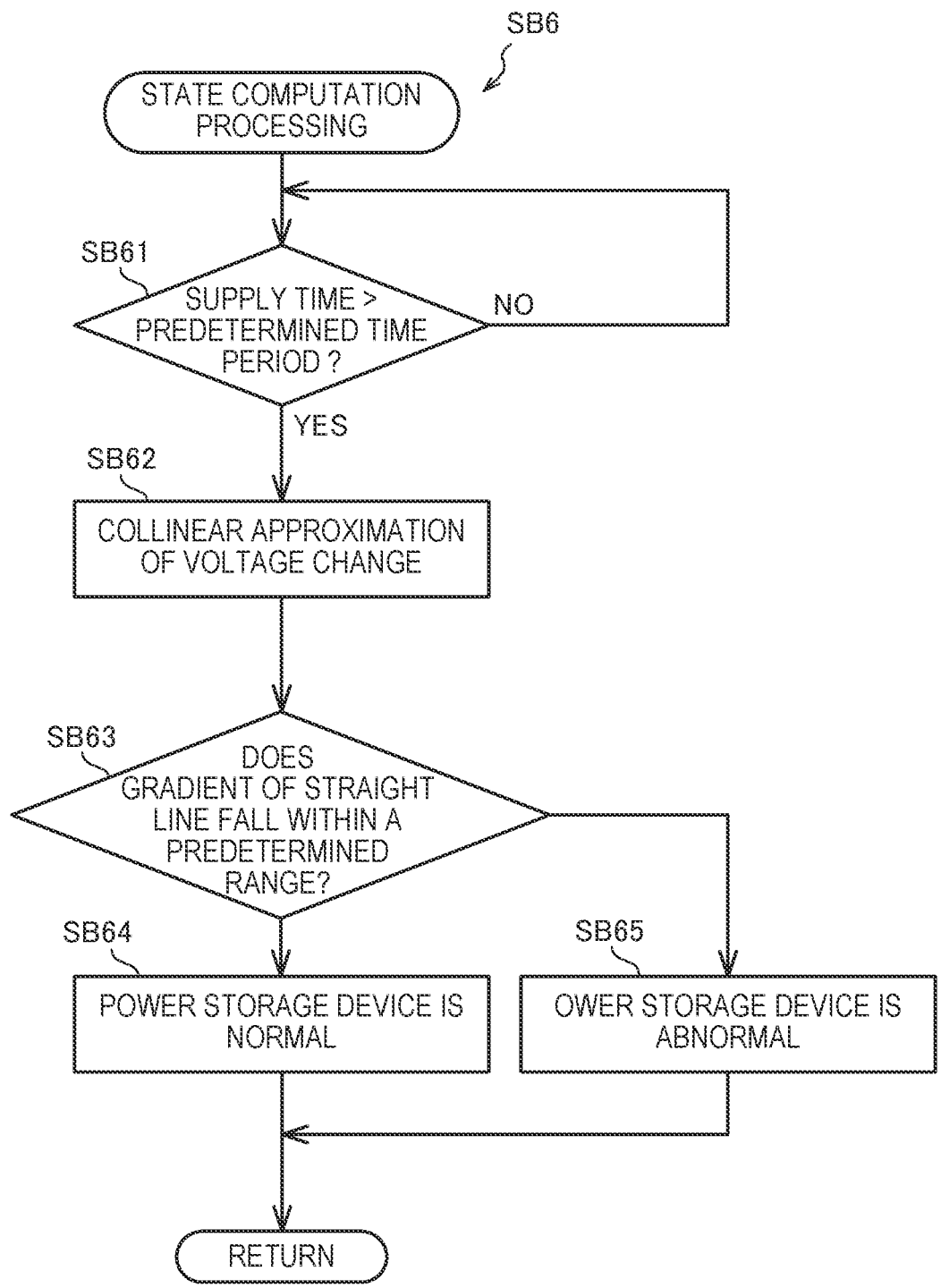
FIG. 13 is a flowchart showing an example of the state computation processing included in the measurement method.

FIG. 13 is a flowchart showing an example of the state computation processing (SB6) performed by the measurement apparatus 1B. FIG. 14 is a diagram showing an example of the voltage change in the power storage device 10 against a supply time of the micro-constant current in this embodiment. FIG. 15 is a diagram showing, as a comparative example, an example of the voltage change in the power storage device 10 against the supply time of the micro-constant current at the specific voltage value at which the electrostatic capacitance Cst of the power storage device 10 is maximized.

In an example shown in FIG. 13, as the state computation processing (SB6), the controller 50B determines whether the power storage device 10 is being passed or failed on the basis of the voltage change in the power storage device 10.

In Step SB61, the controller 50B determines whether or not the supply time that is the elapsed time since the start of the supply of the micro-constant current to the power storage device 10 has exceeded the predetermined time. The predetermined time period is set in advance to such a duration that the difference in the change in the voltage between the case in which the power storage device 10 is normal and the case in which the power storage device 10 is abnormal becomes apparent.

In Step SB61, when it is determined that the supply time of the constant current has not exceeded the predetermined time period, the controller 50B continues to supply the micro-constant current to the power storage device 10 until it is determined that the supply time has exceeded the predetermined time period. On the other hand, when it is determined that the supply time has exceeded the predetermined time period, the process proceeds to Step SB62 in the controller 50B.

As described above, the voltage sensor 40B measures an initial voltage that is a voltage at the start of the supply of the constant current and a micro-charging voltage in a state in which the constant current is supplied from the constant current source 20B. In other words, the voltage sensor 40B measures the voltage of the power storage device 10 at least twice including once in a state in which the constant current is supplied from the constant current source 20B.

In Step SB62, the controller 50B detects the voltage change in the power storage device 10 on the basis of the voltage of the power storage device 10 measured by the voltage sensor 40B. Specifically, the controller 50B obtains the approximate straight line for the voltage change in the power storage device 10 on the basis of the initial voltage at the start of the supply and the micro-charging voltage in a state in which the constant current is supplied from the constant current source 20B. More specifically, the controller 50B obtains the approximate straight line for the voltage change in the power storage device 10 by performing the least squares analysis on the basis of the micro-charging voltage measured at every control period.

Alternatively, the controller 50B may detect the voltage change in the power storage device 10 from the difference between the initial voltage at the start of the supply and supply voltage in a state in which the constant current is supplied from the constant current source 20B. In this case, because it suffices to measure the voltage of the power storage device 10 twice by the voltage sensor 40B, the voltage measurement may also be performed after being switched by using the multiplexer, for example. Thus, it is possible to simplify the measurement apparatus 1B.

In Step SB63, it is determined whether or not the gradient of the approximate straight line falls within the predetermined range. When it is determined that the gradient of the approximate straight line falls within the predetermined range between the upper limit value and the lower limit value, because the power storage device 10 is in the normal state, the process proceeds to Step SB64. On the other hand, in Step SB63, when it is determined that the gradient of the approximate straight line does not fall within the predetermined range, in other words, when it is determined that the gradient is larger than the upper limit value of the predetermined range, or the gradient is smaller than the lower limit value of the predetermined range, because the power storage device 10 is in the abnormal state, the process proceeds to Step SB65.

In Step SB64, the controller 50B notifies the user that the power storage device 10 is in the normal state by displaying it on the display unit 60B. On the other hand, in Step SB65, the controller 50B notifies the user that the power storage device 10 is in the abnormal state by displaying it on the display unit 60B.

By executing the state computation processing (SB6) described above, the pass/fail determination of the power storage device 10 is completed.

Next, specific examples of the processings in Steps SB62 and SB63 will be described with reference to FIGS. 14 and 15. In FIGS. 14 and 15, the horizontal axes indicate the supply time [s] that is the elapsed time since the start of the supply of the micro-constant current to the power storage device 10, and the vertical axes indicate a difference [μV] between the micro-charging voltage and the initial voltage measured by the voltage sensor 40B.

Figure 14:
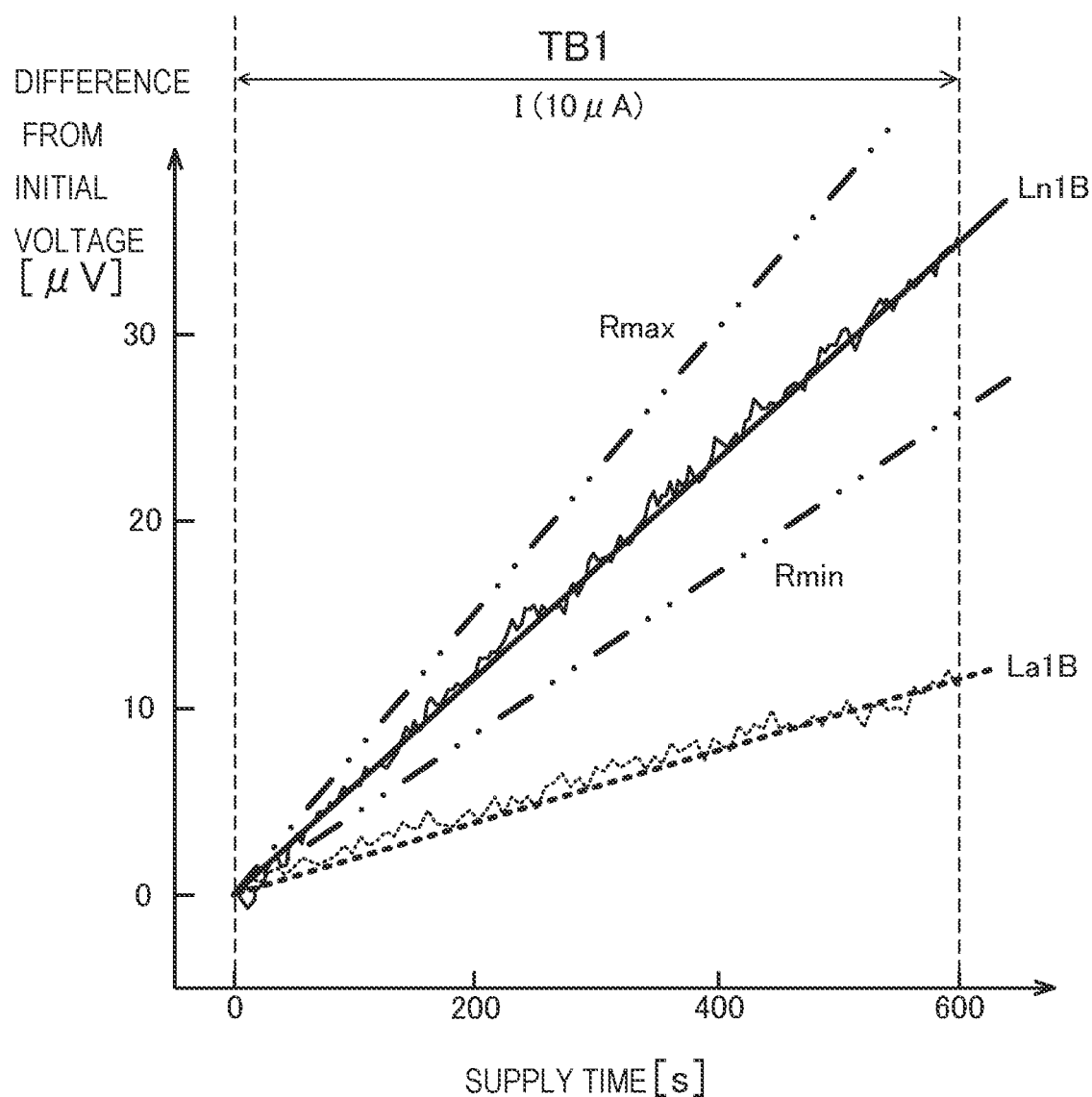
FIG. 14 is a diagram showing an example of the voltage change in the power storage device against supply time of constant current.

In an example shown in FIG. 14, the initial voltage at the start of the supply indicates the voltage value that is associated with the global minimum point A shown in FIG. 12, and the measurement data in a state in which the electrostatic capacitance Cst of the power storage device 10 is the smallest is shown.

The data shown by the solid line shown in FIG. 14 indicates the voltage change when the power storage device 10 is in the normal state, and the straight solid line indicates the approximate straight line Ln1B for the voltage change obtained in the processing in Step SB62. On the other hand, the data shown by the dotted line in FIG. 14 indicates the voltage change when the power storage device 10 is in the abnormal state, and the straight broken line indicates the approximate straight line La1B for the voltage change obtained in the processing in Step SB62. In addition, the gradient of the approximate straight line Ln1B is referred to as Rn, and the gradient of the approximate straight line La1B is referred to as Ra.

In addition, two two-dot chain straight lines shown in FIG. 14 respectively indicate the upper limit value Rmax and the lower limit value Rmin of the gradient of the approximate straight line, and the gradient for the power storage device 10 in the normal state lies between two two-dot chain straight lines. The upper limit value Rmax and the lower limit value Rmin of the gradient of the approximate straight line are set at ±10%, for example, of the approximate straight line that is measured and obtained in advance by using the power storage device 10 in the normal state.

Referring to FIG. 14, the approximate straight line Ln1B shown by the solid line (the gradient Rn) lies between the upper limit value Rmax and the lower limit value Rmin of the gradient of the approximate straight line. Thus, the controller 50B determines that the power storage device 10 is in the normal state. On the other hand, the approximate straight line La1B shown by the broken line (the gradient Ra) does not lie between the upper limit value Rmax and the lower limit value Rmin of the gradient of the approximate straight line. Thus, the controller 50B determines that the power storage device 10 is in the abnormal state.

As described above, the controller 50B determines whether the power storage device 10 is in the normal state or in the abnormal state on the basis of whether or not the gradient of the approximate straight line lies between the upper limit value Rmax and the lower limit value Rmin.

In an example shown in FIG. 14, although it takes a measurement time TB1 of 600 [s] to perform the pass/fail determination of the power storage device 10, the gradient difference between the approximate straight line Ln1B shown by the solid line and the approximate straight line La1B shown by the broken line can clearly be checked after the supply time of about 100 [s] has elapsed. As described above, in the measurement apparatus 1B, the pass/fail determination of the power storage device 10 can be executed within a short period of time of about a few minutes.

Figure 15:
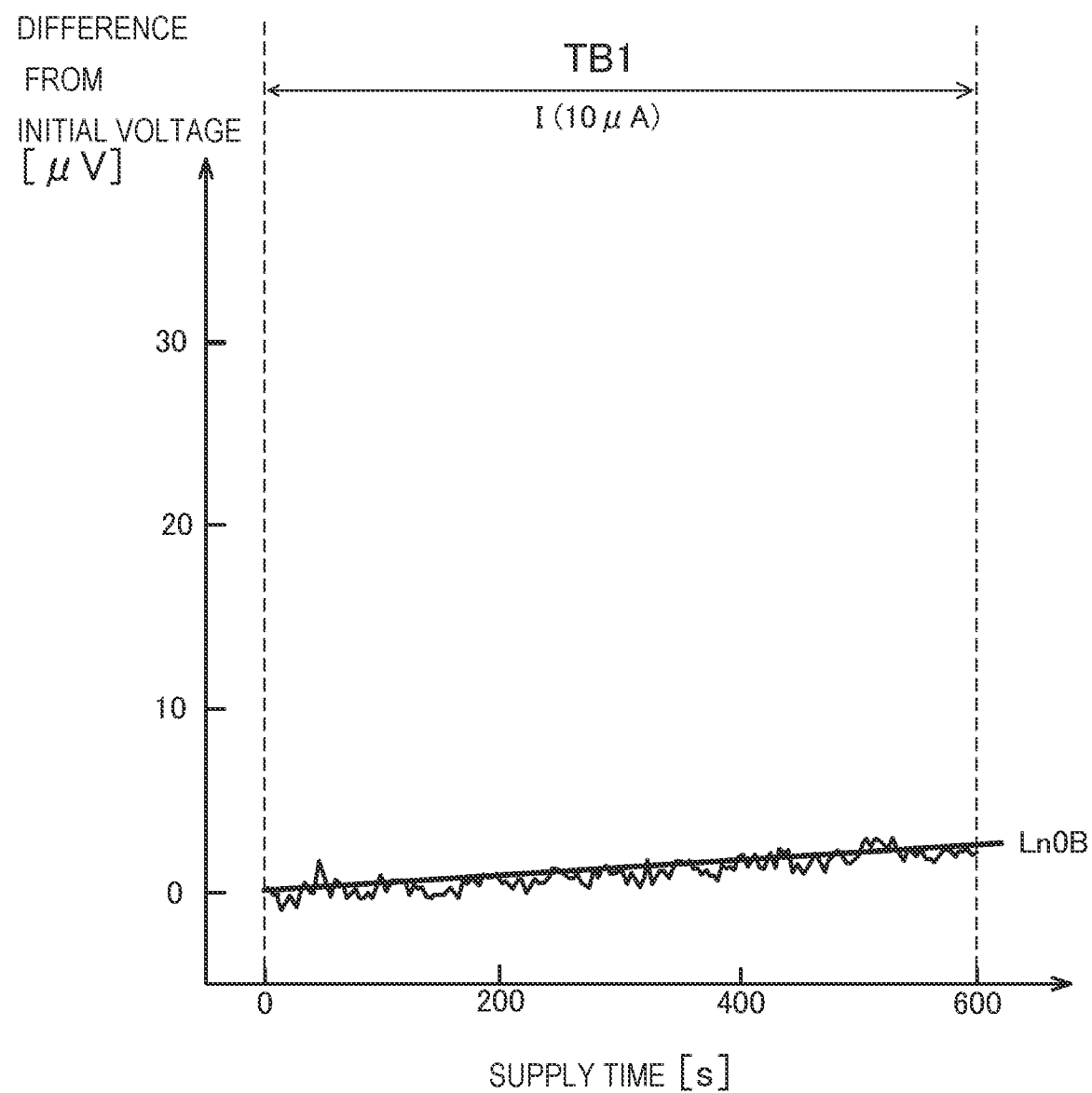
FIG. 15 is a diagram showing, as a comparative example for FIG. 14, an example of the voltage change in the power storage device against the supply time of the constant current in a state in which the electrostatic capacitance component of the power storage device becomes maximum.

On the other hand, an example shown in FIG. 15 shows the measurement data in a state in which the initial voltage at the start of the supply is the voltage value associated with the global maximum point B shown in FIG. 12 and the electrostatic capacitance Cst of the power storage device 10 is the largest. The data shown by the solid line indicates the voltage change when the power storage device 10 is in the normal state, and the straight solid line indicates the approximate straight line Ln0B for the voltage change obtained in the processing in Step SB62.

As shown in FIG. 15, because the gradient of the approximate straight line Ln0B shown by the solid line is substantially zero at the measurement time TB1 of 600 [s], it is difficult to perform the pass/fail determination. Therefore, when the electrostatic capacitance Cst of the power storage device 10 is relatively large, the time required to perform the pass/fail determination needs to be extended.

As described above, the measurement apparatus 1B in this embodiment charges the power storage device 10 with the micro-constant current from the constant current source 20B and detects the voltage change in the power storage device 10 by measuring the micro-charging voltage in a state in which the constant current is supplied. The measurement apparatus 1B then determines whether or not the thus-detected voltage change in the power storage device 10 falls within the normal range, and when it is determined that the voltage change falls within the normal range, the measurement apparatus 1B determines that the power storage device 10 is normal. Therefore, there is no need to wait until the voltage of the power storage device 10 is lowered by the self discharge, and so, the time required to perform the pass/fail determination of the power storage device 10 is short.

At this time, the constant current source 20B charges the power storage device 10 by supplying the constant current at a level that is lower than the overpotential and that mainly causes the electrical double layer reaction in the power storage device 10. Thus, because the level of the constant current is relatively low, the percentage of the current Ist [A] flowing through the power storage unit 13 with respect to the current Ipr [A] flowing through the parallel resistance 15 is large. Therefore, the difference in the gradient of the micro-charging curve between presence/absence of the parallel resistance 15 is increased, and so, it is easy to determine whether or not the power storage device 10 is normal.

In addition, the measurement apparatus 1B determines the measurement voltage so as to avoid the maximum value of the electrostatic capacitance Cst of the power storage device 10 on the basis of the property of the electrostatic capacitance Cst against the voltage of the power storage device 10. The measurement apparatus 1B performs the micro-charging when the voltage of the power storage device 10 becomes the measurement voltage. Therefore, reduction in the voltage change due to the electrostatic capacitance Cst of the power storage device 10 is suppressed.

Therefore, it is possible to perform the pass/fail determination of the power storage device 10 within a short period of time.

In the above-mentioned embodiment, the voltage sensor 40B measures the voltage of the power storage device 10 as the initial voltage after the supply of the micro-constant current has been started. However, alternatively, the voltage sensor 40B may measure the voltage of the power storage device 10 as the initial voltage before the supply of the micro-constant current is started. Also in this case, because the voltage of the power storage device 10 can be measured at least twice including once in a state in which the constant current is supplied, it is possible to obtain the approximate straight line for the voltage change in the power storage device 10.

Next, operational advantages according to the fourth embodiment will be described.

The measurement apparatus 1B in this embodiment forms the apparatus that detects the voltage change in the power storage device 10. The measurement apparatus 1B is provided with the constant current source 20B that supplies the constant current to the power storage device 10 (the supply means) and the voltage sensor 40B (the measurement means) that measures the voltage related to the power storage device 10 supplied with the constant current. Furthermore, the measurement apparatus 1B is provided with the controller 50B (the processing means) that detects the voltage change in the power storage device 10 subjected to the measurement. The measurement apparatus 1B then acquires the voltage change in the power storage device 10 on the basis of the electrical property serving as the reference of the power storage device 10.

In addition, the method for detecting the voltage change in the power storage device 10 in this embodiment includes the step of supplying the constant current to the power storage device 10, the step of measuring the voltage related to the power storage device 10 supplied with the constant current, and the step of detecting the voltage change in the power storage device subjected to the measurement. This method acquires, on the basis of the electrical property serving as the reference of the power storage device 10, the voltage change in the power storage device 10 that is changed in response to the level of the self-discharge current or the discharge resistance of the power storage device 10.

The electrical property serving as the reference of the power storage device 10 described above refers to the electrical property of the power storage device 10 in the open state and includes the relationship between the output voltage and the electrostatic capacitance Cst of the power storage device 10 at the open state, the variation in the open circuit voltage of the power storage device 10, and so forth.

The measurement apparatus 1B in this embodiment executes the processing for detecting the voltage change in the power storage device 10 on the basis of the information that indicates the electrical property of the power storage device 10 in the open state. Specifically, the controller 50B determines whether or not the voltage of the power storage device 10 has become the measurement voltage (the assigned voltage) based on the relationship between the output voltage and the electrostatic capacitance Cst of the power storage device 10 in the open state. When the voltage of the power storage device 10 has become the measurement voltage, the controller 50B acquires the voltage change in the power storage device 10 by causing the constant current to be supplied from the constant current source 20B to the power storage device 10. A more detail will be described below.

The measurement method that measures the state of the power storage device 10 in this embodiment includes a determining step (SB1) of determining the measurement voltage indicating the voltage value at the time when the state of the power storage device 10 is to be measured on the basis of the relationship between the voltage of the power storage device 10 and the electrostatic capacitance Cst of the power storage device 10. Furthermore, the measurement method includes a supplying step (SB4) of supplying the constant current to the power storage device 10 when the voltage of the power storage device 10 is the above-described measurement voltage and a measuring step (SB5) of measuring the voltage of the power storage device 10 supplied with the constant current. In addition, the measurement method includes a computing step (SB6) of computing the internal state of the power storage device 10 on the basis of the voltage change in the power storage device 10 subjected to the measurement.

The measurement apparatus 1B in this embodiment including the detection apparatus that detects the voltage change in the power storage device 10 is provided with the constant current source 20B that supplies the constant current to the power storage device 10 when the voltage of the power storage device 10 is the predetermined value. In addition, the measurement apparatus 1B is provided with the voltage sensor 40B that measures the voltage of the power storage device 10 supplied with the constant current and the controller 50B that detects the voltage change in the power storage device 10 on the basis of the thus-measured voltage of the power storage device 10. The predetermined value described above is set on the basis of the data for specifying the relationship between the voltage of the power storage device 10 and the electrostatic capacitance Cst of the power storage device 10. The relationship between the voltage and the electrostatic capacitance Cst of the power storage device 10 described above is included in the electrical property serving as the reference of the power storage device 10. Thus, the predetermined value is the voltage value based on the electrical property serving as the reference of the power storage device 10.

Furthermore, the measurement apparatus 1B that measures the state of the power storage device 10 in this embodiment is provided with the constant current source 20B, the voltage sensor 40B, and the controller 50B as described above. In addition, the controller 50B computes the internal state of the power storage device 10 on the basis of the voltage change in the power storage device 10 subjected to the measurement.

The differences in the internal state of the power storage device 10 appear as the difference in the temporal change in the voltage of the power storage device 10. Therefore, according to the configuration described above, by supplying the constant current to the power storage device 10, it is possible to increase the voltage change in the power storage device 10. Therefore, it is possible to reduce the time required to obtain the voltage change in and the internal state of the power storage device 10.

In addition, according to the configuration described above, the measurement voltage is determined to the predetermined value by considering the relationship between the voltage of the power storage device 10 and the electrostatic capacitance Cst of the power storage device 10. By doing so, because it becomes possible to supply the constant current to the power storage device 10 when the electrostatic capacitance Cst of the power storage device 10 is relatively small, it is possible to increase the voltage change in the power storage device 10.

As described above, because it becomes possible to increase the voltage change in the power storage device 10 by considering the electrostatic capacitance Cst of the power storage device 10, it is possible to obtain the state of the power storage device 10 within a short period of time.

In addition, according to the configuration described above, compared with a case in which the constant voltage is supplied to the power storage device 10, it is easier to supply the relatively low current by using the constant current source 20B. Thus, in the measurement apparatus 1B, by using the constant current source 20B, it is possible to stably supply the constant current at a level that is lower than the overpotential and that mainly causes the electrical double layer reaction in the power storage device 10.

In addition, the controller 50B of the measurement apparatus 1B in this embodiment determines the measurement voltage so as to avoid neighboring values of the specific voltage value at which the electrostatic capacitance Cst of the power storage device 10 is maximized in the range in which the voltage of the power storage device 10 is changed due to the normal discharging or charging. For example, the measurement voltage is set to the voltage value at which the electrostatic capacitance component of the power storage device 10 is smaller than the threshold value in the range in which the voltage of the power storage device 10 is changed due to the discharging or charging. The threshold value is set on the basis of the maximum value or the average value of the electrostatic capacitance Cst of the power storage device 10.

With such a configuration, when the electrostatic capacitance Cst of the power storage device 10 is smaller than the maximum value (the upper limit value), the constant current is supplied to the power storage device 10. By doing so, compared with a case in which the micro-charging is performed in a state in which the electrostatic capacitance Cst of the power storage device 10 is maximized, it is possible to increase the voltage change in the power storage device 10.

In addition, the controller 50B in this embodiment sets the measurement voltage of the power storage device 10 so as to be lower than the specific voltage value at which the electrostatic capacitance Cst of the power storage device 10 is maximized. By doing so, because the decomposition reaction generated in the power storage device 10 becomes less likely to be caused, it is possible to suppress the deterioration of the power storage device 10 while increasing the voltage change in the power storage device 10.

In addition, the controller 50B in this embodiment executes a controlling step (SB12) of controlling the charge or discharge of the power storage device 10 and a control measuring step (SB13) of measuring the voltage of the power storage device 10 when the control is being performed. Furthermore, the controller 50B executes a generating step (SB14) of generating the data for specifying the relationship between the voltage of the power storage device 10 and the electrostatic capacitance Cst of the power storage device 10 on the basis of the thus-measured voltage of the power storage device 10.

With such a configuration, because the measurement voltage of the power storage device 10 is determined on the basis of the measured data of the power storage device 10, it is possible to appropriately avoid the specific voltage value at which the electrostatic capacitance Cst of the power storage device 10 is maximized.

In addition, the constant current source 20B in this embodiment supplies the constant current at a level that is lower than the overpotential and that mainly causes the electrical double layer reaction in the power storage device 10.

With such a configuration, because the level of the constant current is low, the percentage of the current Ist [A] flowing through the power storage unit 13 with respect to the current Ipr [A] flowing through the parallel resistance 15 becomes large. Therefore, the difference in the gradient of the micro-charging curve between presence/absence of the parallel resistance 15 is increased, and so, it is easy to determine whether or not the power storage device 10 is normal.

<Modification>

Next, the controller 50B of the measurement apparatus 1B according to a modification of the fourth embodiment will be described. The controller 50B in this modification differs from that in the above-mentioned embodiment in that the measurement voltage is determined on the basis of a measurement condition of the power storage device 10.

The controller 50B in this modification sets the threshold value Th related to the electrostatic capacitance Cst shown in FIG. 12 on the basis of the measurement time TB1 that is required to measure the voltage of the power storage device 10 or the voltage changed amount $\Delta V$ that is required to detect the voltage change. In the following, the voltage changed amount $\Delta V$ refers to the changed amount from the initial voltage over the measurement time TB1.

For example, when the measurement time TB1 or the voltage changed amount $\Delta V$ is different for every individual the measurement apparatus 1B, the controller 50B calculates the upper limit value of the electrostatic capacitance Cst at which the voltage change can be detected on the basis of the measurement time TB1 and the voltage changed amount $\Delta V$ that are set in advance. Specifically, the controller 50B calculates the upper limit value of the electrostatic capacitance Cst by using the above-described equation (8) by substituting the value of the measurement time TB1 into dt and by substituting the value of the voltage changed amount $\Delta V$ into dt.

The controller 50B then sets the upper limit value of the thus-calculated electrostatic capacitance Cst to the threshold value Th. In other words, the threshold value Th is set on the basis of the measurement time TB1 or the voltage changed amount $\Delta V$. By doing so, the controller 50B can determine the voltage value lower than the upper limit value of the thus-calculated electrostatic capacitance Cst as the measurement voltage.

As described above, the controller 50B determines the measurement voltage of the power storage device 10 on the basis of the measurement time TB1 or the voltage changed amount $\Delta V$.

In addition, when the measurement time TB1 is variable, the controller 50B may set the measurement time TB1 on the basis of the present value of the voltage of the power storage device 10. In this case, once the controller 50B acquires the voltage of the power storage device 10 from the voltage sensor 40B, the controller 50B refers to the property data shown in FIG. 12 and calculates the electrostatic capacitance Cst that is associated with thus-acquired voltage. The controller 50B then calculates the value of the measurement time TB1 by substituting the thus-calculated electrostatic capacitance Cst and the preset voltage changed amount $\Delta V$ into the equation (8). The same applies to a case in which the voltage changed amount $\Delta V$ is variable.

According to the modification of the fourth embodiment, the controller 50B determines the measurement voltage of the power storage device 10 on the basis of the measurement time TB1 that is required to detect the voltage change in the power storage device 10 supplied with the constant current or the voltage changed amount $\Delta V$ that is required for the detection. By doing so, because the micro-charging is performed in a state in which the electrostatic capacitance Cst of the power storage device 10 does not exceed the upper limit, it is possible to ensure the measurement accuracy of the power storage device 10.

Fifth Embodiment

Next, the controller 50B of the measurement apparatus 1B according to a fifth embodiment will be described. In the following, the resistance value of the parallel resistance 15 is referred to as the discharge resistance Rpr, and the current flowing through the parallel resistance 15 is referred to as the self-discharge current Ipr.

The controller 50B in this embodiment differs from that in the fourth embodiment in that the discharge resistance Rpr or the self-discharge current Ipr of the power storage device 10 is computed.

The controller 50B switches the constant current supplied from the constant current source 20B to the power storage device 10 between the constant current indicating the first current value and the constant current indicating the second current value. In the following, the constant current indicating the first current value is also simply referred to as "the first constant current", and the constant current indicating the second current value is also simply referred to as "the second constant current".

Similarly to the fourth embodiment, the first current value is set to one or several times the reference value of the self-discharge current Ipr of the power storage device 10, and in this embodiment, the first current value is set to 10 [μA] that is one times the reference value of the self-discharge current Ipr. In addition, the second current value is set to at least ten times the reference value of the self-discharge current Ipr of the power storage device 10, and in this embodiment, the second current value is set to fifty times the reference value of the self-discharge current Ipr.

The above-described reference value of the self-discharge current Ipr is the known information. For example, the reference value of the self-discharge current Ipr is set in advance by using the statistical data obtained by aggregating the self-discharge current Ipr of the numerous power storage devices 10, the test results for the self-discharge current Ipr of the specific power storage device 10 whose electrical property is normal, or the like.

Next, the controller 50B detects the voltage change in the power storage device 10 on the basis of the voltage of the power storage device 10 for every level of the constant current supplied from the constant current source 20B.

In this embodiment, the controller 50B obtains, for every constant current, as shown in FIG. 14, the gradient for the voltage change in the power storage device 10 on the basis of the initial voltage at the start of the supply of the constant current and the micro-charging voltage in a state in which the constant current is supplied from the constant current source 20B. Alternatively, the controller 50B may obtain the approximate straight line Ln1B for the voltage change in the power storage device 10 for every level of the constant current supplied to the power storage device 10 and may use the gradient of the approximate straight line Ln1B as the gradient for the voltage change.

The controller 50B calculates the self-discharge current Ipr of the power storage device 10 by using the gradient for the voltage change in the power storage device 10 obtained for every level of the constant current and the numerical equation for obtaining the electrostatic capacitance Cst of the power storage unit 13 of the power storage device 10. The computing procedure of the self-discharge current Ipr of the power storage device 10 will be described.

The numerical equation for obtaining the electrostatic capacitance Cst of the power storage unit 13 can be expressed by using the gradient A1 for the voltage change at the time when the power storage device 10 is charged with the constant current indicating the first current value I1 and the current Ist [A] charged to the power storage unit 13. The current Ist [A] charged to the power storage unit 13 is the charged amount accumulated in the electrostatic capacitance Cst per unit time. The current Ist [A] charged to the power storage unit 13 corresponds to the value (I1−Ipr) that is obtained by subtracting the self-discharge current Ipr flowing through the parallel resistance 15 from the first current value I1 that is the current flowing through the internal resistance 14 shown in FIG. 8.

Therefore, the numerical equation for obtaining the electrostatic capacitance Cst of the power storage unit 13 can be expressed by using the self-discharge current Ipr of the power storage device 10, the first current value I1, and the gradient A1 for the voltage change at the time when the power storage device 10 is charged with the first constant current. The numerical equation for obtaining the electrostatic capacitance Cst of the power storage unit 13 is shown in the following equation (9).

[Numerical Equation 9]

$$C_{st} = \frac{I_1 - I_{pr}}{A1} \qquad (9)$$

Furthermore, the numerical equation for obtaining the electrostatic capacitance Cst of the power storage unit 13 can be expressed as in the following equation (10) by using the second current value I2 and the gradient A2 for the voltage change at the time when the power storage device 10 is charged with the constant current indicating the second current value I2.

[Numerical Equation 10]

$$C_{st} = \frac{I_2}{A2} \qquad (10)$$

In the above-described equation (10), the current Ist [A] charged to the electrostatic capacitance Cst corresponds to the value (I2−Ipr) obtained by subtracting the self-discharge current Ipr from the current value I2 of the second constant current. However, as described above, because the current value I2 of the second constant current that is the current flowing through the internal resistance 14 shown in FIG. 8 is sufficiently larger than the self-discharge current Ipr flowing through the parallel resistance 15, it can be approximated as in the following equation (11).

[Numerical Equation 11]

$$I_2 \approx (I_2 - I_{pr}) \qquad (11)$$

Therefore, in the above-described equation (10), the current value I2 of the second constant current is used instead of the current value (I2−Ipr) obtained by subtracting the self-discharge current Ipr from the current value I2 of the second constant current. Next, by solving the equation (9) and the equation (10) for the self-discharge current Ipr, the following equation (12) is derived.

[Numerical Equation 12]

$$I_{pr} = I_1 - \frac{A1}{A2}I_2 \quad (12)$$

As described above, by substituting the gradients A1 and A2 of the voltage change obtained for every level of the constant current and the current values I1 and I2 of the constant current into the numerical equation for obtaining the electrostatic capacitance Cst of the power storage unit 13, it is possible to calculate the self-discharge current Ipr of the power storage device 10.

Next, the controller 50B calculates the discharge resistance Rpr of the power storage device 10 on the basis of the thus-calculated self-discharge current Ipr.

In this embodiment, the controller 50B calculates the discharge resistance Rpr of the power storage device 10 by dividing the open circuit voltage (OCV) of the power storage device 10 by the self-discharge current Ipr of the power storage device 10. For the open circuit voltage (OCV) of the power storage device 10, the voltage value of the power storage device 10 measured by the voltage sensor 40B before the supply of the constant current is started may also used, or alternatively, for the open circuit voltage (OCV), a voltage value that is set in advance by using the test results for the power storage device 10, etc. may also be used.

Alternatively, the association table or the function expressing the relationship between the self-discharge current Ipr and the discharge resistance Rpr of the power storage device 10 may be stored in the controller 50B, and the controller 50B may calculate the discharge resistance Rpr by using the association table or the function.

Finally, the controller 50B determines whether or not the power storage device 10 is normal on the basis of the thus-calculated discharge resistance Rpr.

In this embodiment, the controller 50B determines whether or not the calculated value of the discharge resistance Rpr of the power storage device 10 falls within the predetermined resistance range. The upper limit value and the lower limit value of the predetermined resistance range are set in advance by using the statistical data obtained by aggregating the discharge resistance Rpr of the plurality of power storage devices 10, the test results for the specific power storage device 10 whose electrical property is normal, or the like.

When the controller 50B determines that the calculated value of the discharge resistance Rpr falls within the predetermined resistance range, the controller 50B determines that the power storage device 10 is in the normal state. In addition, when the controller 50B determines that the calculated value of the discharge resistance Rpr does not fall within the predetermined range, the controller 50B determines that the power storage device 10 is abnormal.

Alternatively, the diagnose table indicating the normal state or the abnormal state of the power storage device 10 for every discharge resistance Rpr may be stored in the controller 50B in advance. In this case, the controller 50B refers to the diagnose table after calculating the discharge resistance Rpr of the power storage device 10 and specifies the internal state of the power storage device 10 associated with the thus-calculated discharge resistance Rpr.

In this embodiment, although the controller 50B performs the pass/fail determination of the power storage device 10 on the basis of the calculated value of the discharge resistance Rpr, alternatively, it may be possible to determine whether or not the power storage device 10 is in the normal state by using the calculated value of the self-discharge current Ipr. In this case, the controller 50B determines whether or not the calculated value of the self-discharge current Ipr falls within the predetermined current range, for example, and when it is determined that the calculated value falls within the predetermined current range, the controller 50B determines that the power storage device 10 is in the normal state.

In addition, in this embodiment, the controller 50B controls the operation of the constant current source 20B such that the constant currents with different current values are successively supplied to the power storage device 10. However, if the electrostatic capacitance Cst of the power storage unit 13 is known, only the constant current indicating the first current value I1 may be supplied. In this case, the electrostatic capacitance Cst of the power storage unit 13 is stored in the controller 50B in advance. The controller 50B calculates the self-discharge current Ipr by substituting the electrostatic capacitance Cst of the power storage unit 13, the first current value I1, and the gradient A1 for the voltage change associated with the first current value I1 into the above-described equation (9).

The electrostatic capacitance Cst stored in the controller 50B is set in advance by using the statistical data obtained by aggregating the electrostatic capacitance Cst of the power storage unit 13 in the plurality of power storage devices 10, the test results for the specific power storage device 10, or the like. Alternatively, the electrostatic capacitance Cst of the power storage unit 13 may be obtained by charging the constant current indicating the second current value I2 to the power storage device 10 and by substituting the gradient A2 for the voltage change at this time and the second current value I2 into the above-described equation (10).

Figure 16:
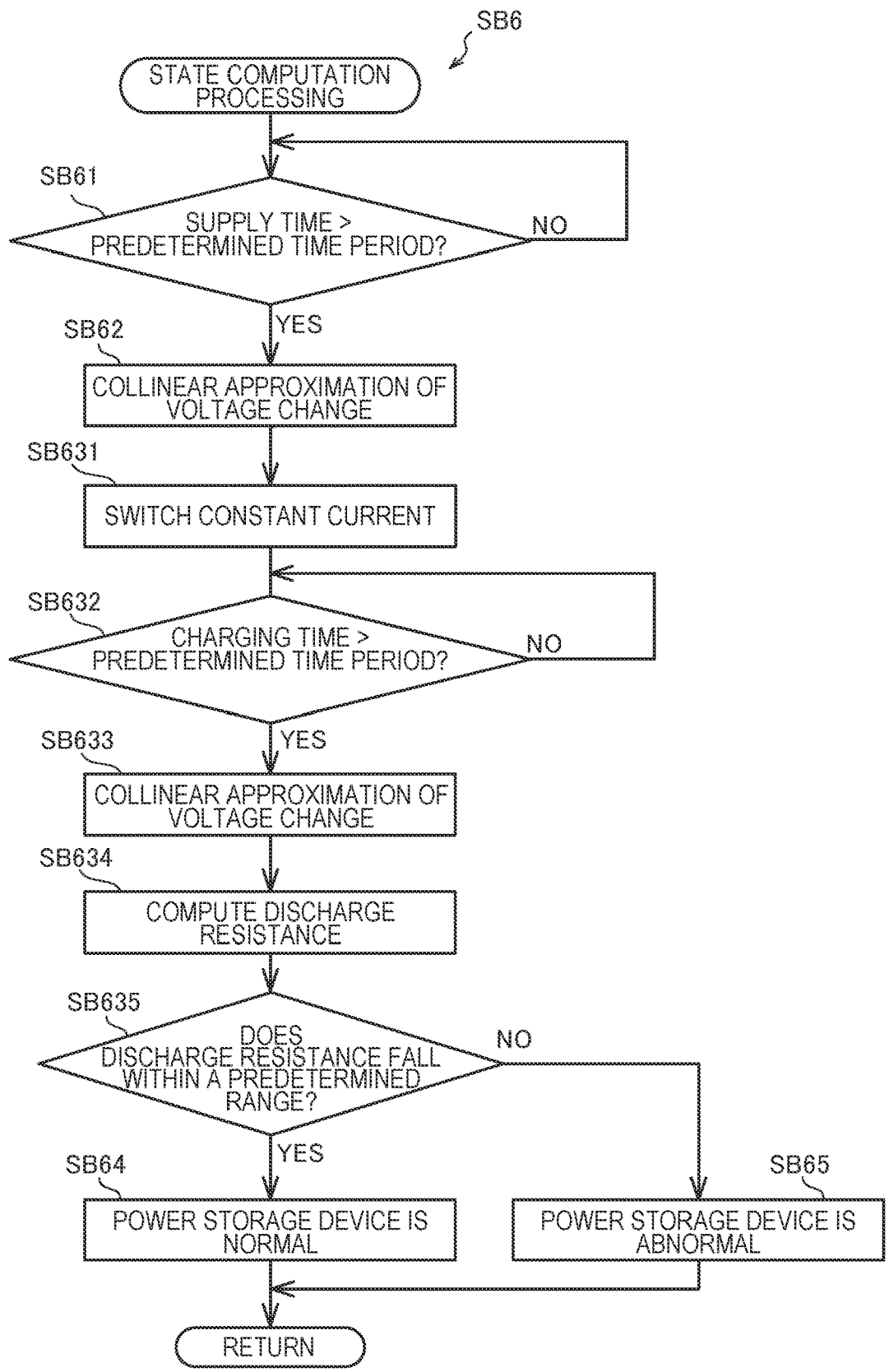
FIG. 16 is a flowchart showing the state computation processing according to a fifth embodiment.

Next, the measurement method that is performed by using the measurement apparatus 1B according to the fifth embodiment will be described with reference to FIG. 16. FIG. 16 is a flowchart showing an example of the state computation processing (SB6) performed by the measurement apparatus 1B.

The state computation processing (SB6) according to this embodiment includes processings in Steps SB631 to SB635 instead of the processing in Step SB63 shown in FIG. 13. In the following, only the respective processings in Steps SB631 to SB635 will be described, and because the other processings are same as those in the fourth embodiment, the descriptions thereof will be omitted.

In Step SB62, the controller 50B acquires the gradient A1 of the approximate straight line Ln1B by obtaining the approximate straight line Ln1B for the voltage change in the power storage device 10 at the time when the constant current indicating the first current value I1 is charged, which has been set in Step SB4 shown in FIG. 9. The process proceeds to Step SB631 in the controller 50B.

In Step SB631, the controller 50B switches the constant current supplied from the constant current source 20B to the power storage device 10 from the first constant current to the constant current indicating the second current value I2 that is higher than the first current value I1.

The processings in Steps SB632 and SB633 are similar to the respective processings in Steps SB61 and SB62. Therefore, in Steps SB632 and SB633, the controller 50B measures the voltage of the power storage device 10 only for the predetermined time period and acquires the gradient A2 of the approximate straight line Ln2 by obtaining the approximate straight line Ln2 for the voltage change at the time when the second constant current is charged.

In Step SB634, the controller 50B computes the discharge resistance Rpr of the power storage device 10 on the basis of the gradients A1 and A2 of the approximate straight lines acquired for every level of the constant current indicating the first current value I1 and the second current value I2.

In this embodiment, the controller 50B calculates the self-discharge current Ipr of the power storage device 10 by substituting the first current value I1, the gradient A1 of the approximate straight line, the second current value I2, and the gradient A2 of the approximate straight line into the above-described equation (12). The controller 50B then calculates the discharge resistance Rpr of the power storage device 10 by dividing the open circuit voltage (OCV) of the power storage device 10 by the self-discharge current Ipr of the power storage device 10.

In Step SB635, the controller 50B determines whether or not the power storage device 10 is normal on the basis of the thus-calculated discharge resistance Rpr of the power storage device 10.

In this embodiment, the controller 50B determines whether or not the calculated value of the discharge resistance Rpr falls within the predetermined resistance range. When it is determined that the calculated value of the discharge resistance Rpr falls within the predetermined resistance range, because the power storage device 10 is in the normal state, the process proceeds to Step SB64 in the controller 50B. On the other hand, when it is determined that the calculated value of the discharge resistance Rpr does not fall within the predetermined resistance range, in other words, when it is determined that the calculated value of the discharge resistance Rpr is larger than the upper limit value of the resistance range or smaller than the lower limit value of the resistance range, the power storage device 10 is in the abnormal state, and the process proceeds to Step SB65 in the controller 50B.

By executing the state computation processing (SB6) described above, the pass/fail determination of the power storage device 10 is completed.

In the example shown in FIG. 16, the controller 50B calculates the self-discharge current Ipr by obtaining the gradient for the voltage change in the power storage device 10 twice by switching the level of the constant current supplied to the power storage device 10 only once. Alternatively, the plurality of self-discharge currents Ipr may be calculated by successively obtaining the gradient of the approximate straight line for the voltage change by switching the level of the constant current a plurality of times, and the statistical value, such as the average value, the median, or the like, of the calculated values may be used as the final result.

In addition, in this embodiment, although the controller 50B calculates the self-discharge current Ipr by switching the level of the constant current supplied from the constant current source 20B to the positive electrode 11 of the power storage device 10, the present invention is not limited thereto. For example, the connection relationship between the constant current source 20B and the power storage device 10 may be inverted, the constant current may be supplied from the constant current source 20B to the negative electrode 12 of the power storage device 10 to discharge the power storage device 10, and in this state, the level of the constant current may be switched. Also in this case, as in the above-mentioned embodiment, it is possible to calculate the self-discharge current Ipr.

Furthermore, in this embodiment, although the level of the constant current supplied from the constant current source 20B to the power storage device 10 is switched, it is possible to calculate the self-discharge current Ipr and the discharge resistance Rpr even if the direction of the constant current is switched. In the following, the procedure of computing the self-discharge current Ipr of the power storage device 10 will be described briefly for a case in which the direction of the constant current to be supplied to the power storage device 10 is switched.

The electrostatic capacitance Cst of the power storage unit 13 can be expressed as in the following equation (13) by using the self-discharge current Ipr of the power storage device 10 and the gradient Ac of the voltage change at the time when the constant current indicating the first current value I1 is charged to the power storage device 10. Furthermore, the electrostatic capacitance Cst of the power storage unit 13 can be expressed as in the following equation (14) by using the self-discharge current Ipr of the power storage device 10 and the gradient Ad of the voltage change at the time when the power storage device 10 is discharged with the constant current indicating the second current value I2.

[Numerical Equation 13]

$$C_{st} = \frac{I_1 - I_{pr}}{Ac} \tag{13}$$

[Numerical Equation 14]

$$C_{st} = \frac{I_2 + I_{pr}}{Ad} \tag{14}$$

By solving the equation (13) and equation (14) described above for the self-discharge current Ipr, the following equation (15) is derived.

[Numerical Equation 15]

$$I_{pr} = \frac{I_1 \cdot Ad - I_2 \cdot Ac}{Ad + Ac} \tag{15}$$

Therefore, it is possible to calculate the self-discharge current Ipr of the power storage device 10 by substituting the gradient Ac of the voltage change at the time when charged with the constant current indicating the first current value I1 and the gradient Ad of the voltage change at the time when discharged with the constant current indicating the second current value I2 into the above-described equation (15). By dividing the open circuit voltage of the power storage device 10 by the thus-calculated self-discharge current Ipr, the discharge resistance Rpr can be calculated.

In this case, for the first current value I1 and the second current value I2, it suffices that the absolute value of at least one of the first current value I1 and the second current value I2 is set to one or several times the reference value of the self-discharge current Ipr, and the absolute values of the first current value I1 and the second current value I2 may have the same value with each other or different values from each other. For example, the first current value I1 is set to 10 [μA] that is one times the reference value of the self-discharge current Ipr, and the second current value I2 is set to the value obtained by multiplying the first current value I1 by "−1", i.e., −10 [μ. In addition, the gradient Ac, Ad of the voltage change are acquired by a procedure similar to that described in FIG. 14.

In addition, in this embodiment, although the controller 50B switches the level of the constant current, the direction of the constant current may be switched after the level of the constant current is switched, and the level of the constant current may be switched after the direction the constant current is switched. In such a case, because the plurality of self-discharge currents Ipr are obtained, the average value thereof, etc. may be used as the final result.

In addition, in this embodiment, although the controller 50B calculates the self-discharge current Ipr of the power storage device 10 by switching the constant current, the self-discharge current Ipr may be calculated without switching the constant current. For example, if the electrostatic capacitance Cst of the power storage unit 13 in the equation (9) is known, the self-discharge current Ipr may be calculated by obtaining the gradient A1 of the approximate straight line for the voltage change in the power storage device 10 and by substituting the gradient A1, the first current value I1, and the known electrostatic capacitance Cst into the above-described equation (9). Alternatively, the computation table indicating the relationship between the gradient A1 of the approximate straight line and the self-discharge current Ipr is generated by respectively substituting premeasured measurement values or estimated values into the electrostatic capacitance Cst of the power storage unit 13 and the first current value I1 in the above-described equation (9). Then, the thus-generated the computation table may be recorded in the controller 50B in advance. In this case, when the gradient A1 of the approximate straight line is obtained, the controller 50B refers to the computation table and calculates the self-discharge current Ipr that is associated with the thus-obtained gradient A1 of the approximate straight line.

In addition, as described above, the discharge resistance Rpr of the power storage device 10 is calculated by dividing the open circuit voltage (OCV) of the power storage device 10 by the self-discharge current Ipr. Therefore, if the open circuit voltage (OCV) of the power storage device 10 is known, the computation table indicating the relationship between the gradient A1 of the approximate straight line and the discharge resistance Rpr may be generated and may be stored in the controller 50B in advance. In this case, when the gradient A1 of the approximate straight line for the voltage change in the power storage device 10 is obtained, the controller 50B refers to the computation table and calculates the discharge resistance Rpr associated with the thus-obtained gradient A1 of the approximate straight line.

As described above, in this embodiment, because the self-discharge current Ipr or the discharge resistance Rpr is calculated on the basis of one or more voltage change(s) of the power storage device 10 detected within a short period of time, the controller 50B can rapidly estimate the internal state of the power storage device 10.

Next, operational advantages according to the fifth embodiment will be described.

The controller 50B of the measurement apparatus 1B in this embodiment computes the self-discharge current Ipr or the discharge resistance Rpr of the power storage device 10 through which the self-discharge current Ipr of the power storage device 10 flows on the basis of the voltage change in the power storage device 10 subjected to the measurement.

With such a configuration, it is possible to obtain the self-discharge current Ipr or the discharge resistance Rpr of the power storage device 10 by substituting the result detected for the voltage change in the power storage device 10 within a short period of time into the equation (9), equation (12), or equation (15) as described above, for example. Therefore, it is possible to measure the self-discharge current Ipr and the discharge resistance Rpr as the internal state of the power storage device 10 within a short period of time.

Sixth Embodiment

Figure 17:
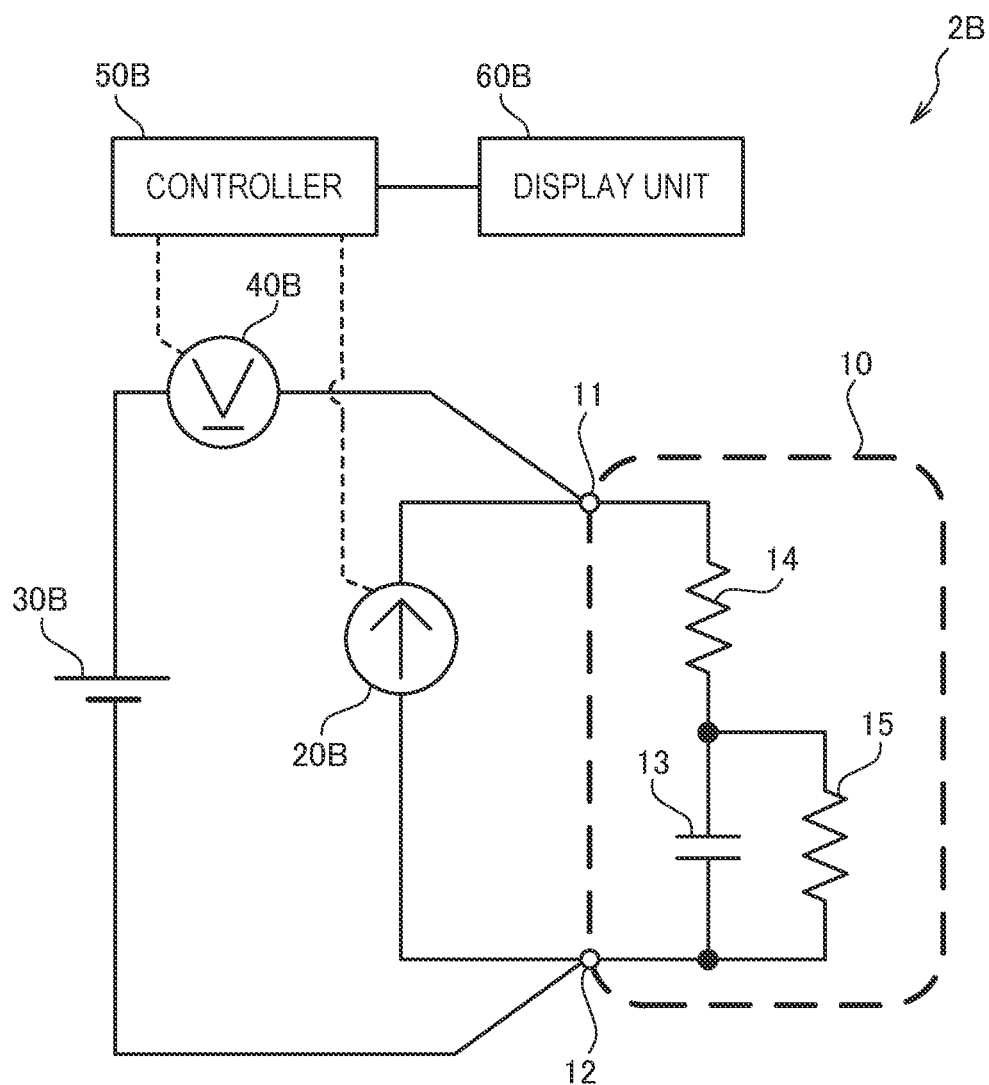
FIG. 17 is a diagram showing a configuration of the measurement apparatus of the power storage device according to a sixth embodiment.

Next, a measurement apparatus 2B according to a sixth embodiment will be described with reference to FIG. 17. FIG. 17 is a diagram showing a configuration of the measurement apparatus 2B. The measurement apparatus 2B is provided with a reference voltage source 30B in addition to the configuration shown in FIG. 8.

The reference voltage source 30B generates the reference voltage serving as the reference for the voltage of the power storage device 10. For example, when the voltage of the power storage device 10 is about 3 V, the reference voltage is set so as to fall within a range from "−1 V" to "+1 V" relative to the voltage of the power storage device 10. The reference voltage source 30B is formed of a voltage generation circuit, for example.

The voltage sensor 40B measures the electric potential difference between the voltage of the power storage device 10 and the reference voltage. In other words, the voltage sensor 40B indirectly measures the change in the voltage of the power storage device 10.

According to the sixth embodiment, because a part of the DC component of the voltage of the power storage device 10 is eliminated by measuring the electric potential difference between the voltage of the power storage device 10 and the reference voltage, it is possible to increase the resolution of the voltage sensor 40B. Thus, because the influence caused by the internal noise in the voltage sensor 40B is reduced, it is possible to reduce the measurement time.

The reference voltage source 30B may be formed of the other power storage device that is of the same type as the power storage device 10. By measuring the electric potential difference between the power storage device 10 and the other power storage device under the same environment, the voltage variation component associated with the temperature change in the power storage device 10 is eliminated, and so, it is possible to increase the detection accuracy of the voltage change due to the differences in the internal state of the power storage device 10.

Although the fourth to the sixth embodiments have been described in the above, the above-mentioned embodiments merely illustrate a part of application examples of the present invention, and the technical scope of the present invention is not intended to be limited to the specific configurations of the above-described embodiments.

For example, the extent of the voltage change in the power storage device 10 changes in accordance with the internal temperature of the power storage device 10. By utilizing this nature, the temperature table indicating the relationship between the voltage change in the power storage device 10 and the internal temperature may be stored in the controller 50B in advance. The controller 50B may estimate the internal temperature of the power storage device 10 on the basis of the thus-detected voltage change in the power storage device 10.

In addition, in the above-mentioned embodiment, although the self-discharge current Ipr and the discharge resistance Rpr are calculated by using the voltage change in the power storage device 10, the electrostatic capacitance Cst of the power storage unit 13 may also be calculated. For example, the electrostatic capacitance Cst of the power storage unit 13 is calculated by substituting the gradient A2 for the voltage change at the time when the power storage device 10 is charged with the constant current indicating the second current value I2 and the second current value I2 into the above-described equation (10).

In addition, the controller 50B may determine the internal state of the power storage device 10 on the basis of the thus-calculated electrostatic capacitance Cst. For example, the controller 50B determines whether the power storage device 10 is being passed or failed by determining whether or not the calculated value of the electrostatic capacitance Cst falls within the predetermined normal range.

In addition, in the above-mentioned embodiment, although single power storage device 10 is subjected to the measurement, it is possible to measure the power storage apparatus in which the plurality of power storage devices 10 are connected in series. In addition, although the measurement apparatus 1B includes the display unit 60B, the display unit 60B may be omitted.

Seventh Embodiment

In the following, the measurement apparatus of the power storage device 10 according to a seventh embodiment (hereinafter, simply referred to as "the measurement apparatus") 1C will be described with reference to FIGS. 18 to 25.

Figure 18:
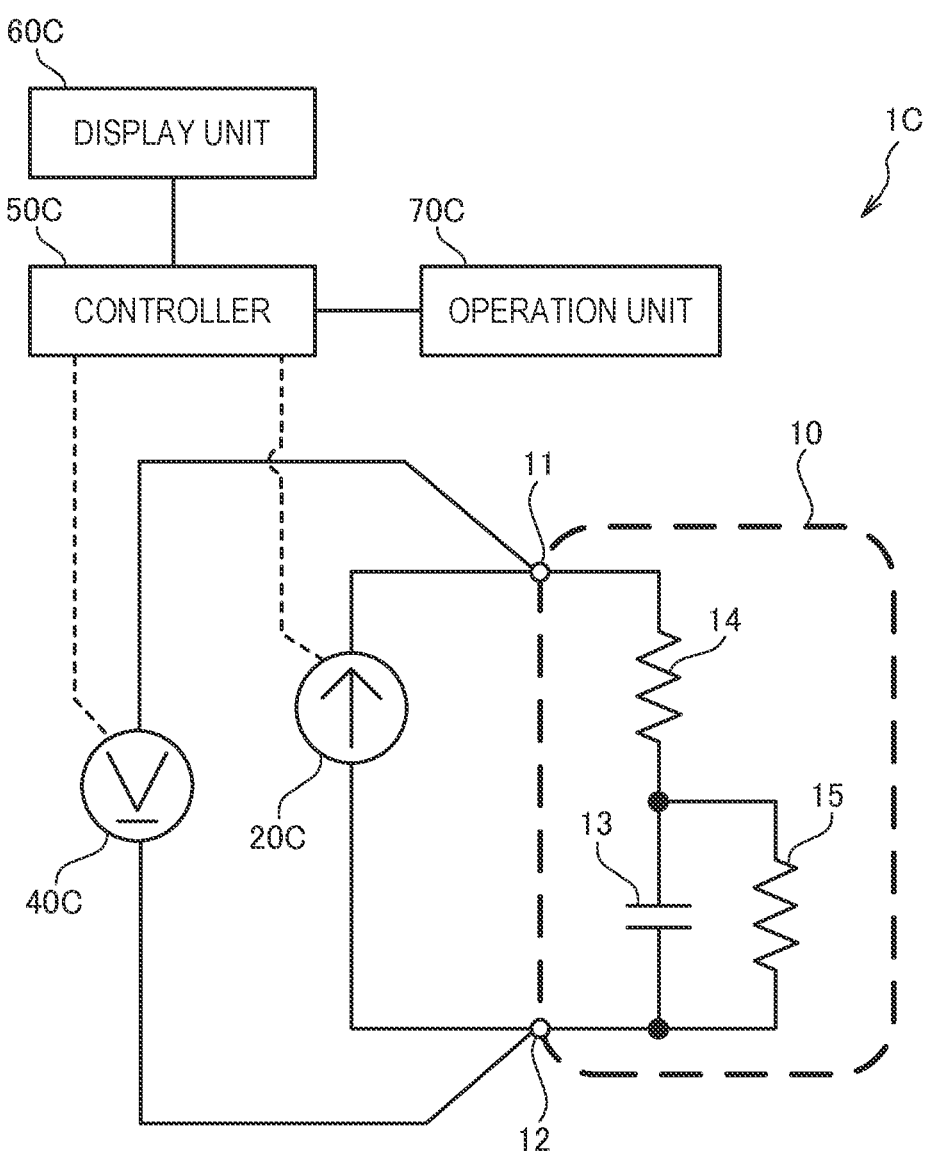
FIG. 18 is a diagram showing a configuration of the measurement apparatus of the power storage device according to a seventh embodiment.

The configuration of the power storage device 10 and a configuration of the measurement apparatus 1C will be described first with reference to FIG. 18. FIG. 18 is a diagram showing the configuration of the measurement apparatus 1C.

The power storage device 10 is the single power storage cell of the lithium ion secondary battery, for example. The power storage device 10 is not limited to the secondary battery (the chemical battery), and for example, it may be the electric double-layer capacitor. In addition, the power storage device 10 may also be the power storage module in which the plurality of power storage cells are connected in series.

As shown in FIG. 18, the power storage device 10 is shown by an equivalent circuit model. According to the equivalent circuit model, the power storage device 10 has the positive electrode 11, the negative electrode 12, the power storage unit 13, the internal resistance 14, and the parallel resistance 15. The power storage unit 13, the internal resistance 14, and the parallel resistance 15 are each the element of the equivalent circuit showing the internal state of the power storage device 10.

The power storage unit 13 is the electrostatic capacitance component of the power storage device 10. When a voltage higher than the cell voltage of the power storage device 10 is applied, charge is accumulated, and the power storage unit 13 is charged. In the power storage unit 13, when the flowing current is relatively low during the charging, the electrical double layer reaction is mainly caused, and when the flowing current is relatively high during the charging, the chemical reaction is mainly caused. In this description, the electrostatic capacitance of the power storage unit 13 is referred to as Cst [F], and the current flowing in the power storage unit 13 is referred to as Ist [A].

The internal resistance 14 is the series resistance that is connected to the power storage unit 13 in series between the positive electrode 11 and the negative electrode 12. In this description, the resistance value of the internal resistance 14 is referred to as Rir [m Ω], and the current flowing through the internal resistance 14 is referred to as Iir [A].

The parallel resistance 15 is the discharge resistance that is connected to the power storage unit 13 in parallel. The current flowing through the parallel resistance 15 is the self-discharge current, the so-called leakage current. In this description, the resistance value of the parallel resistance 15 is referred to as Rpr [kΩ], and the self-discharge current flowing through the parallel resistance 15 is referred to as Ipr [A].

The measurement apparatus 1C is the apparatus or the system for measuring the state of the power storage device 10 and includes the detection apparatus that detects the temporal change of the voltage of the power storage device 10, in other words, the voltage change. The measurement apparatus 1C is provided with a constant current source 20C serving as the supply means, a voltage sensor 40C serving as the measurement means, a controller 50C serving as acquisition means and the computation means, and a display unit 60C.

The constant current source 20C is the DC power supply that charges the power storage device 10 by supplying the constant current, which is for detecting the internal state of the power storage device 10, to the positive electrode 11 of the power storage device 10. The constant current source 20C maintains the current to be supplied to the power storage device 10 at a predetermined. The constant current source 20C charges the power storage device 10 by supplying the constant current at a level that is lower than the overpotential and that mainly causes the electrical double layer reaction in the power storage device 10.

In this embodiment, the constant current supplied from the constant current source 20C is set to one or several times the value serving as the reference of the self-discharge current Ipr of the power storage device 10. The reference value of the self-discharge current Ipr is the known information, and is, for example, set in advance by using the statistical data obtained by aggregating the self-discharge current Ipr of the numerous power storage devices 10, the test results for the specific power storage device 10 whose electrical property is normal, or the like. For example, the constant current supplied from the constant current source 20C is set to 10 [μA]. As described above, the constant current is set on the basis of the value of the self-discharge current Ipr of the power storage device 10.

When the power storage device 10 is charged by applying the constant voltage to the power storage device 10, it is difficult to stably apply the constant voltage at a level that is lower than the overpotential and that mainly causes the electrical double layer reaction in the power storage device 10. In contrast, it is easier to supply the relatively low current on the order of a microampere (μA) by using the constant current source 20C. Thus, in the measurement apparatus 1C, by using the constant current source 20C, it is possible to stably supply the constant current at a level that is lower than the overpotential and that mainly causes the electrical double layer reaction in the power storage device 10.

The voltage sensor 40C is the DC voltmeter that measures the voltage of the power storage device 10. The voltage sensor 40C outputs the electric signal indicating the thus-measured voltage in a time series to the controller 50C. In this embodiment, the voltage sensor 40C measures the voltage of the power storage device 10 at least twice including once in a state in which the constant current is supplied from the constant current source 20C.

The controller 50C is formed of the microcomputer provided with the central processing unit (the CPU), the read-only memory (the ROM), the random-access memory (the RAM), and the input-output interface (the I/O interface). The controller 50C may also be formed of the plurality of microcomputers. The controller 50C is the control apparatus that controls various kinds of operations of the measurement apparatus 1C by reading out the program stored in the ROM by the CPU.

The controller 50C executes a state measurement processing in which the internal state of the power storage device 10 is measured by controlling the constant current source 20C and the voltage sensor 40C. Specifically, the controller 50C controls the current supply from the constant current source 20C to the power storage device 10 and computes the internal state of the power storage device 10 on the basis of the electric signal indicating the voltage measured by the voltage sensor 40C.

For example, the controller 50C acquires the electric signal from the voltage sensor 40C in a state in which the constant current is supplied from the constant current source 20C to the power storage device 10 and detects the temporal change for the voltage of the power storage device 10 that is indicated by the electric signal. The controller 50C estimates the self discharge state of the power storage device 10 on the basis of the thus-detected voltage change in the power storage device 10.

The display unit 60C notifies the user of the information, such as the determination result, the calculation result, or the like obtained from the controller 50C, by displaying such information. The display unit 60C is the touch screen, for example, and is formed such that the information is visible to the user and it is operable by the user.

An operation unit 70C generates an operation signal for operating the operation of the controller 50C. For example, the operation unit 70C is an input device configured of a key board, a mouse, and so forth. By input operation performed by the user, the operation unit 70C outputs, to the controller 50C, the operation signal that instructs execution of the state measurement processing, for example.

Figure 19:
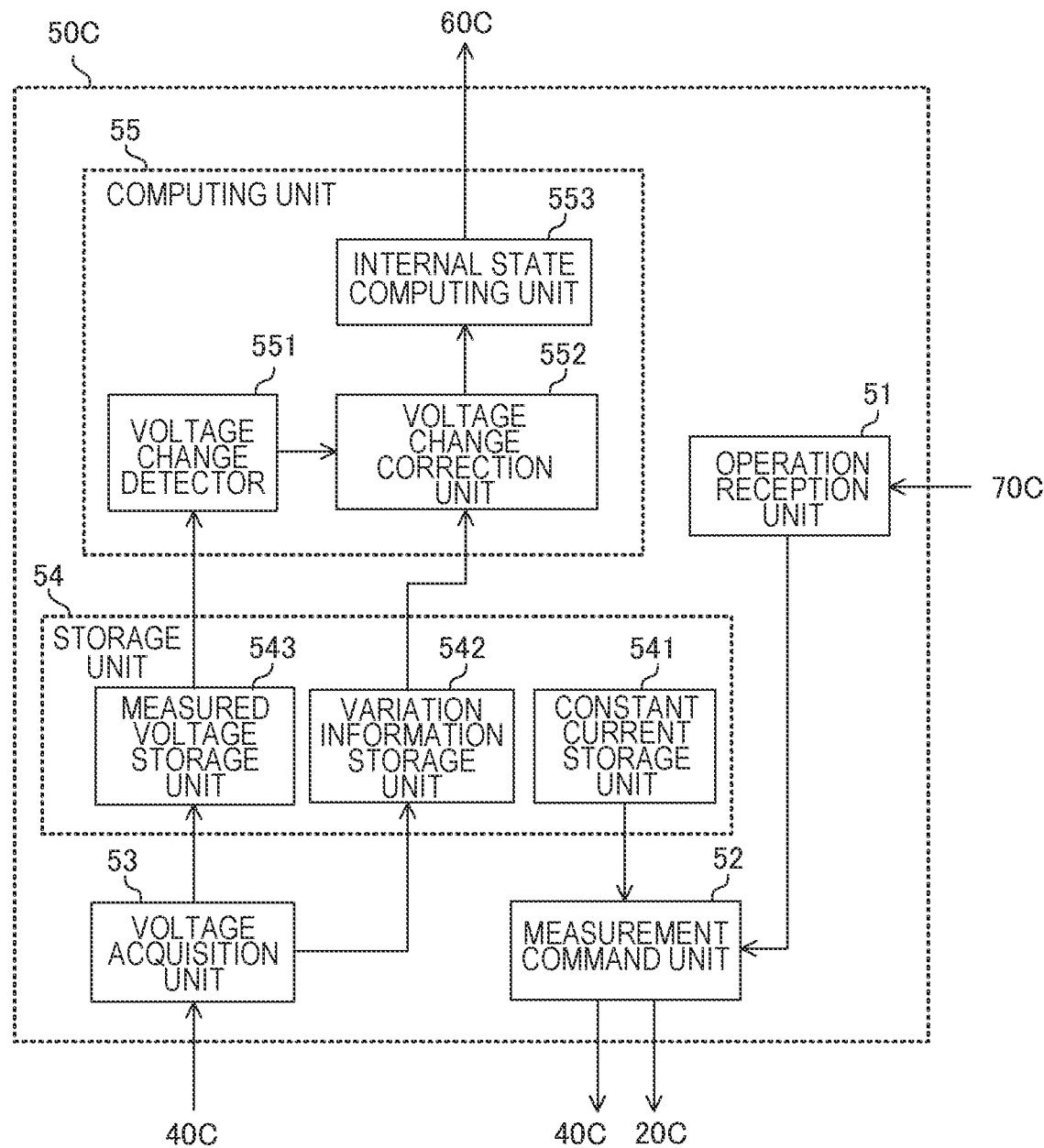
FIG. 19 is a block diagram showing a functional configuration of a controller included in the measurement apparatus.

Next, the configuration of the controller 50C of the measurement apparatus 1C according to this embodiment will be described with reference to FIG. 19. FIG. 19 is a block diagram showing a functional configuration of the controller 50C.

The controller 50C is provided with an operation reception unit 51, a measurement command unit 52, a voltage acquisition unit 53, a storage unit 54, and a computing unit 55.

The operation reception unit 51 receives the operation signal generated by the operation unit 70C shown in FIG. 18. As the operation reception unit 51 receives the operation signal that instructs the execution of the state measurement processing of the power storage device 10, the operation reception unit 51 instructs the measurement command unit 52 to execute the state measurement processing.

As the measurement command unit 52 receives the above-described instruction from the operation reception unit 51, the measurement command unit 52 sends, to the constant current source 20C, a control signal indicating the current value for detecting the self-discharge current Ipr of the power storage device 10. In addition, the measurement command unit 52 sends, to the voltage sensor 40C, the control signal that instructs the voltage measurement of the power storage device 10.

The voltage acquisition unit 53 receives the electric signal indicating the voltage of the power storage device 10 from the voltage sensor 40C. The voltage acquisition unit 53 records the received electric signal in the storage unit 54 as the measurement data.

The storage unit 54 is formed of the ROM and the RAM and forms a computer-readable storage medium in which a program for executing the state measurement processing of the power storage device 10 is recorded. The storage unit 54 stores the information required to execute the state measurement processing of the power storage device 10.

In this embodiment, the storage unit 54 is provided with a constant current storage unit 541, a variation information storage unit 542, and a measured voltage storage unit 543.

The constant current storage unit 541 stores the current value of the constant current supplied from the constant current source 20C to the power storage device 10. The current value stored in the constant current storage unit 541 may be set in advance and may be recorded from the operation reception unit 51 by the input operation of the user. In this embodiment, the current value of the constant current is set to the reference value of the self-discharge current Ipr of the power storage device 10 and is set to 10 [μA], for example.

The variation information storage unit 542 stores the variation information for specifying the variation in the open circuit voltage of the power storage device 10. The open circuit voltage of the power storage device 10 described herein refers to the voltage of the power storage device 10 in a state in which the state of the power storage device 10 is the state in which the positive electrode 11 and the negative electrode 12 are opened. For example, even in a state in which the constant current source 20C is connected to the power storage device 10, a state in which the supply of the constant current from the constant current source 20C to the power storage device 10 is stopped is also included in the state in which the positive electrode 11 and the negative electrode 12 of the power storage device 10 are opened.

As the variation information stored in the variation information storage unit 542, for example, the measured data that indicates the temporal change in the open circuit voltage of the power storage device 10, the statistical data, the theoretical data obtained from theoretical equation, the simulation result obtained using the equivalent circuit, or the like are used. In addition, instead of the above-described data, an approximation equation that approximates the temporal change in the open circuit voltage of the power storage device 10, a gradient of the approximate straight line, or the like may also be used as the variation information.

In this embodiment, as the variation information of the power storage device 10, the electric signal that indicates, in a time series, the open circuit voltage of the power storage device 10 measured by the voltage sensor 40C immediately before the supply of the constant current to the power storage device 10 is stored in the variation information storage unit 542. In this case, the voltage acquisition unit 53 acquires the electric signal indicating the open circuit voltage of the power storage device 10 from the voltage sensor 40C immediately before the start of the supply of the constant current from the constant current source 20C. In addition, the voltage acquisition unit 53 records the thus-acquired electric signal to the variation information storage unit 542 as the variation information of the power storage device 10.

The measured voltage storage unit 543 stores the measurement data indicating the measured voltage of the power storage device 10 in a time series. The measured voltage of the power storage device 10 described herein refers to the voltage of the power storage device 10 measured by the voltage sensor 40C in a state in which the constant current is supplied from the constant current source 20C to the power storage device 10. When the constant current is supplied to the power storage device 10, the voltage acquisition unit 53 records the electric signal acquired from the voltage sensor 40C to the measured voltage storage unit 543 as the measurement data.

The computing unit 55 computes the internal state of the power storage device 10 on the basis of the change in the measured voltage of the power storage device 10 supplied with the constant current. At this time, the computing unit 55 corrects the change in the measured voltage of the power storage device 10 on the basis of the variation information stored in the storage unit 54 in advance.

In this embodiment, the computing unit 55 is provided with the voltage change detector 551, a voltage change correction unit 552, and an internal state computing unit 553.

The voltage change detector 551 forms the detection means that detects the change in the measured voltage of the power storage device 10 on the basis of the measured voltage of the power storage device 10 measured by the voltage sensor 40C.

In this embodiment, the voltage change detector 551 reads out the measurement data for the power storage device 10 from the measured voltage storage unit 543 and obtains, on the basis of the measurement data thus read out, a gradient of the temporal change of the measured voltage of the power storage device 10, in other words, a rate of temporal change of the measured voltage. For example, the voltage change detector 551 refers to the measured voltage storage unit 543. The voltage change detector 551 then obtains the gradient for the voltage change in the power storage device 10 in a state in which the constant current is supplied on the basis of the initial voltage at the start of the supply of the constant current and the charging voltage in a state in which the constant current is supplied from the constant current source 20C.

The voltage change detector 551 outputs the thus-obtained gradient for the voltage change to the voltage change correction unit 552 as the detection result. As the detection result, the voltage change detector 551 may calculate, instead of the gradient for the voltage change, the changed amount of the measured voltage over a period from the start of the supply of the constant current until the measurement time set in advance has elapsed.

The voltage change correction unit 552 forms correcting means that corrects the change in the measured voltage of the power storage device 10 on the basis of the variation information of the power storage device 10 stored in the variation information storage unit 542.

In this embodiment, the voltage change correction unit 552 reads out the variation information of the power storage device 10 from the variation information storage unit 542 and specifies the variation in the open circuit voltage of the power storage device 10 on the basis of the thus-read out variation information. The voltage change correction unit 552 corrects the change in the measured voltage of the power storage device 10 by subtracting the specified variation in the open circuit voltage from the change in the measured voltage of the power storage device 10 detected by the voltage change detector 551.

Specifically, the voltage change correction unit 552 obtains the gradient of the voltage variation in the open circuit voltage of the power storage device 10 on the basis of the variation information that indicates the open circuit voltage of the power storage device 10 measured by the voltage sensor 40C in a time series. Subsequently, once the voltage change correction unit 552 acquires the gradient of the temporal change of the measured voltage of the power storage device 10 from the voltage change detector 551, the voltage change correction unit 552 then subtracts the gradient of the acquired temporal change from the gradient of the obtained voltage variation. The voltage change correction unit 552 then outputs the value obtained by the subtraction to the internal state computing unit 553 as the change in the measured voltage after the correction.

Alternatively, the voltage change correction unit 552 may obtain the varied amount of the open circuit voltage per the measurement time of the power storage device 10 on the basis of the variation information. The voltage change correction unit 552 may then use, as the change in the measured voltage after the correction, the value obtained by subtracting the thus-obtained varied amount from the changed amount of the measured voltage per the measurement time of the power storage device 10.

As described above, the voltage change correction unit 552 forms subtraction-correcting means that corrects the change in the measured voltage of the power storage device 10 by subtracting the variation in the open circuit voltage that is specified by the variation information of the power storage device 10 from the change in the measured voltage detected by the voltage change detector 551.

The internal state computing unit 553 forms the computation means that computes the internal state of the power storage device 10 on the basis of the thus-corrected change in the measured voltage by the voltage change correction unit 552.

For example, the internal state computing unit 553 determines whether the internal state of the power storage device 10 is being passed or failed on the basis of the thus-corrected change in the measured voltage of the power storage device 10. Alternatively, the internal state computing unit 553 may calculate the self-discharge current flowing through the parallel resistance 15 shown in FIG. 18, the resistance value of the parallel resistance 15, or the electrostatic capacitance of the power storage unit 13 on the basis of the change in the measured voltage of the power storage device 10, which has been corrected.

In this embodiment, the internal state computing unit 553 determines that the power storage device 10 is normal when the change in the measured voltage after the correction falls within the normal range, and the internal state computing unit 553 determines that the power storage device 10 is abnormal when the change in the measured voltage after the correction does not fall within the normal range. As described above, the internal state computing unit 553 determines whether the power storage device 10 is being passed or failed.

Specifically, once the internal state computing unit 553 acquires the gradient of the measured voltage after the correction from the voltage change correction unit 552, the internal state computing unit 553 then determines whether the power storage device 10 is being passed or failed on the basis of the thus-acquired gradient of the measured voltage. The internal state computing unit 553 outputs the determination result indicating the abnormal state or the normal state of the power storage device 10 to the display unit 60C.

Next, operation of the measurement apparatus 1C according to this embodiment will be described with reference to FIG. 20.

Figure 20:
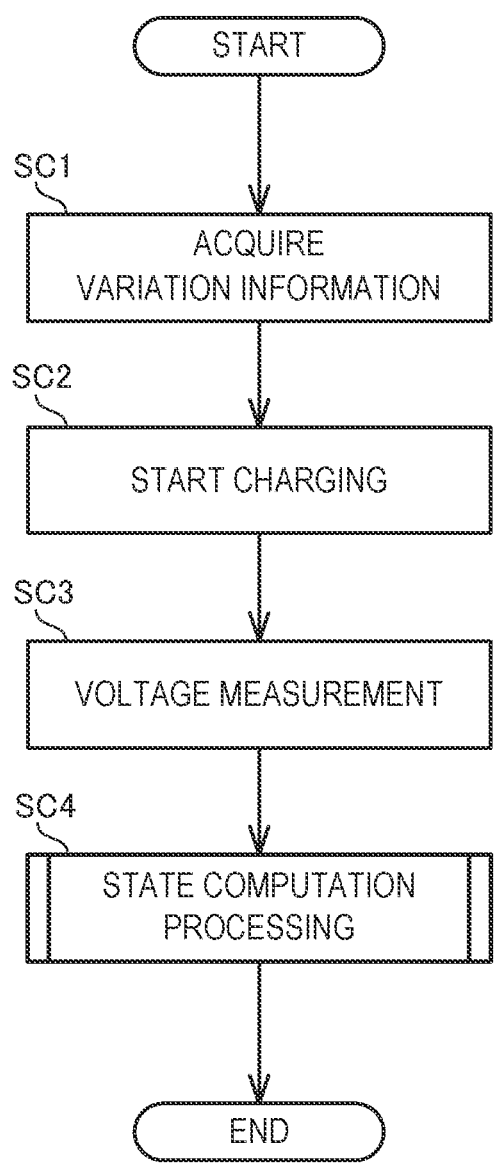
FIG. 20 is a flowchart showing the measurement method of the power storage device using the measurement apparatus according to the seventh embodiment.

FIG. 20 is a flowchart showing an example of the measurement method for measuring the state of the power storage device 10 by using the measurement apparatus 1C. In this example, the measurement apparatus 1C executes the measurement in the environment in which the temperature change in the power storage device 10 is suppressed by, for example, storing the power storage device 10 in the constant temperature oven capable of maintaining the constant ambient temperature.

When the above-described measurement is to be executed, the measurement apparatus 1C is first connected to the power storage device 10, and a state in which the voltage of the power storage device 10 can be measured and a state in which the constant current can be supplied from the constant current source 20C to the power storage device 10 are established by the voltage sensor 40C.

In Step SC1, the controller 50C acquires the variation information that specifies the variation in the open circuit voltage of the power storage device 10.

In this example, the controller 50C causes the voltage sensor 40C to measure the voltage of the power storage device 10 immediately before the constant current is supplied from the constant current source 20C to the power storage device 10. The controller 50C then acquires the electric signal indicating the open circuit voltage of the power storage device 10 from the voltage sensor 40C as the variation information, and thereafter, the process proceeds to Step SC2.

In Step SC2, the controller 50C starts the charging of the power storage device 10 by supplying the constant current from the constant current source 20C to the power storage device 10.

In Step SC3, the controller 50C causes the voltage sensor 40C to measure the voltage of the power storage device 10 in a state in which the constant current is supplied from the constant current source 20C. By doing so, the electric signal indicating the measured voltage of the power storage device 10 is input from the voltage sensor 40C to the controller 50C.

In Step SC4, the controller 50C executes the state computation processing that computes the internal state of the power storage device 10 on the basis of the measured voltage of the power storage device 10 indicated by the electric signal. The state computation processing will be described below with reference to FIG. 23.

Once the processing in Step SC4 is completed, a series of processing procedures for the measurement method that is performed by using the measurement apparatus 1C is finished.

Figure 21:
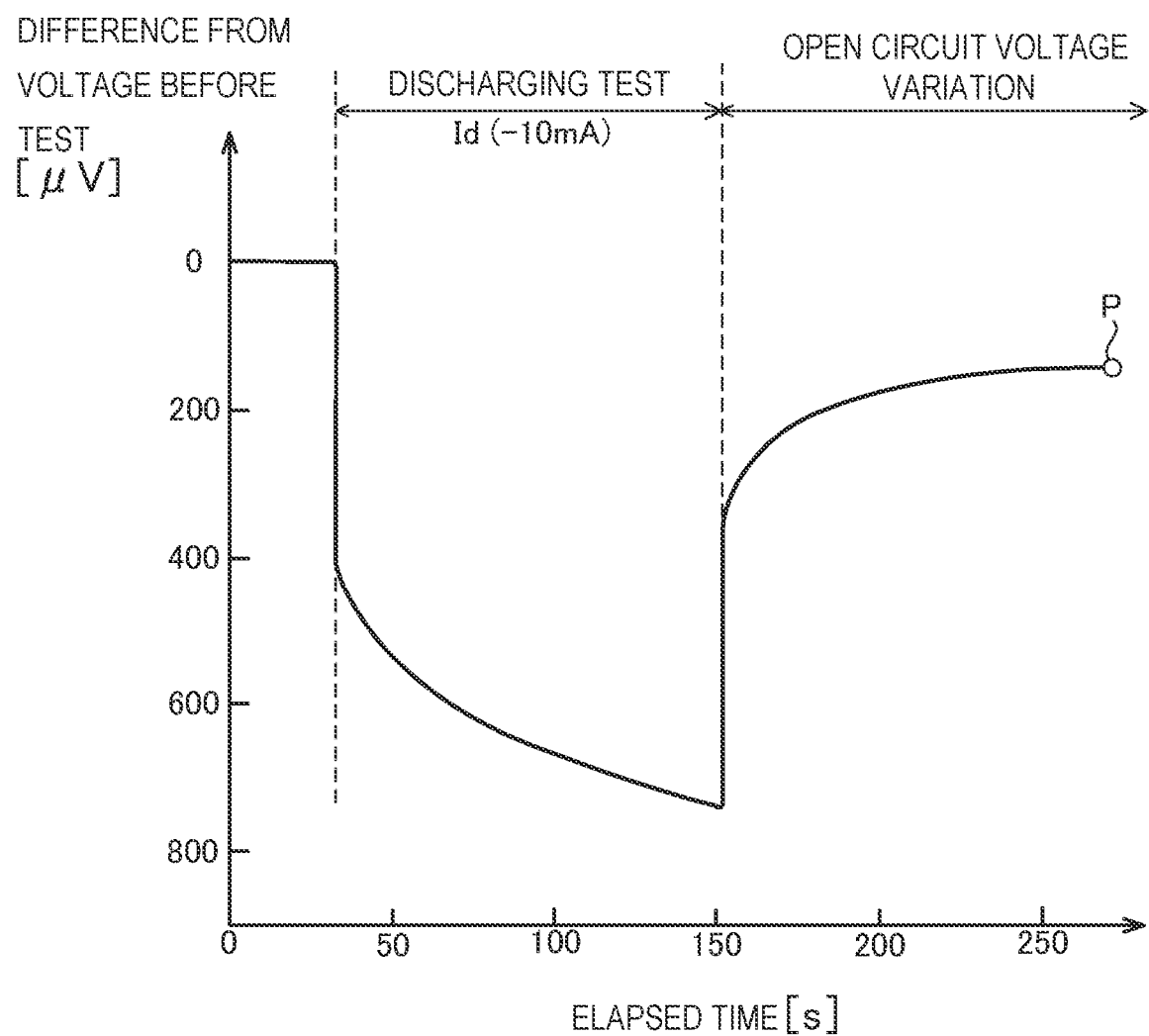
FIG. 21 is a diagram showing an example of the voltage variation in the power storage device after a normal discharge of the power storage device.
Figure 22:
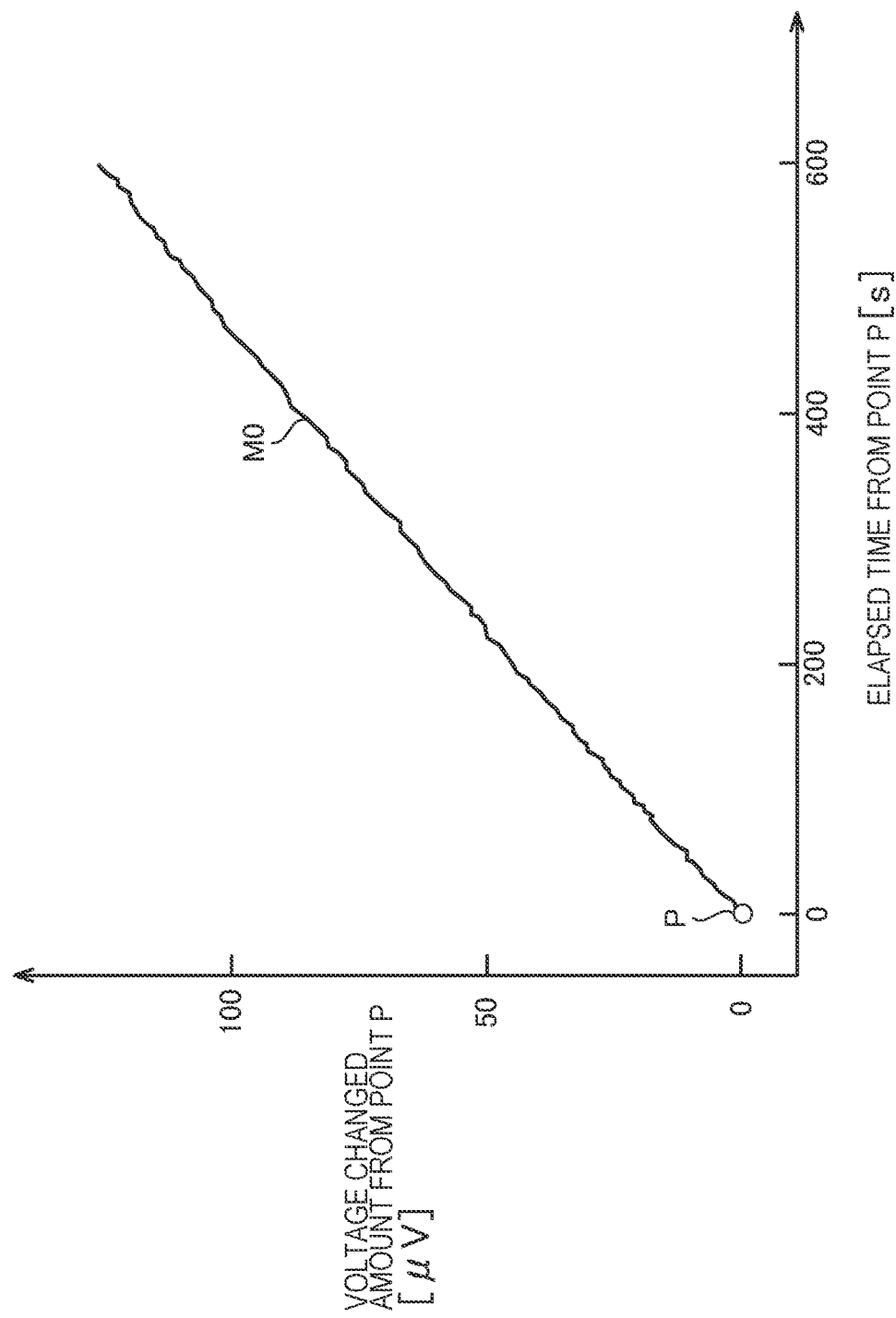
FIG. 22 is an enlarged view showing an increased amount of an open circuit voltage of the power storage device shown in FIG. 21.

In this description, a specific example of the processing in Step SC1 will be described with reference to FIGS. 21 and 22. FIG. 21 is a diagram for illustrating the variation in the open circuit voltage of the power storage device 10 after a discharging test. FIG. 22 is a diagram showing the variation in the open circuit voltage of the power storage device 10 from a point P shown in FIG. 21.

The discharging test shown in FIG. 21 is a test example of the normal discharge in which the chemical reaction is mainly caused in the power storage device 10. In this discharging test, the discharging current Id of 10 [mA] is supplied only for a period of about 120 [s] to the negative electrode 12 of the power storage device 10 such that the charging capacity of the power storage device 10 is reduced. In the following, the current flowing from the positive electrode 11 of the power storage device 10 towards the negative electrode 12 is referred to as plus (+), and the current flowing from the negative electrode 12 of the power storage device 10 towards the positive electrode 11 is referred to as minus (−).

The discharging current Id is about 1,000 times larger than the constant current supplied from the constant current source 20C in this embodiment. Therefore, the charging performed by supplying the constant current from the constant current source 20C to the power storage device 10 may also be referred to as "the micro-charging".

As shown in FIG. 21, immediately after the discharging test, the open circuit voltage of the power storage device 10 is increased rapidly, and thereafter, the open circuit voltage reaches the point P shown by a circle by being increased gradually. Even after the open circuit voltage reached the point P, the open circuit voltage of the power storage device 10 is continued to be varied over several hours or longer. The same is applied to a case after the charging test.

For example, in order to perform the state measurement processing in this embodiment, when the supply of the constant current from the constant current source 20C is started at the point P, as shown in FIG. 22, the increased amount of the open circuit voltage of the power storage device 10 reaches about 150 [μV] after 600 seconds.

In contrast, the changed amount of the measured voltage of the power storage device 10 in a state in which the constant current is supplied from the constant current source 20C to the power storage device 10 is about several ten [μV] over 600 [s], for example. Thus, the present inventors have found that the measurement accuracy for the measurement apparatus 1C is greatly influenced by the variation in the open circuit voltage of the power storage device 10 after the charging/discharging.

Therefore, in a case in which the state measurement processing in this embodiment is to be performed after the charging/discharging test of the power storage device 10, in order to ensure the measurement accuracy, the state measurement processing had to be performed after waiting for several hours or longer, and so, it is difficult to perform the measurement promptly.

As a countermeasure against this problem, in this embodiment, in order to correct the change in the measured voltage of the power storage device 10, the controller 50C acquires the variation information related to the variation in the open circuit voltage of the power storage device 10 in Step SC1 shown in FIG. 20.

The data shown by the broken line M0 shown in FIG. 22 is an example of the variation information acquired in the processing in Step SC1. The data shown by the broken line M0 is the measurement data that indicates the open circuit voltage of the power storage device 10 measured by the voltage sensor 40C immediately before the constant current is supplied from the constant current source 20C to the power storage device 10.

As described above, in the processing in Step SC1, the controller 50C acquires, as the variation information, the electric signal output from the voltage sensor 40C immediately before the supply of the constant current to the power storage device 10 is started. Although the electric signal from the voltage sensor 40C is used for the variation information as an example, the simulation result, the theoretical equation, or the like may also be used.

Next, the state computation processing executed in Step SC4 shown in FIG. 20 will be described with reference to FIGS. 23 to 25.

Figure 23:
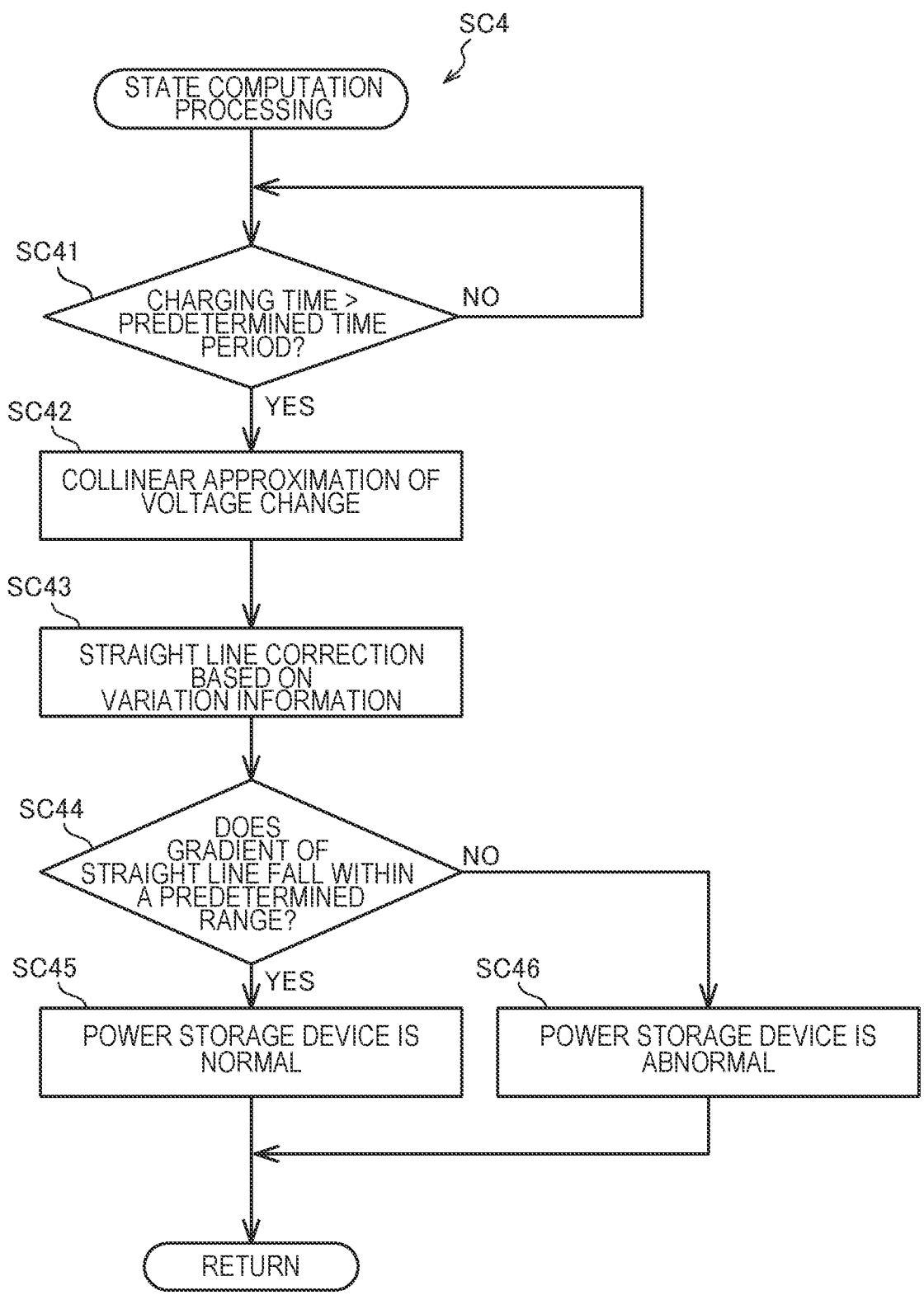
FIG. 23 is a flowchart showing an example of the state computation processing included in the measurement method.

FIG. 23 is a flowchart showing an example of the state computation processing (SC4) performed by the measurement apparatus 1C. FIG. 24 is a diagram for illustrating the change in the measured voltage against the charging time for the power storage device 10 this embodiment. FIG. 25 is a diagram for illustrating the change in the measured voltage after the correction against the charging time for the power storage device 10 this embodiment.

In an example shown in FIG. 23, as the state computation processing (SC4), the controller 50C determines whether the power storage device 10 is being passed or failed on the basis of the voltage change in the power storage device 10.

In Step SC41, the controller 50C determines whether or not the charging time that is the elapsed time since the start of the supply of the constant current to the power storage device 10 has exceeded the predetermined time period. The predetermined time period is set in advance to such a duration that the difference in the change in the voltage between the case in which the power storage device 10 is normal and the case in which the power storage device 10 is abnormal becomes apparent.

In Step SC41, when it is determined that the charging time has not exceed the predetermined time period, the controller 50C continues to supply the constant current to the power storage device 10 until it is determined that the charging time is to be exceeding the predetermined time period. On the other hand, when it is determined that the charging time has exceeded the predetermined time period, the process proceeds to Step SC42 in the controller 50C.

In Step SC42, the controller 50C detects the change in the measured voltage of the power storage device 10 on the basis of the measured voltage of the power storage device 10 measured by the voltage sensor 40C.

As the specific example, the controller 50C obtains the approximate straight line that approximates the temporal change of the measured voltage of the power storage device 10 with a straight line on the basis of the initial voltage at the start of the charging and the charging voltage in a state in which the constant current is supplied from the constant current source 20C. More specifically, the controller 50C obtains the approximate straight line for the measured voltage of the power storage device 10 by performing the least squares analysis on the basis of the micro-charging voltage measured at every control period.

Alternatively, the controller 50C may detect the change in the measured voltage of the power storage device 10 from the difference between the initial voltage at the start of the charging and the charging voltage in a state in which the constant current is supplied from the constant current source 20C. In this case, because it suffices to measure the voltage of the power storage device 10 by the voltage sensor 40C twice, the voltage measurement may also be performed after being switched by using a multiplexer, for example. Thus, it is possible to simplify the measurement apparatus 1C.

In Step SC43, the controller 50C corrects the approximate straight line on the basis of the variation information acquired in Step SC1. In other words, the controller 50C corrects the thus-detected change in the measured voltage of the power storage device 10 on the basis of the variation information.

As the specific example, the controller 50C first obtains the approximate straight line that approximates the variation in the open circuit voltage of the power storage device 10 with the straight line on the basis of the variation information of the power storage device 10 and acquires the gradient of the approximate straight line thereof. Next, the controller 50C performs a calculation to obtain, as the gradient of the approximate straight line for the measured voltage after the correction, the value by subtracting the gradient of the approximate straight line for the thus-acquired open circuit voltage from the gradient of the approximate straight line for the measured voltage obtained in Step SC3.

In Step SC44, the controller 50C determines whether or not the gradient of the approximate straight line after the correction falls within the predetermined range. When it is determined that the gradient of the approximate straight line after the correction falls within the predetermined range between the upper limit value and the lower limit value, because the power storage device 10 is in the normal state, the process proceeds to Step SC45. On the other hand, in Step SC44, when it is determined that the gradient of the approximate straight line after the correction does not fall within the predetermined range, in other words, when it is determined that the gradient is larger than the upper limit value of the predetermined range, or the gradient is smaller than the lower limit value of the predetermined range, because the power storage device 10 is in the abnormal state, the process proceeds to Step SC46.

In Step SC45, the controller 50C notifies the user that the power storage device 10 is in the normal state by displaying it on the display unit 60C. On the other hand, in Step SC46, the controller 50C notifies the user that the power storage device 10 is in the abnormal state by displaying it on the display unit 60C.

By executing the state computation processing (SC4) described above, the pass/fail determination of the power storage device 10 is completed.

Next, the specific examples of the processings in Steps SC42 to SC44 will be described with reference to FIGS. 24 and 25. The horizontal axes in FIGS. 24 and 25 indicate the charging time [s] that is the elapsed time since the start of the supply of the constant current to the power storage device 10, and the vertical axis indicates the difference [μV] between the initial voltage and the charging voltage respectively measured by the voltage sensor 40C.

Figure 24:
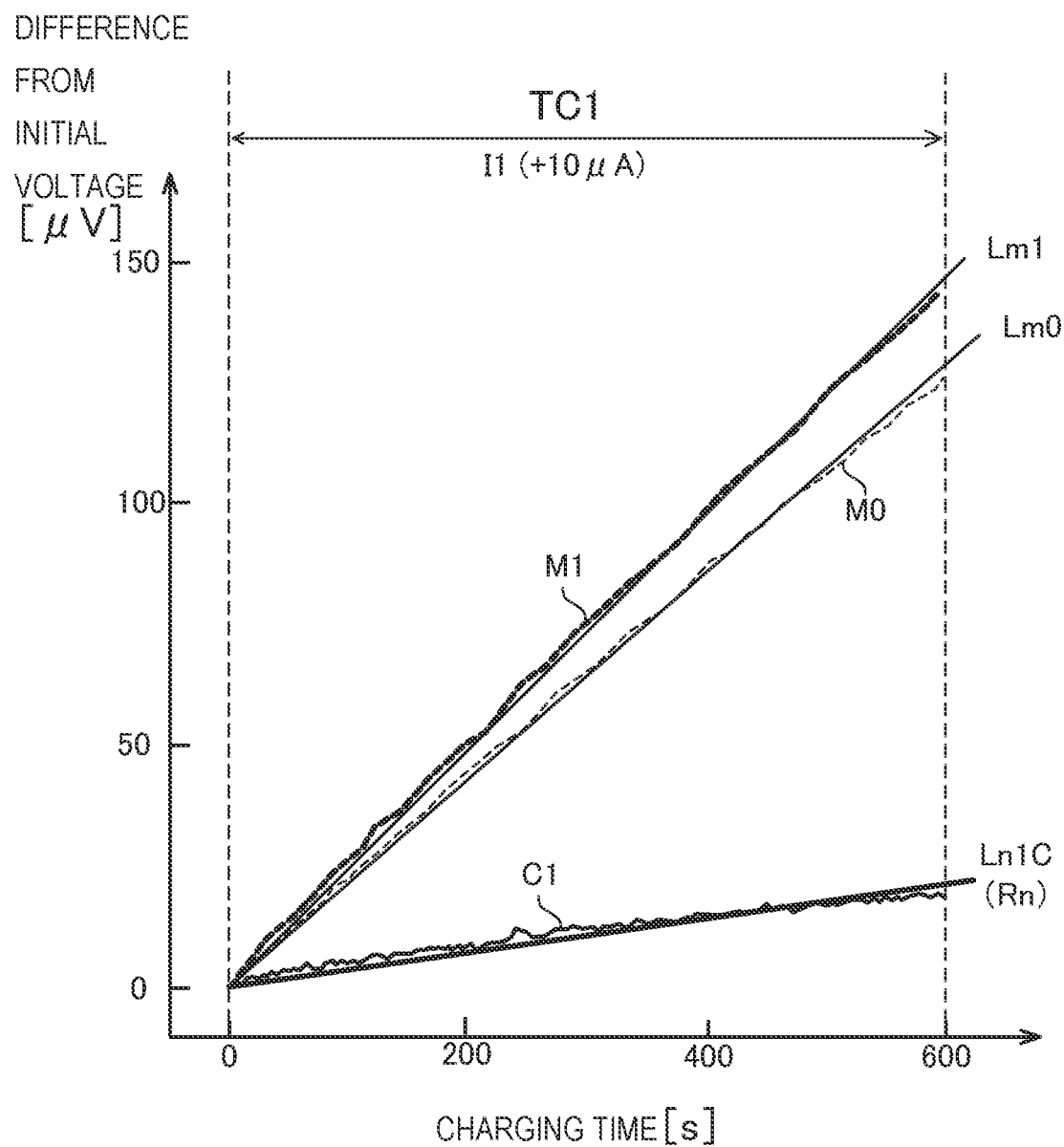
FIG. 24 is a diagram for illustrating change in measured voltage of the power storage device at the time when the constant current is charged, variation in open circuit voltage of the power storage device before the constant current is charged, and change in the measured voltage after correction.

The data shown by the broken line M0 shown in FIG. 24 is the measurement data that indicates the increase in the open circuit voltage of the power storage device 10 shown in FIG. 22, in other words, the measurement data indicates the variation in the open circuit voltage of the power storage device 10. The approximate straight line Lm0 shown with the solid line is the approximate straight line of the open circuit voltage obtained in the processing in Step SC43.

On the other hand, the data shown by the broken line M1 is the data that indicates the increased amount of the measured voltage of the power storage device 10 when the constant current having the current value I1 of +10 [μA] is charged from the constant current source 20C when the power storage device 10 is in the normal state. The straight solid line is the approximate straight line Lm1 for the measured voltage that is obtained in the processing in Step SC42.

The data shown by the solid line Cl shown in FIG. 24 is the change in the measured voltage corrected in the processing in Step SC43 and is the difference data taking the difference between the data shown by the broken line M1 and the data shown by the broken line M0 that are in association with each other. The data shown by the solid line Cl is obtained by eliminating the variation component from the open circuit voltage of the power storage device 10, in other words, it is the voltage change component of the measured voltage associated with the supply of the constant current to the power storage device 10.

The approximate straight line Ln1C shown by the solid line is the straight line having the gradient Rn after the correction that is obtained by subtracting the gradient of the approximate straight line Lm0 from the gradient of the approximate straight line Lm1 and is the approximate straight line for the change in the measured voltage after the correction.

Referring to FIG. 24, in the approximate straight line Lm1, the voltage variation component associated with the charging/discharging of the power storage device 10 is larger than the voltage change component associated with the constant current supply to the power storage device 10. Thus, the controller 50C subtracts the gradient of the approximate straight line Lm0 that approximates the open circuit voltage before the supply of the constant current is started from the gradient of the approximate straight line Lm1 that approximates the measured voltage at the time of the constant current supply. By doing so, it is possible to extract the voltage change component associated with the constant current supply to the power storage device 10. As described above, the controller 50C corrects the change in the measured voltage of the power storage device 10 to which the constant current is supplied.

Figure 25:
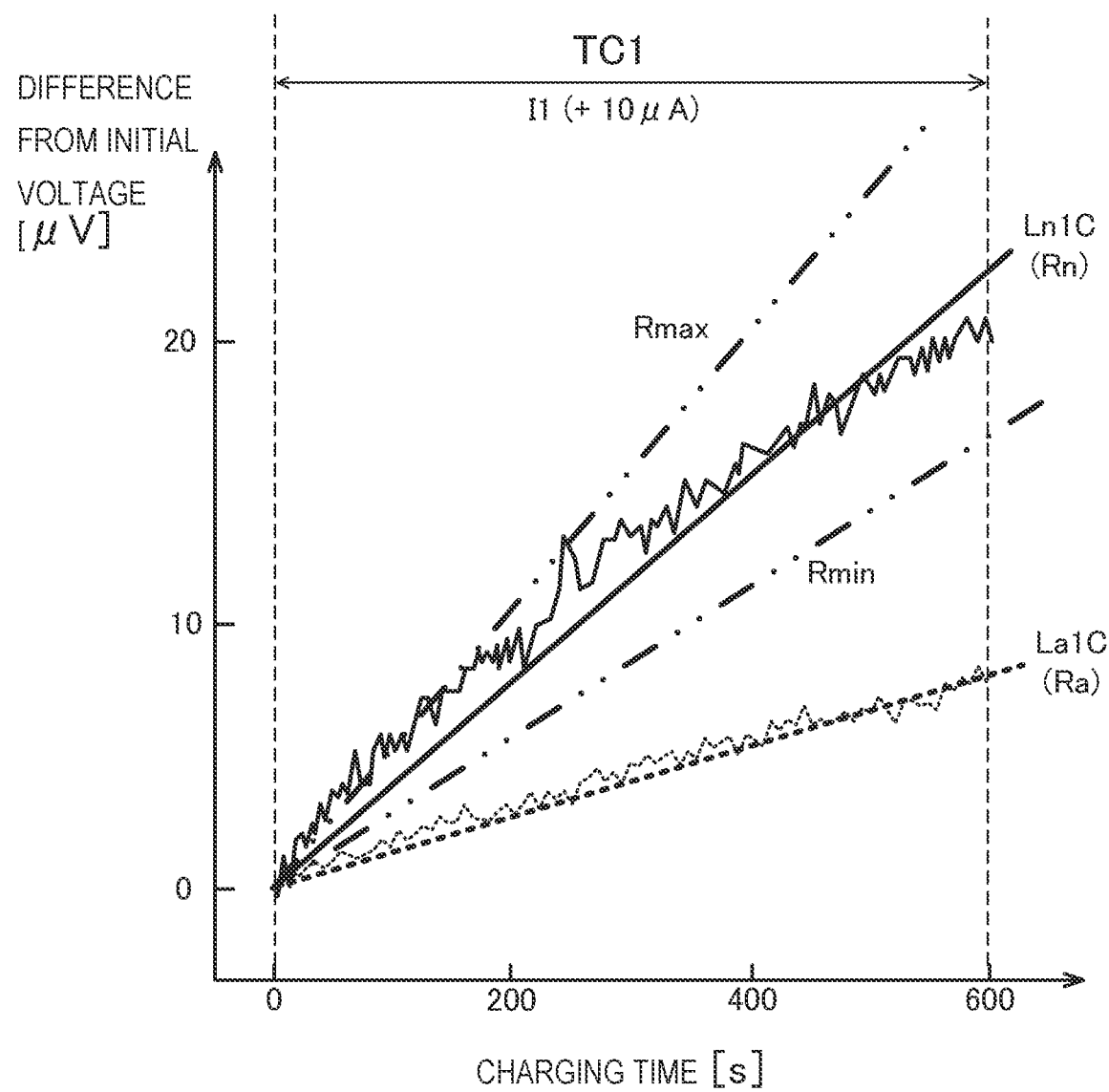
FIG. 25 is a diagram showing an example of the voltage change after correction against the charging time for the power storage device.

In FIG. 25, the change in the measured voltage after the correction is shown in a enlarged view, and the broken lines M1 and M0 and the approximate straight lines Lm1 and Lm0 shown in FIG. 24 are omitted. In the following, only the scale of the vertical axis is shown in enlargement than the scale of the vertical axis shown in FIG. 24.

The data shown by the dotted line in FIG. 25 is an example of the voltage change when the power storage device 10 is in the abnormal state, and the dotted straight line is the approximate straight line La1C of the voltage change obtained in the processing in Step SC42. In addition, the gradient of the approximate straight line Ln1C is referred to as Rn, and the gradient of the approximate straight line La1C is referred to as Ra.

In addition, two two-dot chain straight lines shown in FIG. 25 respectively indicate the upper limit value Rmax and the lower limit value Rmin of the gradient of the approximate straight line, and the gradient for the power storage device 10 in the normal state lies between two two-dot chain straight lines. The upper limit value Rmax and the lower limit value Rmin of the gradient of the approximate straight line are set at ±10%, for example, of the approximate straight line that is measured and obtained in advance by using the power storage device 10 in the normal state.

Referring to FIG. 25, the approximate straight line Ln1C shown by the solid line (the gradient Rn) lies between the upper limit value Rmax and the lower limit value Rmin of the gradient of the approximate straight line. Thus, the controller 50C determines that the power storage device 10 is in the normal state. On the other hand, the approximate straight line La1C shown by the broken line (the gradient Ra) does not lie between the upper limit value Rmax and the lower limit value Rmin of the gradient of the approximate straight line. Thus, the controller 50C determines that the power storage device 10 is in the abnormal state.

As described above, the controller 50C determines whether the power storage device 10 is in the normal state or in the abnormal state on the basis of whether or not the gradient of the approximate straight line lies between the upper limit value Rmax and the lower limit value Rmin.

In an example shown in FIG. 25, although it takes a measurement time TC1 of 600 [s] to perform the pass/fail determination of the power storage device 10, the gradient difference between the approximate straight line Ln1C shown by the solid line and the approximate straight line La1C shown by the broken line can clearly be checked after about 100 [s] has elapsed. As described above, in the measurement apparatus 1C, the pass/fail determination of the power storage device 10 can be executed within a short period of time of about a few minutes.

As described above, the measurement apparatus 1C in this embodiment charges the power storage device 10 with the micro-constant current from the constant current source 20C and detects the change in the measured voltage of the power storage device 10 by measuring the charging voltage in a state in which the constant current is being supplied. The measurement apparatus 1C then determines whether or not the thus-detected change in the measured voltage of the power storage device 10 falls within the normal range, and when the change in the measured voltage falls within the normal range, the measurement apparatus 1C determines that the power storage device 10 is normal. Therefore, because there is no need to wait until the voltage of the power storage device 10 is lowered by the self discharge, the time required to perform the pass/fail determination of the power storage device 10 is short.

At this time, the constant current source 20C charges the power storage device 10 by supplying the constant current at a level that is lower than the overpotential and that mainly causes the electrical double layer reaction in the power storage device 10. Because the level of the constant current supplied to the power storage device 10 is relatively small, the percentage of the current Ist [A] flowing through the power storage unit 13 with respect to the current Ipr [A] flowing through the parallel resistance 15 is large. Therefore, the difference in the gradient of the charge curve between the presence/absence of the parallel resistance 15 is increased, and so, it is easy to determine whether or not the power storage device 10 is normal.

In addition, the measurement apparatus 1C corrects the change in the measured voltage of the power storage device 10 on the basis of the variation information that specifies the variation in the open circuit voltage of the power storage device 10. Therefore, the variation component other than the voltage change component associated with the constant current supply is reduced in the voltage change of the measured voltage of the power storage device 10. Thus, even in a situation in which the variation in the open circuit voltage of the power storage device 10 is large, because there is no need to wait until the variation is ceased, it is possible to promptly perform the pass/fail determination of the power storage device 10.

Therefore, it is possible to perform the pass/fail determination of the power storage device 10 within a short period of time.

In the above-mentioned embodiment, although the voltage of the power storage device 10 is measured by the voltage sensor 40C as the initial voltage after the supply of the constant current has been started, alternatively, the voltage of the power storage device 10 may be measured by the voltage sensor 40C as the initial voltage before the supply of the constant current is started. Also in this case, because it is possible to measure the voltage of the power storage device 10 at least twice including once in a state in which the constant current is supplied, it is possible to obtain the approximate straight line for the voltage change in the power storage device 10.

Next, operational advantages according to the seventh embodiment will be described.

The measurement apparatus 1C in this embodiment forms the apparatus that detects the voltage change in the power storage device 10. The measurement apparatus 1C is provided with the constant current source 20C that supplies the constant current to the power storage device 10 (the supply means) and the voltage sensor 40C (the measurement means) that measures the voltage related to the power storage device 10 supplied with the constant current. Furthermore, the measurement apparatus 1C is provided with the controller 50C (the processing means) that detects the voltage change in the power storage device 10 subjected to the measurement. The measurement apparatus 1C then acquires the voltage change in the power storage device 10 on the basis of the electrical property serving as the reference of the power storage device 10.

In addition, the method for detecting the voltage change in the power storage device 10 in this embodiment includes the step of supplying the constant current to the power storage device 10, the step of measuring the voltage related to the power storage device 10 supplied with the constant current, and the step of detecting the voltage change in the power storage device subjected to the measurement. In this method, the voltage change in the power storage device 10 that is changed in response to the level of the self-discharge current or the discharge resistance of the power storage device 10 is acquired on the basis of the electrical property serving as the reference of the power storage device 10.

The electrical property serving as the reference of the power storage device 10 described above refers to, in this embodiment, the electrical property of the power storage device 10 in the open state, and specifically, it refers to the variation in the open circuit voltage of the power storage device 10. The measurement current apparatus 1C in this embodiment corrects the detected result of the voltage change in the power storage device 10 supplied with the constant current on the basis of the variation in the open circuit voltage of the power storage device 10, thereby acquiring the voltage change of the power storage device 10 after the correction. Specific description thereof is as follows.

The measurement apparatus 1C including detection apparatus that detects the voltage change in the power storage device 10 in this embodiment is provided with the voltage acquisition unit 53 of the controller 50C that acquires the variation information that specifies the variation in the open circuit voltage of the power storage device 10. In addition, the measurement apparatus 1C is provided with the constant current source 20C that supplies the constant current to the power storage device 10 and the voltage sensor 40C that measures the voltage of the power storage device 10 supplied with the constant current. Furthermore, the measurement apparatus 1C is provided with the computing unit 55 of the controller 50C that detects the voltage change in the power storage device 10 on the basis of the thus-measured voltage of the power storage device 10. The computing unit 55 then corrects the thus-detected voltage change in the power storage device 10 on the basis of the variation information.

The measurement apparatus 1C that measures the state of the power storage device 10 in this embodiment is provided with the constant current source 20C, the voltage sensor 40C, and the voltage acquisition unit 53 as described above. In addition, the measurement apparatus 1C is provided with the computing unit 55 that computes the internal state of the power storage device 10 on the basis of the change in the measured voltage that is the voltage of the power storage device 10 subjected to the measurement. The computing unit 55 then corrects the variation information on the basis of the change in the measured voltage of the power storage device 10.

Furthermore, the measurement method that measures the state of the power storage device 10 in this embodiment includes an acquisition step (SC1) of acquiring the variation information that specifies the variation in the open circuit voltage of the power storage device 10. In addition, the measurement method includes the supplying step (SC2) of supplying the constant current to the power storage device 10 and the measuring step (SC3) of measuring the voltage of the power storage device 10 supplied with the constant current. Furthermore, this measurement method includes the computing step (SC4) of computing the internal state of the power storage device 10 on the basis of the change in the measured voltage of the power storage device 10 subjected to the measurement. The computing step (SC4) corrects the change in the measured voltage of the power storage device 10 on the basis of the variation information.

The differences in the internal state of the power storage device 10 tend to appear as the difference in the temporal change in the voltage of the power storage device 10. Therefore, according to the configuration described above, because the constant current is supplied to the power storage device 10, it is possible to increase the voltage change in the power storage device 10. Therefore, it is possible to reduce the time required to obtain the voltage change in and the internal state of the power storage device 10.

In addition, according to the configuration described above, because the change in the measured voltage of the power storage device 10 supplied with the constant current is corrected on the basis of the variation information of the power storage device 10, it is possible to reduce the variation component other than the voltage change component associated with the constant current supply.

For example, as shown in FIG. 21, after the charging/discharging of the power storage device 10, it takes time until the open circuit voltage of the power storage device 10 is stabilized. As shown in FIG. 24, after about several hundreds [s] has elapsed since the charging/discharging, the variation component (Lm0) associated with the normal charging/discharging is still larger than the voltage change component (Ln1C) associated with the constant current supply to the power storage device 10 considerably.

In such a situation, as in the above-mentioned embodiment, by correcting the change in the measured voltage of the power storage device 10 on the basis of the variation information of the power storage device 10, the voltage variation component associated with the charging/discharging is mostly eliminated. Therefore, it is possible to measure the state of the power storage device 10 with a high accuracy. Thus, there is no need to wait to measure the power storage device 10 until the open circuit voltage of the power storage device 10 is stabilized, it is possible to start the measurement of the power storage device 10 promptly.

Furthermore, the present inventors have found that the measurement accuracy of the measurement apparatus 1C is influenced even if the ambient temperature in a room accommodating the power storage device 10 is changed only by about 1.0 [° C.]. In the example shown in FIG. 25, the voltage change component (Ln1C) associated with the supply of the constant current is the changed amount of about 5 [μV] over 100 [s], and this is substantially the same as the varied amount of the open circuit voltage of the power storage device 10 caused when the ambient temperature is changed by about 0.5 [° C.] over 100 [s].

Therefore, under the environment in which the ambient temperature of the power storage device 10 is increased or decreased gradually, it is possible to reduce the voltage variation component associated with the temperature variation in the measured voltage by acquiring the variation information in advance and by correcting the change in the measured voltage on the basis of the variation information. Thus, it is possible to obtain the state of the power storage device 10 with a high accuracy without waiting for the ambient temperature of the power storage device 10 to be stabilized.

As described above, by using the variation information of the power storage device 10, the variation component associated with the environment, such as the variation in the open circuit voltage after the charging/discharging of the power storage device 10, the variation in the open circuit voltage associated with the change in the ambient temperature, or the like, is suppressed. Therefore, there is no need to wait the measurement until the variation component associated with the environment of the voltage of the power storage device 10 is converged.

As described above, according to the configuration described above, it is possible to reduce the variation component associated with the environment contained in the measured voltage while increasing the change in the measured voltage of the power storage device 10 by supplying the constant current to the power storage device 10. Thus, it is possible to obtain the state of the power storage device 10 within a short period of time.

In addition, the voltage sensor 40C in this embodiment measures the open circuit voltage of the power storage device 10 and outputs the signal indicating the thus-measured open circuit voltage to the controller 50C as the variation information of the power storage device 10. Thereafter, the voltage sensor 40C measures the voltage of the power storage device 10 supplied with the constant current.

With such a configuration, because it is possible to specify the actual varying situation of the open circuit voltage of the power storage device 10, it is possible to appropriately extract the change component of the measured voltage associated with the constant current supply to the power storage device 10. In addition, the voltage variation of the power storage device 10 after completion of the supply of the constant current to the power storage device 10 tends to be unstable along with the supply of the constant current. Therefore, by using the voltage variation of the power storage device 10 before the supply of the constant current is started as the variation information, it is possible to eliminate the variation component of the measured voltage associated with the constant current supply to the power storage device 10. Thus, it is possible to appropriately correct the change in the measured voltage of the power storage device 10 in a state in which the constant current is supplied.

In addition, the computing unit 55 in this embodiment is provided with the voltage change detector 551 that detects the change in the measured voltage on the basis of the measured voltage of the power storage device 10. In addition, the computing unit 55 is provided with the voltage change correction unit 552 that corrects the change in the measured voltage by subtracting the variation in the open circuit voltage that is specified by the variation information from the thus-detected change in the measured voltage.

With such a configuration, because the change in the measured voltage is corrected by a simple computational processing by using the variation information of the power storage device 10, it is possible to reduce a processing load of the computing unit 55.

In addition, the constant current source 20C in this embodiment supplies the constant current at a level that is lower than the overpotential and that mainly causes the electrical double layer reaction in the power storage device 10.

With such a configuration, because the level of the constant current supplied to the power storage device 10 is low, the percentage of the current Ist [A] flowing through the power storage unit 13 with respect to the current Ipr [A] flowing through the parallel resistance 15 is increased. Therefore, because the difference between the gradients of the charge curves for the cases with and without the parallel resistance 15 is increased, it is easy to obtain the state of the power storage device 10.

Eighth Embodiment

Next, the controller 50C of the measurement apparatus 1C according to an eighth embodiment will be described. The basic configuration of the measurement apparatus 1C according to this embodiment is the same as the configuration shown in FIGS. 18 and 19, and the repetitive description with respect to the seventh embodiment will be omitted. In the following, the resistance value of the parallel resistance 15 of the power storage device 10 shown in FIG. 18 is referred to as the discharge resistance Rpr, and the current flowing through the parallel resistance 15 is referred to as the self-discharge current Ipr. Furthermore, at least one of the self-discharge current Ipr and the discharge resistance Rpr is also referred to as "a parameter related to the self discharge".

The controller 50C in this embodiment computes the parameter related to the self discharge as the internal state of the power storage device 10 on the basis of the measured voltage of the power storage device 10 measured by the voltage sensor 40C in a state in which the constant current is supplied to the power storage device 10. In this point, this embodiment differs from the seventh embodiment described above.

Specifically, the constant current source 20C successively supplies the constant current with different current values to the power storage device 10, and the voltage sensor 40C measures the measured voltage of the power storage device 10 for every constant current supplied to the power storage device 10. The controller 50C then computes the discharge resistance Rpr and the self-discharge current Ipr on the basis of the change in the measured voltage of the power storage device 10 measured by the voltage sensor 40C for every constant current.

The measurement command unit 52 of the controller 50C forms switching means that switches the constant current to be supplied to the power storage device 10.

In this embodiment, the measurement command unit 52 switches the constant current supplied from the constant current source 20C to the power storage device 10 between the constant current indicating the first current value and the constant current indicating the second current value. The first and the second current values are stored in the constant current storage unit 541. In the following, the constant current indicating the first current value is also simply referred to as "the first constant current", and the constant current indicating the second current value is also simply referred to as "the second constant current".

Similarly to the seventh embodiment, the first current value is set to one or several times the reference value of the self-discharge current Ipr of the power storage device 10, and in this embodiment, the first current value is set to 10 [µA] that is one times the reference value of the self-discharge current Ipr. In addition, the second current value is set to at least ten times the reference value of the self-discharge current Ipr of the power storage device 10, and in this embodiment, the second current value is set to fifty times the reference value of the self-discharge current Ipr. As described above, the first and the second current values are both set in advance on the basis of the value of the self-discharge current Ipr.

The reference value of the self-discharge current Ipr is the known information, and is, for example, set in advance by using the statistical data obtained by aggregating the self-discharge current Ipr of the numerous power storage devices 10, the test results for the self-discharge current Ipr of the specific power storage device 10 whose electrical property is normal, or the like.

The voltage change detector 551 of the controller 50C forms the detection means that detects, for every level of the constant current supplied from the constant current source 20C, the change in the measured voltage of the power storage device 10 on the basis of the measured voltage of the power storage device 10.

In this embodiment, the voltage change detector 551 obtains, for every level of the constant current, the gradient of the temporal change of the measured voltage of the power storage device 10 on the basis of the initial voltage at the start of the supply of the constant current and the charging voltage in a state in which the constant current is supplied from the constant current source 20C. Alternatively, as shown in FIG. 24, the voltage change detector 551 obtains, for every constant current, the approximate straight line Lm1 that approximates the temporal change of the measured voltage of the power storage device 10, and it may also be possible to use the gradient of the approximate straight line Lm1 as the gradient of the measured voltage.

The voltage change correction unit 552 of the controller 50C forms the correcting means that corrects, for every constant current switched by the measurement command unit 52, the change in the measured voltage of the power storage device 10 on the basis of the variation information of the power storage device 10. As shown in FIG. 22, similarly to the seventh embodiment, the variation information of the power storage device 10 is the information to specify the variation in the open circuit voltage of the power storage device 10 and is stored in the variation information storage unit 542 in advance.

In this embodiment, similarly to the seventh embodiment, the voltage change correction unit 552 reads out the variation information of the power storage device 10 from the variation information storage unit 542 and specifies the variation in the open circuit voltage of the power storage device 10 on the basis of the thus-read out variation information. The voltage change correction unit 552 corrects the change in the measured voltage of the power storage device 10 for every level of the constant current by subtracting the thus-specified variation in the open circuit voltage from the change in the measured voltage of the power storage device 10 detected by the voltage change detector 551.

For example, the voltage change correction unit 552 obtains the gradient of the voltage variation in the open circuit voltage of the power storage device 10 before the supply of the constant current is started on the basis of the variation information of the power storage device 10. The voltage change correction unit 552 then calculates, for every level of the constant current, the change in the measured voltage after the correction by subtracting the gradient of the obtained voltage variation from the change in the measured voltage detected by the voltage change detector 551.

Specifically, as shown in FIG. 24, the voltage change correction unit 552 obtains the gradient of the approximate straight line Lm0 that approximates the voltage variation in the open circuit voltage of the power storage device 10 on the basis of the variation information stored in the variation information storage unit 542. The voltage change correction unit 552 calculates the gradient of the straight line that approximates the change in the measured voltage after the correction by subtracting the gradient of the approximate straight line Lm0 from the gradient of the approximate straight line Lm1 that indicates the change in the measured voltage of the power storage device 10 charged with the first constant current.

Furthermore, the voltage change correction unit 552 calculates the gradient of the straight line that approximates the change in the measured voltage after the correction by subtracting the gradient of the approximate straight line Lm0 from the gradient of the approximate straight line Lm2 that indicates the change in the measured voltage of the power storage device 10 charged with the second constant current. In the following, the gradient of the straight line that approximates the change in the measured voltage after the correction is abbreviated as "the gradient of the measured voltage after the correction". As described above, the voltage change correction unit 552 calculates, for every level of the constant current, a rate of change in the thus-corrected measured voltage.

Alternatively, the voltage change correction unit 552 obtains the varied amount of the open circuit voltage per the measurement time of the power storage device 10 on the basis of the variation information. It may also be possible to use, as the change in the measured voltage after the correction, the value obtained by subtracting the thus-obtained varied amount from the changed amount of the measured voltage per the measurement time of the power storage device 10.

The internal state computing unit 553 of the controller 50C forms self discharge computation means that computes, for every constant current, the self-discharge current Ipr or the discharge resistance Rpr of the power storage device 10 on the basis of the change in the measured voltage of the power storage device 10, which has been corrected.

In this embodiment, the internal state computing unit 553 computes the self-discharge current Ipr of the power storage device 10 by using the gradient for the voltage change after the correction that is obtained for every constant current and the numerical equation for obtaining the electrostatic capacitance Cst of the power storage unit 13 shown in FIG. 18. The computing procedure of the self-discharge current Ipr of the power storage device 10 will be described.

The numerical equation for obtaining the electrostatic capacitance Cst of the power storage unit 13 can be expressed by using the gradient A1 of the measured voltage after the correction at the time when the first constant current is charged to the power storage device 10 and the current Ist [A] charged to the power storage unit 13. The current Ist [A] charged to the power storage unit 13 is the charged amount accumulated in the electrostatic capacitance Cst per unit time. The current Ist [A] corresponds to the value (I1−Ipr) obtained by subtracting the self-discharge current Ipr flowing through the parallel resistance 15 from the current value I1 of the first constant current supplied to the power storage device 10.

Therefore, the numerical equation for obtaining the electrostatic capacitance Cst of the power storage unit 13 can be expressed by using the self-discharge current Ipr of the power storage device 10, the first current value I1, and the gradient A1 of the measured voltage after the correction at the time when the first constant current is charged to the power storage device 10. The numerical equation for obtaining the electrostatic capacitance Cst of the power storage unit 13 is shown in the following equation (16).

[Numerical Equation 16]

$$C_{st} = \frac{I_1 - I_{pr}}{A1} \qquad (16)$$

Similarly, the numerical equation for obtaining the electrostatic capacitance Cst of the power storage unit 13 can be expressed as in the following equation (17) by using the self-discharge current Ipr, the second current value I2, and the gradient A2 for the measured voltage after the correction at the time when the second constant current is charged to the power storage device 10.

[Numerical Equation 17]

$$C_{st} = \frac{I_2}{A2} \qquad (17)$$

In the above-described equation (17), the current Ist [A] charged to the power storage unit 13 corresponds to the value (I2–Ipr) obtained by subtracting the self-discharge current Ipr from the current value I2 of the second constant current. However, as described above, because the constant current indicating the second current value I2 that is the current flowing through the internal resistance 14 shown in FIG. 18 is sufficiently larger than the self-discharge current Ipr flowing through the parallel resistance 15, it can be approximated as in the following equation (18).

[Numerical Equation 18]

$$I_2 \approx (I_2 - I_{pr}) \qquad (18)$$

Therefore, in the above-described equation (17), the current value I2 of the second constant current is used instead of the current value (I2–Ipr) obtained by subtracting the self-discharge current Ipr from the current value I2 of the second constant current. Next, by solving the equation (17) and the equation (18) for the self-discharge current Ipr, the following equation (19) is derived.

[Numerical Equation 19]

$$I_{pr} = I_1 - \frac{A1}{A2} I_2 \qquad (19)$$

As described above, the gradients A1 and A2 of the measured voltage after the correction obtained for every constant current and the current values I1 and I2 of the constant current are substituted into the equation (16) and the equation (17) that are each the numerical equation for obtaining the electrostatic capacitance Cst of the power storage unit 13. By doing so, it is possible to calculate the self-discharge current Ipr of the power storage device 10.

Next, the internal state computing unit 553 calculates the discharge resistance Rpr of the power storage device 10 on the basis of the thus-calculated self-discharge current Ipr.

In this embodiment, the internal state computing unit 553 calculates the discharge resistance Rpr of the power storage device 10 by dividing the open circuit voltage (OCV) of the power storage device 10 by the self-discharge current Ipr of the power storage device 10. For the open circuit voltage (OCV) of the power storage device 10, the voltage value of the power storage device 10 measured by the voltage sensor 40C before the supply of the constant current is started may also used, or alternatively, for the open circuit voltage (OCV), a voltage value that is set in advance by using the test results for the power storage device 10, etc. may also be used.

Alternatively, the association table or the function expressing the relationship between the self-discharge current Ipr and the discharge resistance Rpr of the power storage device 10 may be stored in the internal state computing unit 553, and the internal state computing unit 553 may calculate the discharge resistance Rpr by using the association table or the function.

Finally, the internal state computing unit 553 determines whether or not the power storage device 10 is normal on the basis of on the basis of the thus-calculated discharge resistance Rpr.

In this embodiment, the internal state computing unit 553 determines whether or not the calculated value of the discharge resistance Rpr of the power storage device 10 falls within the predetermined resistance range. The upper limit value and the lower limit value of the predetermined resistance range are set in advance by using the statistical data obtained by aggregating the discharge resistance Rpr of the plurality of power storage devices 10, the test results for the specific power storage device 10 whose electrical property is normal, or the like.

When the internal state computing unit 553 determines that the calculated value of the discharge resistance Rpr falls within the predetermined resistance range, the internal state computing unit 553 determines that the power storage device 10 is in the normal state. In addition, when the internal state computing unit 553 determines that the calculated value of the discharge resistance Rpr does not fall within the predetermined range, the internal state computing unit 553 determines that the power storage device 10 is abnormal.

Alternatively, the diagnose table indicating the normal state or the abnormal state of the power storage device 10 for every discharge resistance Rpr may be stored in the storage unit 54 in advance. In this case, the internal state computing unit 553 refers to the diagnose table after calculating the discharge resistance Rpr of the power storage device 10 and specifies the internal state of the power storage device 10 associated with the thus-calculated discharge resistance Rpr.

In this embodiment, although the internal state computing unit 553 performs the pass/fail determination of the power storage device 10 on the basis of the calculated value of the discharge resistance Rpr, alternatively, it may be possible to determine whether or not the power storage device 10 is in the normal state by using the calculated value of the self-discharge current Ipr. In this case, the controller 50C determines whether or not the calculated value of the self-discharge current Ipr falls within the predetermined current range, for example, and when it is determined that the calculated value falls within the predetermined current range, the controller 50C determines that the power storage device 10 is in the normal state.

In addition, in this embodiment, the measurement command unit 52 controls the operation of the constant current source 20C such that the constant currents with different current values are successively supplied to the power storage device 10. However, if the electrostatic capacitance Cst of the power storage unit 13 is known, only the constant current indicating the first current value I1 may be supplied. In this case, the electrostatic capacitance Cst of the power storage unit 13 is stored in the storage unit 54 in advance. The internal state computing unit 553 calculates the self-discharge current Ipr by substituting the electrostatic capacitance Cst of the power storage unit 13, the first current value I1, and the gradient A1 of the measured voltage after the correction associated with the first current value I1 into the above-described equation (16).

The electrostatic capacitance Cst stored in the storage unit 54 is set in advance by using the statistical data obtained by aggregating the electrostatic capacitance Cst of the power storage unit 13 in the plurality of power storage devices 10, the test results for the specific power storage device 10, or the like. Alternatively, the internal state computing unit 553 obtain the electrostatic capacitance Cst of the power storage unit 13 by charging the constant current indicating the second current value I2 to the power storage device 10 and by substituting the gradient A2 for the measured voltage after the correction at this time and the second current value I2 into the above-described equation (17).

Figure 26:
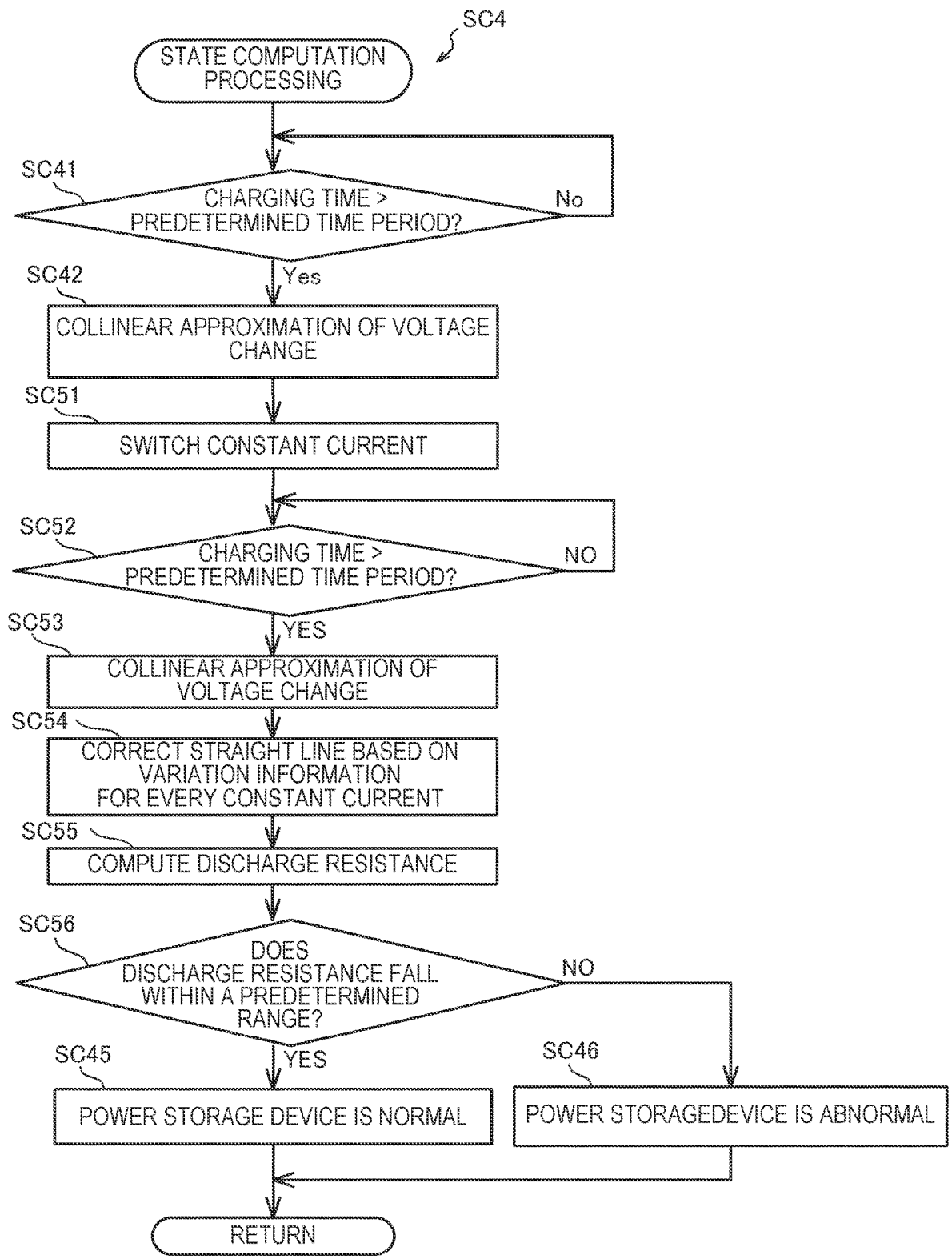
FIG. 26 is a flowchart showing the state computation processing included in the measurement method according to an eighth embodiment.

Next, the measurement method that is performed by using the measurement apparatus 1C according to the eighth embodiment will be described with reference to FIG. 26. FIG. 26 is a flowchart showing an example of the state computation processing (SC4) executed by the controller 50C of the measurement apparatus 1C.

The state computation processing (SC4) in this embodiment includes processings in Steps SC51 to SC56 instead of the processings in Steps SC43 and SC44 shown in FIG. 23. In the following, only the respective processings in Steps SC51 to SC56 will be described, and because the other processings are the same as those in the seventh embodiment, the same reference signs are given and the descriptions thereof will be omitted.

In Step SC42, the controller 50C acquires the gradient of the approximate straight line Lm1 by obtaining the approximate straight line Lm1 that approximates the change in the measured voltage of the power storage device 10 at the time when the charging is performed with the constant current indicating the first current value I1, which is set in Step SC2 shown in FIG. 20, and the process proceeds to Step SC51.

In Step SC51, the controller 50C switches the constant current supplied from the constant current source 20C to the power storage device 10. In this embodiment, the controller 50C switches the first constant current to the constant current indicating the second current value I2 that is higher than the first current value I1.

The processings in Steps SC52 and SC53 are similar to the respective processings in Steps SC41 and SC42. Therefore, in Steps SC52 and SC53, the controller 50C measures, only for the predetermined time, the voltage of the power storage device 10 in a state in which the second constant current is supplied and obtains the approximate straight line Lm2 that approximates the change in the measured voltage at the time when the second constant current is charged, and thereby, the gradient of the approximate straight line Lm2 is acquired.

In Step SC54, the controller 50C corrects, for every level of the constant current indicating the first current value I1 and the second current value I2, the change in the measured voltage of the power storage device 10 on the basis of the variation information of the power storage device 10.

In this embodiment, as shown in FIG. 24, the controller 50C obtains the gradient of the approximate straight line Lm0 that approximates the voltage variation in the open circuit voltage of the power storage device 10 before the supply of the constant current is started on the basis of the variation information stored in the variation information storage unit 542. The controller 50C calculates the gradient A1 of the straight line that approximates the change in the measured voltage after the correction by subtracting the gradient of the approximate straight line Lm0 from the gradient of the approximate straight line Lm1 that approximates the change in the measured voltage at the time when the constant current indicating the first current value I1 is charged.

Furthermore, the controller 50C calculates the gradient A2 of the approximate straight line that approximates the change in the measured voltage after the correction by subtracting the gradient of the approximate straight line Lm0 from the gradient of the approximate straight line Lm2 that approximates the change in the measured voltage at the time when the constant current indicating the second current value I2 is charged. As described above, the controller 50C corrects the change in the measured voltage for every level of the constant current.

In Step SC55, the controller 50C computes the discharge resistance Rpr of the power storage device 10 on the basis of the gradients A1 and A2 of the approximate straight lines corrected for every constant current.

In this embodiment, the controller 50C calculates the self-discharge current Ipr of the power storage device 10 by substituting the first current value I1, the gradient A1 of the approximate straight line after the correction, the second current value I2, and the gradient A2 of the approximate straight line after the correction into the above-described equation (19). The controller 50C then calculates the discharge resistance Rpr of the power storage device 10 by dividing the open circuit voltage (OCV) of the power storage device 10 by the self-discharge current Ipr of the power storage device 10.

In Step SC56, the controller 50C determines whether or not the power storage device 10 is normal on the basis of the thus-calculated discharge resistance Rpr of the power storage device 10.

In this embodiment, the controller 50C determines whether or not the calculated value of the discharge resistance Rpr falls within the predetermined resistance range. When it is determined that the calculated value of the discharge resistance Rpr falls within the predetermined resistance range, because the power storage device 10 is in the normal state, the process proceeds to Step SC45 in the controller 50C. On the other hand, when it is determined that the calculated value of the discharge resistance Rpr does not fall within the predetermined resistance range, in other words, when it is determined that the calculated value of the discharge resistance Rpr is larger than the upper limit value of the resistance range or smaller than the lower limit value of the resistance range, the power storage device 10 is in the abnormal state, and the process proceeds to Step SC46 in the controller 50C.

By executing the state computation processing (SC4) described above, the pass/fail determination of the power storage device 10 is completed.

Figure 27:
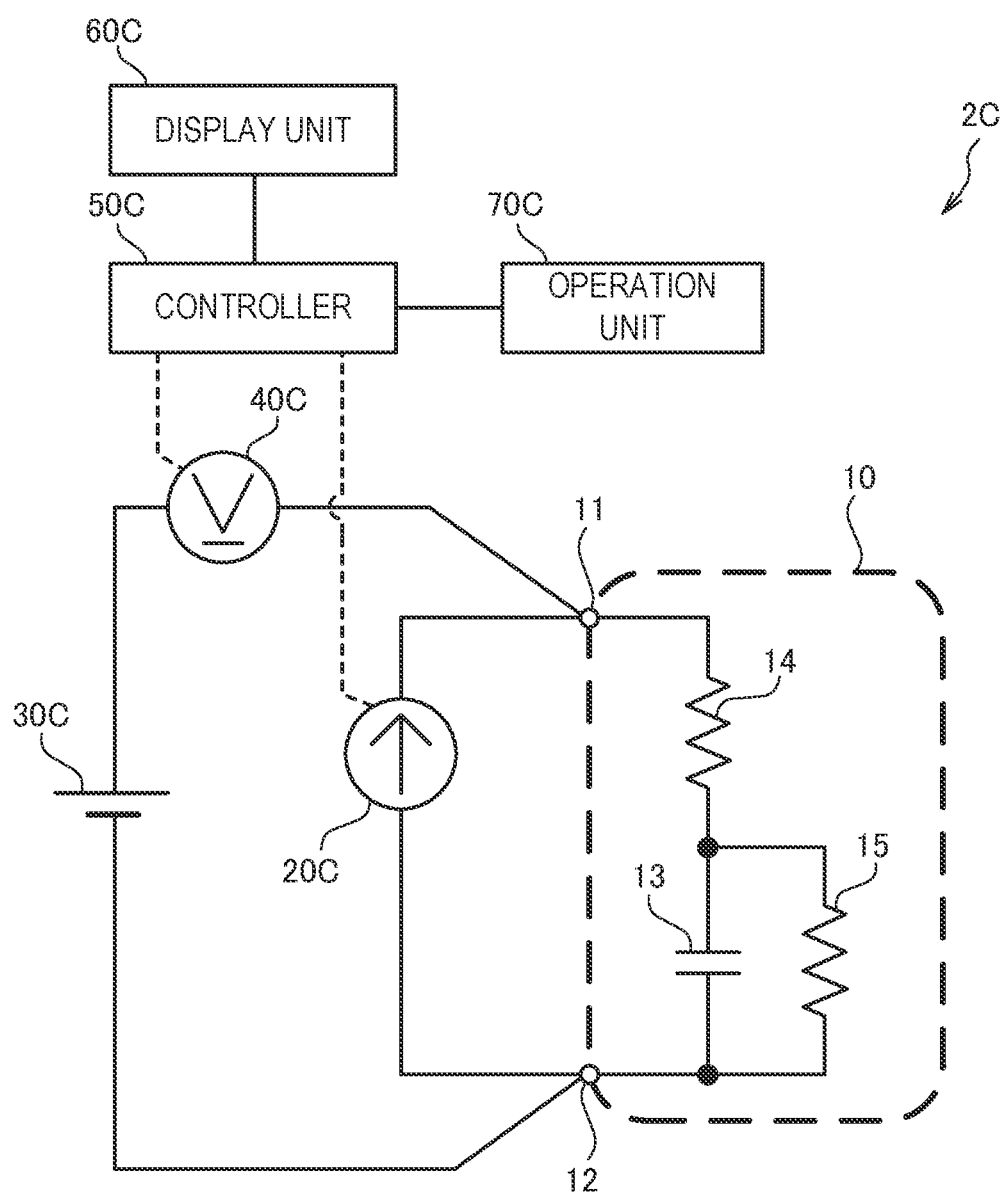
FIG. 27 is a diagram showing a configuration of the measurement apparatus of the power storage device according to a ninth embodiment.

In the example shown in FIG. 27, the controller 50C calculates the self-discharge current Ipr by obtaining the gradient for the voltage change in the power storage device 10 twice by switching the level of the constant current only once. Alternatively, the controller 50C may calculate the plurality of self-discharge currents Ipr by successively obtaining the gradient of the approximate straight line that approximates the change in the measured voltage by switching the level of the constant current a plurality of times, and the statistical value, such as the average value, the median, or the like, of the calculated values may be used as the final result.

In addition, in this embodiment, although the controller 50C calculates the self-discharge current Ipr by switching the level of the constant current supplied from the constant current source 20C to the positive electrode 11 of the power storage device 10, the present invention is not limited thereto. For example, the connection relationship between the constant current source 20C and the power storage device 10 may be inverted, the constant current may be supplied from the constant current source 20C to the negative electrode 12 of the power storage device 10 to discharge the power storage device 10, and in this state, the level of the constant current may be switched. Also in this case, as in the above-mentioned embodiment, it is possible to calculate the self-discharge current Ipr.

Furthermore, in this embodiment, although the level of the constant current supplied from the constant current source 20C to the power storage device 10 is switched, it is possible to calculate the self-discharge current Ipr and the discharge resistance Rpr even if the direction of the constant current is switched. In the following, the procedure of computing the self-discharge current Ipr of the power storage device 10 will be described briefly for a case in which the direction of the constant current to be supplied to the power storage device 10 is switched.

The electrostatic capacitance Cst of the power storage unit 13 can be expressed as in the following equation (20) by using the self-discharge current Ipr of the power storage device 10 and the gradient Ac of the measured voltage after the correction at the time when the constant current indicating the first current value I1 is charged to the power storage device 10. Furthermore, the electrostatic capacitance Cst of the power storage unit 13 can be expressed as in the following equation (21) by using the self-discharge current Ipr of the power storage device 10 and the gradient Ad of the measured voltage at the time when the power storage device 10 is discharged with the constant current indicating the second current value I2.

[Numerical Equation 20]

$$C_{st} = \frac{I_1 - I_{pr}}{Ac} \quad (20)$$

[Numerical Equation 21]

$$C_{st} = \frac{I_2 + I_{pr}}{Ad} \quad (21)$$

By solving the equation (20) and equation (21) described above for the self-discharge current Ipr, the following equation (22) is derived.

[Numerical Equation 22]

$$I_{pr} = \frac{I_1 \cdot Ad - I_2 \cdot Ac}{Ad + Ac} \quad (22)$$

Therefore, it is possible to calculate the self-discharge current Ipr by substituting the gradient Ac of the measured voltage after the correction at the time when charged with the constant current indicating the first current value I1 and the gradient Ad of the measured voltage after the correction at the time when discharged with the constant current indicating the second current value I2 into the above-described equation (22). By dividing the open circuit voltage of the power storage device 10 by the thus-calculated self-discharge current Ipr, the discharge resistance Rpr can be calculated.

In this case, for the first current value I1 and the second current value I2, it suffices that the absolute value of at least one of the first current value I1 and the second current value I2 is set to one or several times the reference value of the self-discharge current Ipr, and the absolute values of the first current value I1 and the second current value I2 may have the same value with each other or different values from each other. For example, the first current value I1 is set to 10 [μA] that is one times the reference value of the self-discharge current Ipr, and the second current value I2 is set to the value obtained by multiplying the first current value I1 by "−1", i.e., −10 [μ. In addition, the gradient Ac, Ad of the voltage change are acquired by a procedure similar to that shown in FIG. 25.

In addition, in this embodiment, although the controller 50C switches the level of the constant current, the direction of the constant current may be switched after the level of the constant current is switched, and the level of the constant current may be switched after the direction the constant current is switched. In such a case, because the plurality of self-discharge currents Ipr are obtained, the average value thereof, etc. may be used as the final result.

In addition, in this embodiment, although the controller 50C calculates the self-discharge current Ipr of the power storage device 10 by switching the constant current, the self-discharge current Ipr may be calculated without switching the constant current.

For example, if the electrostatic capacitance Cst in the equation (16) is known, the self-discharge current Ipr may be calculated by obtaining the gradient A1 of the measured voltage after the correction at the time when the first constant current is charge and by substituting the gradient A1, the first current value I1, and the known electrostatic capacitance Cst into the above-described equation (16). Alternatively, the association table indicating an association relationship between the gradient A1 of the approximate straight line and the self-discharge current Ipr may be generated by respectively substituting premeasured values or estimated values into the electrostatic capacitance Cst and the first current value I1 in the above-described equation (16), and the association table may be stored in the controller 50C in advance. In this case, when the gradient A1 of the approximate straight line that approximates the measured voltage after the correction is obtained, the controller 50C refers to the association table and calculates the self-discharge current Ipr that is associated with the thus-obtained gradient A1 of the approximate straight line.

In addition, as described above, the discharge resistance Rpr of the power storage device 10 is calculated by dividing the open circuit voltage (OCV) of the power storage device 10 by the self-discharge current Ipr. Therefore, if the open circuit voltage (OCV) of the power storage device 10 is known, the association table indicating the relationship between the gradient A1 of the approximate straight line and the discharge resistance Rpr may be generated and stored in the controller 50C in advance. In this case, when the gradient A1 of the approximate straight line that approximates the measured voltage after the correction is obtained, the controller 50C refers to the association table and calculates the discharge resistance Rpr associated with the thus-obtained gradient A1 of the approximate straight line.

As described above, the controller 50C detects one or more change(s) in the measured voltage of the power storage device 10 within a short period of time and calculates the self-discharge current Ipr or the discharge resistance Rpr on the basis of the information obtained by correcting the thus-detected change in the measured voltage. Thus, it is possible to promptly start the measurement of the power storage device 10 while ensuring the accuracy of the estimation of the internal state of the power storage device 10.

Next, operational advantages according to the eighth embodiment will be described.

The controller 50C of the measurement apparatus 1C in this embodiment is provided with the voltage change correction unit 552 that corrects the change in the measured voltage of the power storage device 10 on the basis of the variation information of the power storage device 10. In addition, the controller 50C is provided with the internal state computing unit 553 that computes the self-discharge current Ipr or the discharge resistance Rpr of the power storage device 10 on the basis of the change in the measured voltage of the power storage device 10, which has been corrected.

With such a configuration, because the voltage change correction unit 552 corrects the change in the measured voltage of the power storage device 10, it is possible to start the measurement of the power storage device 10 promptly. In addition, the internal state computing unit 553 can obtain the self-discharge current Ipr or the discharge resistance Rpr of the power storage device 10 on the basis of the change in the measured voltage after the correction by using, for example, the equations (16), (19), or (22) described above.

Therefore, it is possible to start the measurement of the power storage device 10 promptly and to obtain the self discharge state of the power storage device 10 within a short period of time.

In addition, the controller 50C in this embodiment is further provided with the measurement command unit 52 that switches the constant current to be supplied to the power storage device 10. The voltage change correction unit 552 then corrects the change in the measured voltage of the power storage device 10 on the basis of the above-described variation information for every constant current switched by the measurement command unit 52. The internal state computing unit 553 computes the self-discharge current Ipr or the discharge resistance Rpr of the power storage device 10 on the basis of the change in the measured voltage of the power storage device 10, which has been corrected for every constant current.

With such a configuration, because the change in the measured voltage after the correction can be obtained for every constant current different from each other as the measurement command unit 52 switches the constant current, by using the above-described equation (19) or (22), for example, it is possible to calculate the self-discharge current Ipr. As described above, because the parameter related to the self discharge can be obtained by using the actually measured value of the power storage device 10 that is the measurement target, compared with a case in which a theoretical value or the estimated value is to be used, it is possible to suppress errors of the parameter related to the self discharge.

In addition, the measurement command unit 52 in this embodiment switches the constant current to be supplied to the power storage device 10 between the first constant current for detecting the self-discharge current Ipr and the second constant current that is higher than the first constant current.

With such a configuration, because the second constant current that is higher than the first constant current is supplied from the constant current source 20C to the power storage device 10, the change in the measured voltage of the power storage device 10 is increased, and so, it is possible to obtain the gradient A2 of the change in the measured voltage with a high accuracy within a short period of time.

Furthermore, because a signal to noise (S/N) ratio of the electric signal indicating the voltage detected by the voltage sensor 40C is increased, it is possible to increase accuracy in the calculation of the gradient A2 of the change in the measured voltage.

For example, in a case in which the open circuit voltage of the power storage device 10 varies as shown in FIG. 22, if the change in the measured voltage is not corrected, the calculated value of the discharge resistance Rpr becomes a value about one-tenth of the true value. In contrast, by correcting the change in the measured voltage as in this embodiment, even in a state in which a voltage variation is caused in the power storage device 10 itself, it is possible to make the calculated value of the discharge resistance Rpr to approach the true value.

Ninth Embodiment

Next, a measurement apparatus 2C according to a ninth embodiment will be described with reference to FIG. 27. FIG. 27 is a diagram showing a configuration of the measurement apparatus 2C. The measurement apparatus 2C is provided with, in addition to the configuration shown in FIG. 18, a reference voltage source 30C. Because other configurations are the same as the configurations shown in FIG. 18, the same reference signs are given and the descriptions thereof will be omitted.

The reference voltage source 30C forms the voltage generation means that generates the reference voltage serving as the reference for the voltage of the power storage device 10. The reference voltage source 30C is formed of the voltage generation circuit, for example. When the voltage of the power storage device 10 is, for example, about 3 [V], the reference voltage of the reference voltage source 30C is set so as to fall within the range from "−1 V" to "+1 V" relative to the voltage of the power storage device 10.

The voltage sensor 40C measures the electric potential difference between the measured voltage of the power storage device 10 and the reference voltage in a state in which the constant current is supplied. In other words, the voltage sensor 40C indirectly measures the change in the measured voltage of the power storage device 10. The voltage sensor 40C outputs the electric signal indicating the thus-measured electric potential difference to the controller 50C.

The controller 50C has essentially the same functional configuration as that shown in FIG. 19 and executes the measurement method according to the seventh embodiment shown in FIGS. 20 and 23 or the measurement method according to the eighth embodiment shown in FIGS. 20 and 26.

The controller 50C corrects the change in the thus-measured electric potential difference on the basis of the variation information of the power storage device 10 and of the electric potential difference between the voltage of the power storage device 10 supplied with the constant current and the reference voltage. The controller 50C forms the computation means that computes the internal state of the power storage device 10 on the basis of the thus-corrected change in the electric potential difference.

In this embodiment, the controller 50C detects the temporal change of the measured voltage of the power storage device 10 on the basis of the electric signal output from the voltage sensor 40C and corrects the temporal change of the thus-detected measured voltage on the basis of the variation information of the power storage device 10. The controller 50C then determines whether the internal state of the power storage device 10 is being passed or failed or measures the self discharge state on the basis of the temporal change of the thus-corrected measured voltage.

At this time, as the variation information, for example, the measured data that indicates the temporal change of the electric potential difference between the open circuit voltage of the power storage device 10 and the reference voltage before the start of the measurement or after the end of the measurement of the power storage device 10 is used. Alternatively, the measured data, the statistical data, theoretical data, the simulation result, or the like indicating the temporal change of the open circuit voltage itself of the power storage device 10 before the start of the measurement or after the end of the measurement may also be used.

According to the ninth embodiment, the measurement apparatus 2C in this embodiment is further provided with the reference voltage source 30C that generates the reference voltage serving as the reference for the voltage of the power storage device 10. The voltage sensor 40C measures, as the measured voltage of the power storage device 10, the electric potential difference between the measured voltage of the power storage device 10 and the reference voltage. In addition, the controller 50C computes the internal state of the power storage device 10 on the basis of the change in the electric potential difference that has been corrected on the basis of the variation information of the power storage device 10.

With such a configuration, by measuring the electric potential difference between the measured voltage of the power storage device 10 to which the constant current is supplied from the constant current source 20C and the reference voltage of the reference voltage source 30C, a part of the DC component of the voltage of the power storage device 10 is eliminated. By doing so, it is possible to increase the resolution of the voltage sensor 40C. Thus, because the influence due to the internal noise of the voltage sensor 40C is reduced, it is possible to reduce the measurement time.

In addition, by correcting the change in the thus-measured voltage difference, it is possible to appropriately eliminate the variation component associated with the environment that tends to be apparent in the change in the thus-measured electric potential difference as the resolution of the voltage sensor 40C is increased. By doing so, because the resolution of the voltage sensor 40C can be increased while reducing the variation component associated with the environment of the power storage device 10, it is possible to detect the change in the measured voltage of the power storage device 10 with a high accuracy.

Although the reference voltage source 30C is formed of the voltage generation circuit in the ninth embodiment, the reference voltage source 30C may also be formed of the other power storage device that is of the same type as the power storage device 10. By measuring the electric potential difference between the power storage device 10 and the other power storage device under the same environment, the voltage variation component associated with the temperature change in the power storage device 10 is eliminated, and so, it is possible to increase the detection accuracy of the voltage change due to the differences in the internal state of the power storage device 10.

Although the seventh to ninth embodiments have been described in the above, the above-mentioned embodiments merely illustrate a part of application examples of the present invention, and the technical scope of the present invention is not intended to be limited to the specific configurations of the above-described embodiments.

For example, the extent of the voltage change in the power storage device 10 changes in accordance with the internal temperature of the power storage device 10. By utilizing this nature, the temperature table indicating the relationship between the voltage change in the power storage device 10 and the internal temperature may be stored in the controller 50C in advance. The controller 50C may estimate the internal temperature of the power storage device 10 on the basis of the change in the measured voltage of the power storage device 10, which has been corrected.

In addition, in the above-mentioned embodiment, although the self-discharge current Ipr and the discharge resistance Rpr are calculated by using the voltage change after the correction of the power storage device 10, alternatively, or in addition thereto, the electrostatic capacitance Cst of the power storage unit 13 may also be calculated. For example, the electrostatic capacitance Cst of the power storage unit 13 is calculated by substituting the gradient A2 for the voltage change after the correction and the second current value I2 at the time when the constant current indicating the second current value I2 is charged to the power storage device 10 into the above-described equation (17).

In addition, the controller 50C may determine the internal state of the power storage device 10 on the basis of the thus-calculated electrostatic capacitance Cst. For example, the controller 50C determines whether the power storage device 10 is being passed or failed by determining whether or not the calculated value of the electrostatic capacitance Cst falls within the predetermined normal range.

In addition, in the above-mentioned embodiment, although the internal state of single power storage device 10 is measured, it is possible to measure the internal state of the power storage module in which the plurality of power storage devices 10 are connected in series. In addition, although the measurement apparatuses 1C and 2C shown in FIGS. 18 and 27 include the display unit 60C and the operation unit 70C, at least one of the display unit 60C and the operation unit 70C may be omitted.

As described above, the measurement apparatus 1, 1A, 1B, 1C, 2B, and 2C according to the first to ninth embodiments each functions as the apparatus that detects the voltage change in the power storage device 10. This apparatus supplies the constant current to the power storage device 10, measures the voltage related to the power storage device 10 supplied with the constant current, and detects the voltage change in the power storage device 10 subjected to the measurement. The above-described apparatus acquires the voltage change in the power storage device 10 on the basis of the electrical property serving as the reference of the power storage device 10.

The present application claims priorities based on Japanese Patent Application 2020-006174, Japanese Patent Application 2020-006176, and Japanese Patent Application 2020-006179 filed with the Japan Patent Office on Jan. 17, 2020, the entire contents of which are incorporated into this specification by reference.

REFERENCE SIGNS LIST

1, 1A, 1B, 1C, 2B, 2C measurement apparatus (apparatus)
10, 10A power storage device
13 power storage unit
14 internal resistance
15 parallel resistance
20, 20B, 20C constant current source (supply means)

30, 30A reference voltage source (voltage generation means)

40, 40B, 40C voltmeter, voltage sensor (measurement means)

50, 50B, 50C controller (processing means, computation means)

S2, S3, S4 (measuring step, supplying step, processing step)

SB1, SB4, SB5, SB6 (determining step, supplying step, measuring step, computing step)

The invention claimed is:

1. A measurement apparatus configured to measure a state of a power storage device, the measurement apparatus comprising:
 a supply device configured to supply constant current to the power storage device;
 a measurement device configured to measure voltage related to the power storage device supplied with the constant current;
 a controller configured to detect a voltage change in the power storage device subjected to the measurement; and
 a voltage generation device configured to generate a reference voltage serving as reference for a voltage of the power storage device as an electrical property serving as a reference of the power storage device, wherein
 the controller is provided with a processor, the processor being configured to compute an internal state of the power storage device based on the detected voltage change,
 the measurement apparatus is configured to acquire the voltage change in the power storage device based on the electrical property,
 the measurement device is configured to measure electric potential difference between the voltage of the power storage device and the reference voltage, and
 the processor is configured to detect change in the measured electric potential difference as the voltage change.

2. The measurement apparatus of the power storage device according to claim 1, wherein
 the measurement device is provided with:
 a resistance element connected between the power storage device and a positive electrode of the voltage generation device; and
 an element detector configured to detect voltage generated in the resistance element as the electric potential difference.

3. The measurement apparatus of the power storage device according to claim 2, wherein
 current flowing through the resistance element is lower than the constant current.

4. The measurement apparatus of the power storage device according to claim 2, wherein
 the reference voltage is set such that the voltage generated in the resistance element is lower than the voltage of the power storage device.

5. The measurement apparatus of the power storage device according to claim 4, wherein
 the voltage generation device includes another power storage device.

6. The measurement apparatus of the power storage device according to claim 1, wherein
 the processor is configured to generate information related to a self discharge state of the power storage device based on the change in the measured electric potential difference.

7. The measurement apparatus of the power storage device according to claim 6, wherein
 the information includes at least one of: internal information indicating self-discharge current or discharge resistance of the power storage device; and determination information indicating whether the power storage device is being passed or failed.

8. The measurement apparatus of the power storage device according to claim 1, wherein
 the supply device is configured to supply the constant current to the power storage device at a time when the voltage of the power storage device is a predetermined value based on the electrical property, and
 the predetermined value is set based on data for specifying a relationship between the voltage of the power storage device and an electrostatic capacitance component of the power storage device.

9. The measurement apparatus of the power storage device according to claim 8, wherein
 the predetermined value is set to a voltage value at which the electrostatic capacitance component of the power storage device becomes lower than a threshold value in a range in which the voltage of the power storage device is changed due to discharging or charging.

10. The measurement apparatus of the power storage device according to claim 9, wherein
 the threshold value is set based on a maximum value or an average value of the electrostatic capacitance component of the power storage device.

11. The measurement apparatus of the power storage device according to claim 1, further comprising
 an acquisition circuit configured to acquire information for specifying variation of open circuit voltage of the power storage device as the electrical property, wherein
 the processor is provided with:
 a detection circuit configured to detect, based on measured voltage, change in the measured voltage, the measured voltage being the voltage of the power storage device measured by the measurement device; and
 a correcting circuit configured correct the detected change in the measured voltage based on the information.

12. The measurement apparatus of the power storage device according to claim 11, wherein
 the measurement device is configured to measure the open circuit voltage of the power storage device and to output, as the information, a signal indicating a level of the open circuit voltage, the measurement device being configured to subsequently measure the measured voltage of the power storage device supplied with the constant current.

13. The measurement apparatus of the power storage device according to claim 11, wherein
 the correcting circuit is configured to correct the change in the measured voltage by subtracting the variation of the open circuit voltage specified by the information from the change in the measured voltage detected by the detection circuit.

14. The measurement apparatus of the power storage device according to claim 11, wherein
 the processor is provided with a self discharge computation circuit configured to compute a self-discharge current or discharge resistance of the power storage device based on the corrected change in the measured voltage.

15. The measurement apparatus of the power storage device according to claim 14, further comprising
a switching circuit configured to switch the constant current to be supplied to the power storage device, wherein
the correcting circuit is configured to correct, for every constant current switched by the switching circuit, the change in the measured voltage of the power storage device based on the information, and
the self discharge computation circuit is configured to compute the self-discharge current or the discharge resistance based on the change in the measured voltage corrected for every constant current.

16. The measurement apparatus of the power storage device according to claim 15, wherein
the switching circuit is configured to switch the constant current to be supplied to the power storage device between first constant current for detecting the self-discharge current and second constant current higher than the first constant current.

17. The measurement apparatus of the power storage device according to claim 11, wherein
the measurement device is configured to measure, as the measured voltage, the electric potential difference between the voltage of the power storage device and the reference voltage, and
the processor is configured to compute the internal state of the power storage device based on the corrected change in the electric potential difference.

18. A measurement method for measuring a state of a power storage device, the measurement method comprising:
a supplying step of supplying constant current to the power storage device;
a measuring step of measuring voltage related to the power storage device supplied with the constant current;
a processing step of detecting a voltage change in the power storage device subjected to the measurement; and
a determining step of determining, based on a relationship between a voltage of the power storage device and an electrostatic capacitance component of the power storage device in an electrical property serving as reference for the power storage device, a voltage value for measuring the state of the power storage device, wherein
the voltage change in the power storage device is acquired based on the electrical property,
in the supplying step, the constant current is supplied to the power storage device when the voltage of the power storage device is the voltage value for measuring the state of the power storage device, and
in the processing step, an internal state of the power storage device is computed based on the voltage change in the power storage device subjected to measurement.

19. The measurement method of the power storage device according to claim 18, wherein
in the determining step, the voltage value is determined so as to avoid neighboring values of a specific voltage value at which the electrostatic capacitance component of the power storage device is maximized in a range in which the voltage of the power storage device is changed due to discharging or charging.

20. The measurement method of the power storage device according to claim 19, wherein
in the determining step, the voltage value is set so as to be lower than the specific voltage value at which the electrostatic capacitance component of the power storage device is maximized.

21. The measurement method of the power storage device according to claim 18, comprising
a controlling step of performing a control for charging or discharging the power storage device;
a control measuring step of measuring the voltage of the power storage device when the control is being performed; and
a generating step of generating data for specifying the relationship based on the voltage of the power storage device subjected to the measurement.

22. The measurement method of the power storage device according to claim 18, wherein
in the determining step, the voltage value is determined based on time or a voltage changed amount required to detect the voltage change in the power storage device supplied with the constant current.

23. The measurement method of the power storage device according to claim 18, the measurement method further comprising
acquisition step of acquiring information for specifying variation of open circuit voltage of the power storage device as the electrical property, wherein
in the processing step,
the voltage change in the power storage device subjected to the measurement is corrected based on the information, and
the internal state of the power storage device is computed based on the corrected voltage change.

24. The measurement method according to claim 18, the measurement method further comprising
a generating step of generating a reference voltage serving as reference for the voltage of the power storage device, wherein
in the measuring step, an electric potential difference between the voltage of the power storage device and the reference voltage is measured,
in the processing step, the change in the measured electric potential difference is detected as the voltage change, and
an internal state of the power storage device is computed based on the detected change in electric potential difference.

* * * * *